United States Patent [19]

Waters et al.

[11] 4,065,749
[45] Dec. 27, 1977

[54] GEOPHYSICAL PROSPECTING METHODS

[75] Inventors: Kenneth H. Waters; George W. Rice, both of Ponca City, Okla.

[73] Assignee: Continental Oil Company, Ponca City, Okla.

[21] Appl. No.: 708,766

[22] Filed: July 26, 1976

Related U.S. Application Data

[63] Continuation-in-part of Ser. No. 228,864, Feb. 24, 1972, abandoned.

[51] Int. Cl.² ............................. G01V 1/13; G01V 1/20
[52] U.S. Cl. ..................... 340/15.5 MC; 340/15.5 CP;
  340/15.5 DP
[58] Field of Search ............. 340/15.5 MC, 15.5 CP, 340/15.5 DP, 7 R; 444/1

[56] References Cited
  U.S. PATENT DOCUMENTS

| | | | |
|---|---|---|---|
| 3,409,870 | 11/1968 | Mounce et al. | 340/15.5 MC |
| 3,529,282 | 9/1970 | Brown et al. | 340/15.5 CP |
| 3,746,122 | 5/1971 | Davis | 340/15.5 MC |

*Primary Examiner*—Howard A. Birmiel
*Attorney, Agent, or Firm*—Leydig, Voit, Osann, Mayer & Holt, Ltd.

[57] ABSTRACT

A method for deriving seismic information from over a relatively large expanse of land to determine relevant strike, dip, velocity and related information. The method consists of the utilization of a plurality of strike, dip, velocity (SDV) cross patterned source-receiver arrays disposed at spaced known locations over a selected terrain, thereafter to derive localized and offset seismic data relative to selected pairs of groups of the SDV cross patterns with further signal processing to smooth and integrate strike, dip and velocity information over a specific substratum. The method utilizes information as derived from each SDV cross pattern, as well as offset seismic signal information derived from source/receiver combinations spanning two selected SDV cross patterns.

28 Claims, 24 Drawing Figures

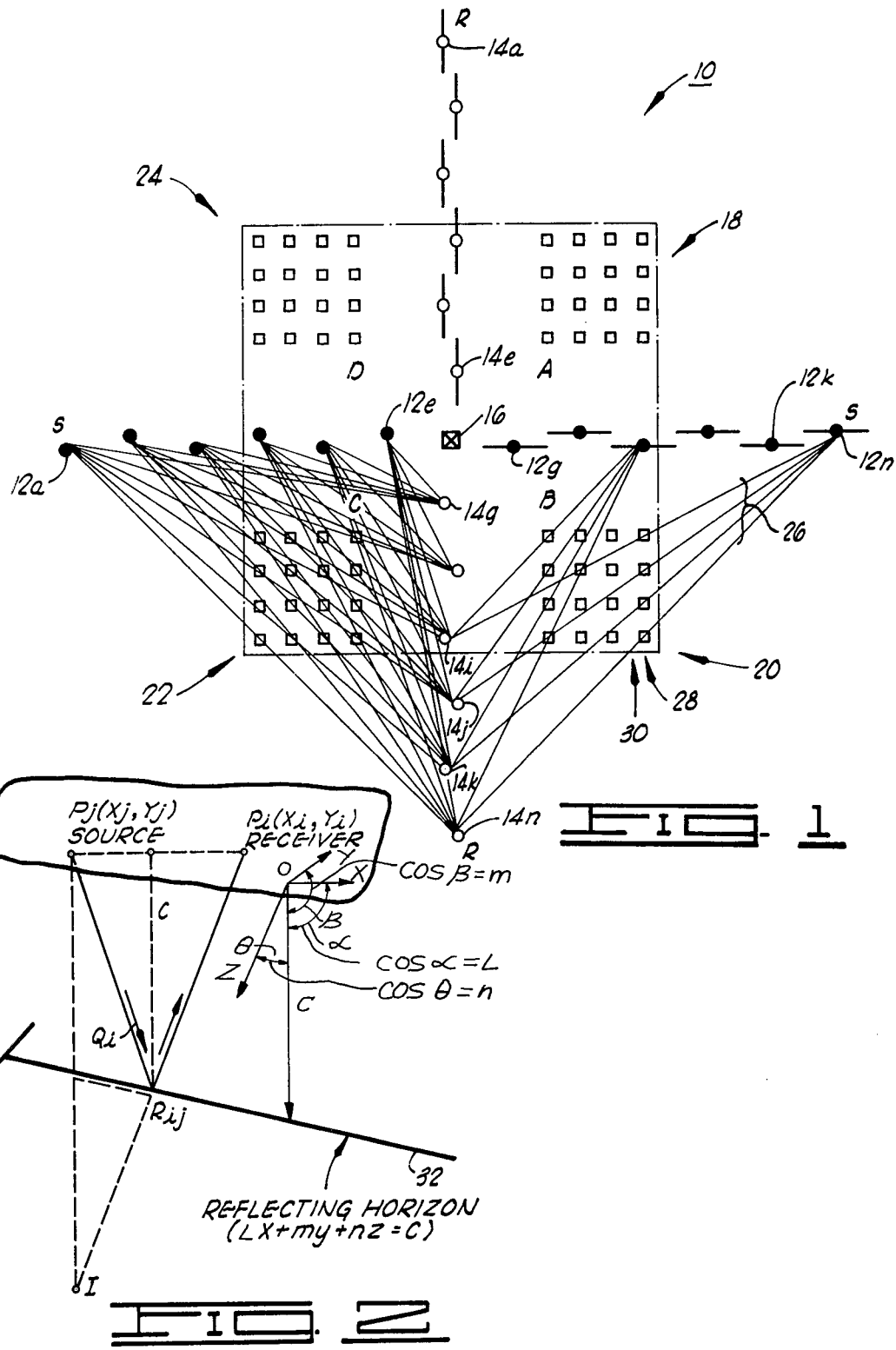

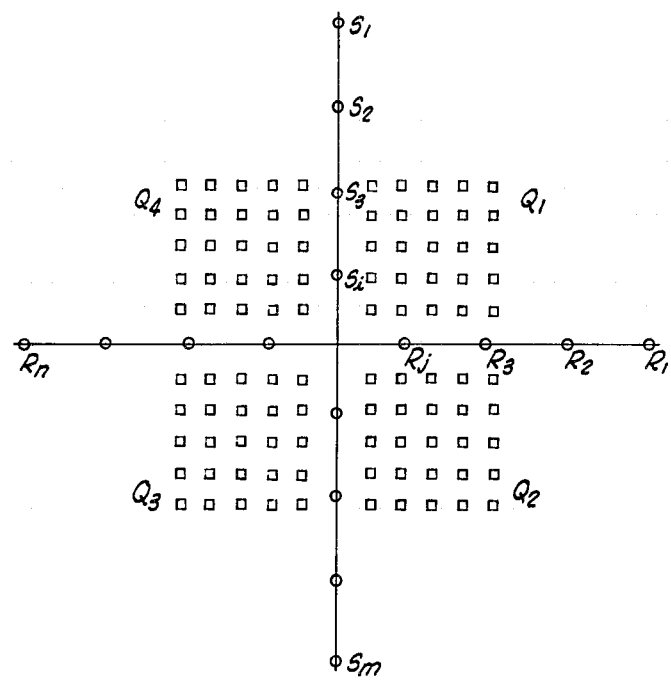
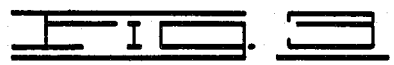
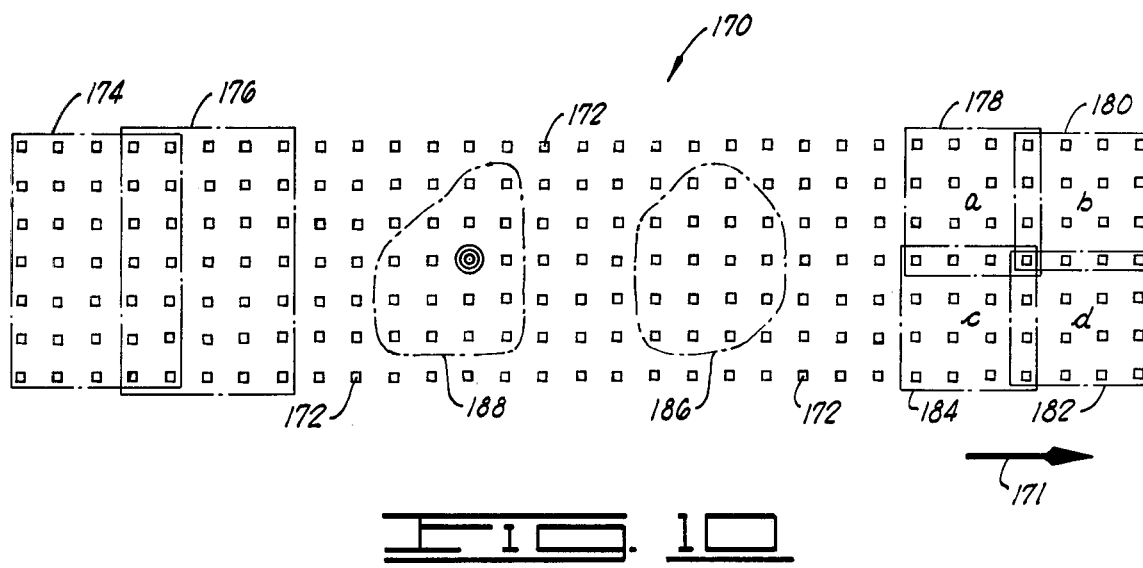

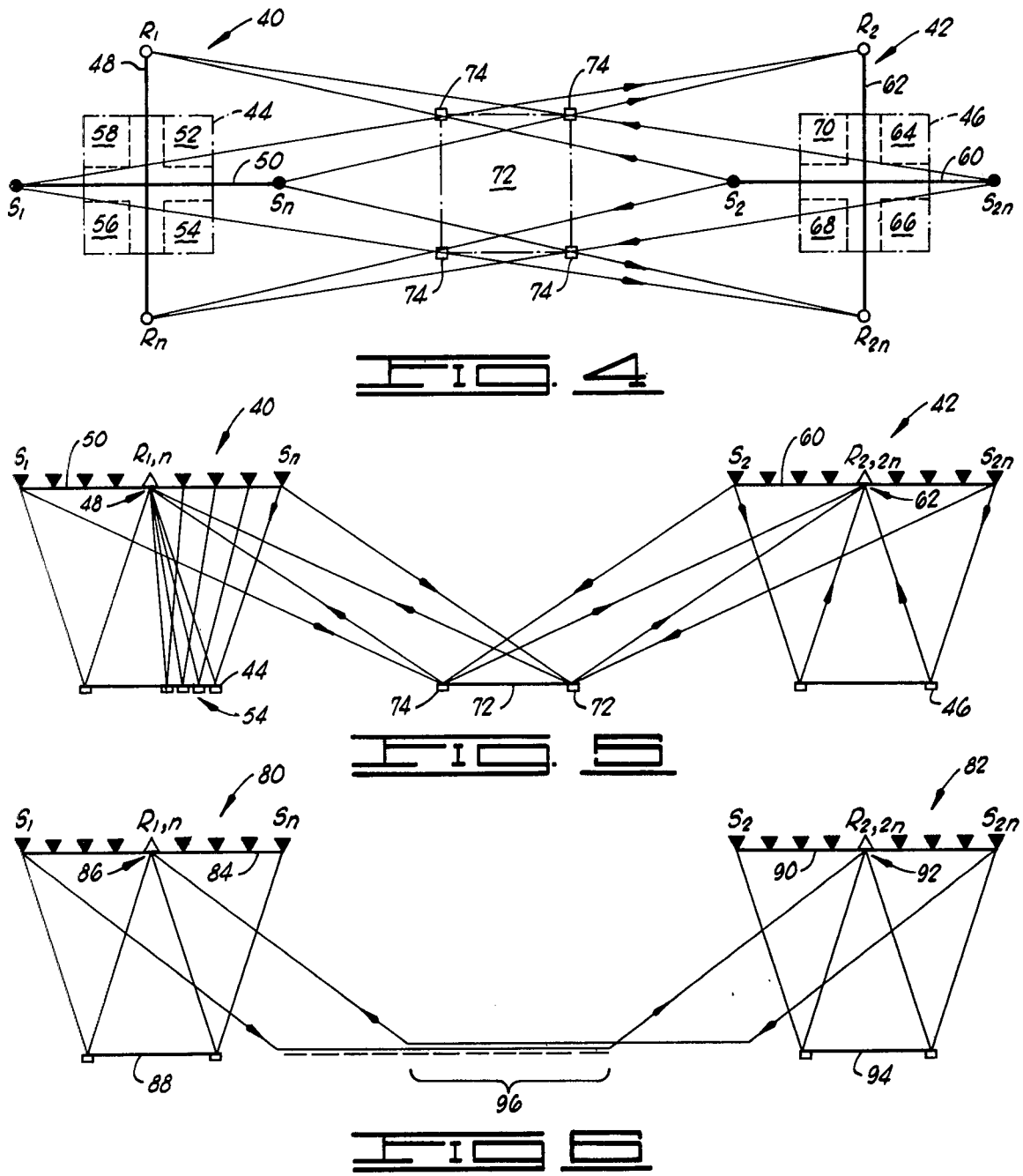

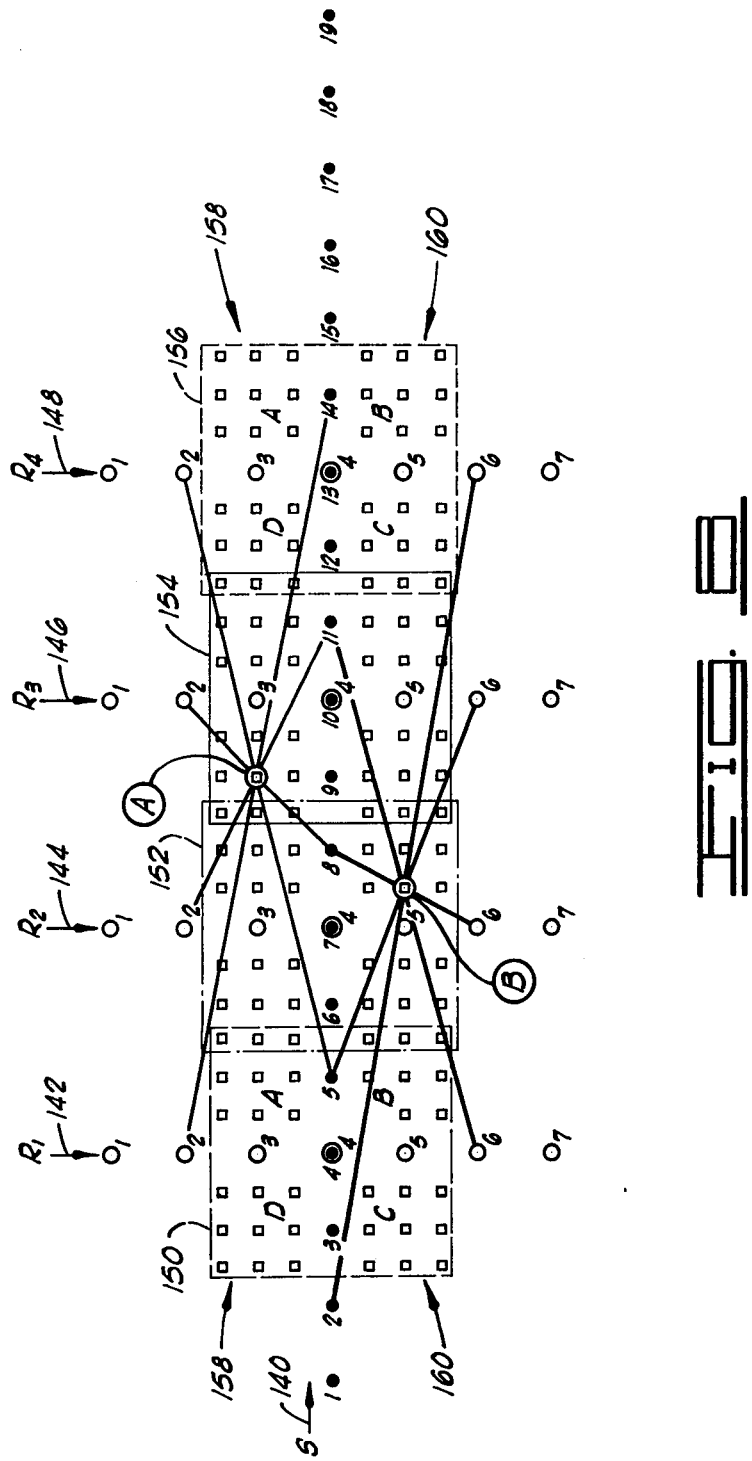

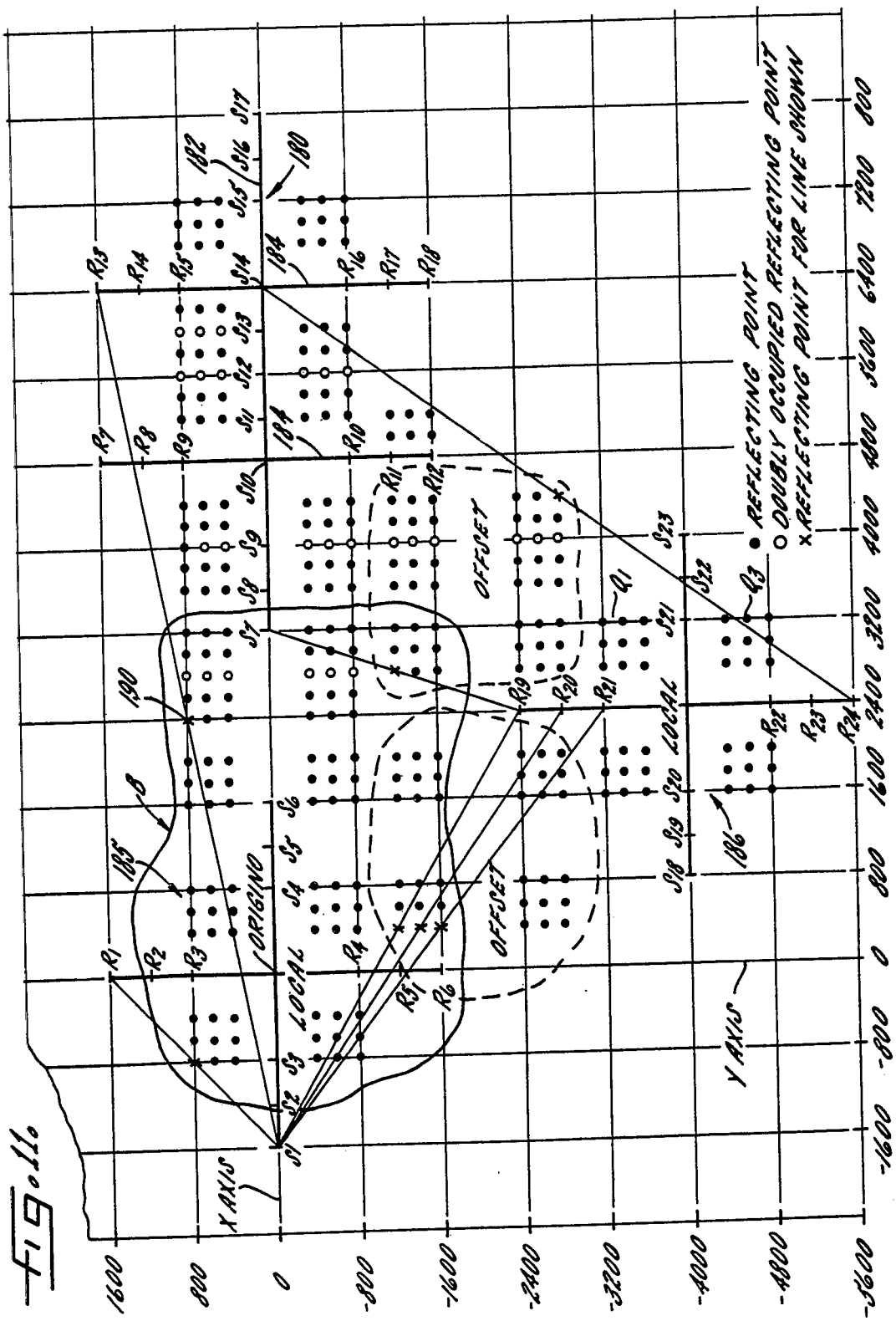

TABULATION FOR COMBINATION LOCAL AND OFFSET DATA

| $S_i, R_j$ | $x_i$ | $y_i$ | $x_j$ | $y_j$ | $t_{ij}^{(1)}$ | $t_{ij}^{(2)}$ | $t_{ij}^{(3)}$ |
|---|---|---|---|---|---|---|---|
| $S_1, R_1$ | -1.600 | 0 | 0 | 1.600 | 1.039 | 1.208 | 2.120 |
| $S_1, R_3$ | -1.600 | 0 | 6.400 | 1.600 | 1.428 | 1.516 | 2.276 |
| $S_1, R_{19}$ | -1.600 | 0 | 2.400 | -2.400 | 1.150 | 1.300 | 2.162 |
| $S_1, R_{20}$ | -1.600 | 0 | 2.400 | -2.800 | 1.175 | 1.307 | 2.163 |
| $S_1, R_{21}$ | -1.600 | 0 | 2.400 | -3.200 | 1.188 | 1.322 | 2.177 |
| $S_7, R_{19}$ | 3.200 | 0 | 2.400 | -2.400 | 1.052 | 1.220 | 2.122 |
| $S_{14}, R_{24}$ | 6.400 | 0 | 2.400 | -5.600 | 1.317 | 1.413 | 2.222 |

Fig. 17.

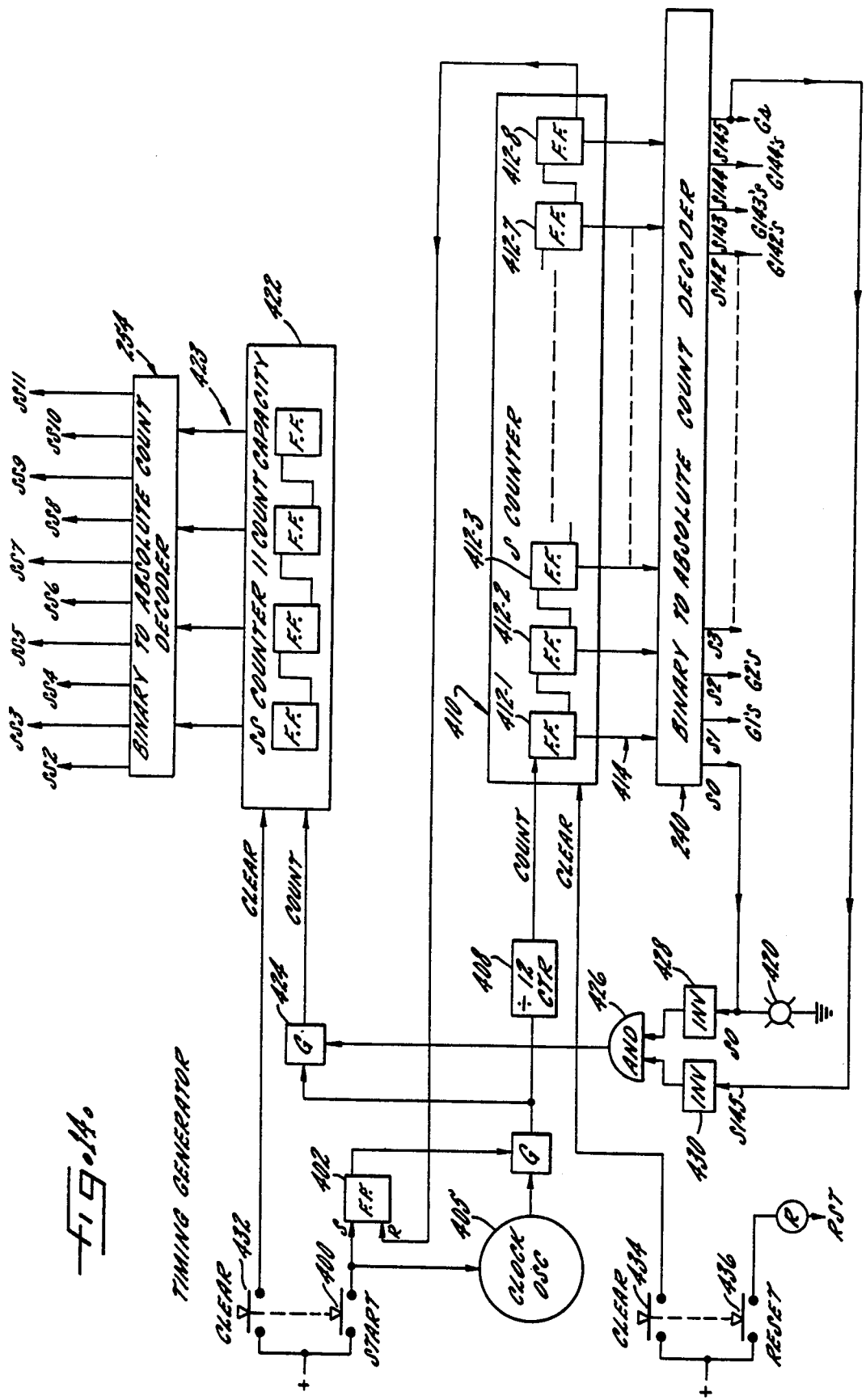

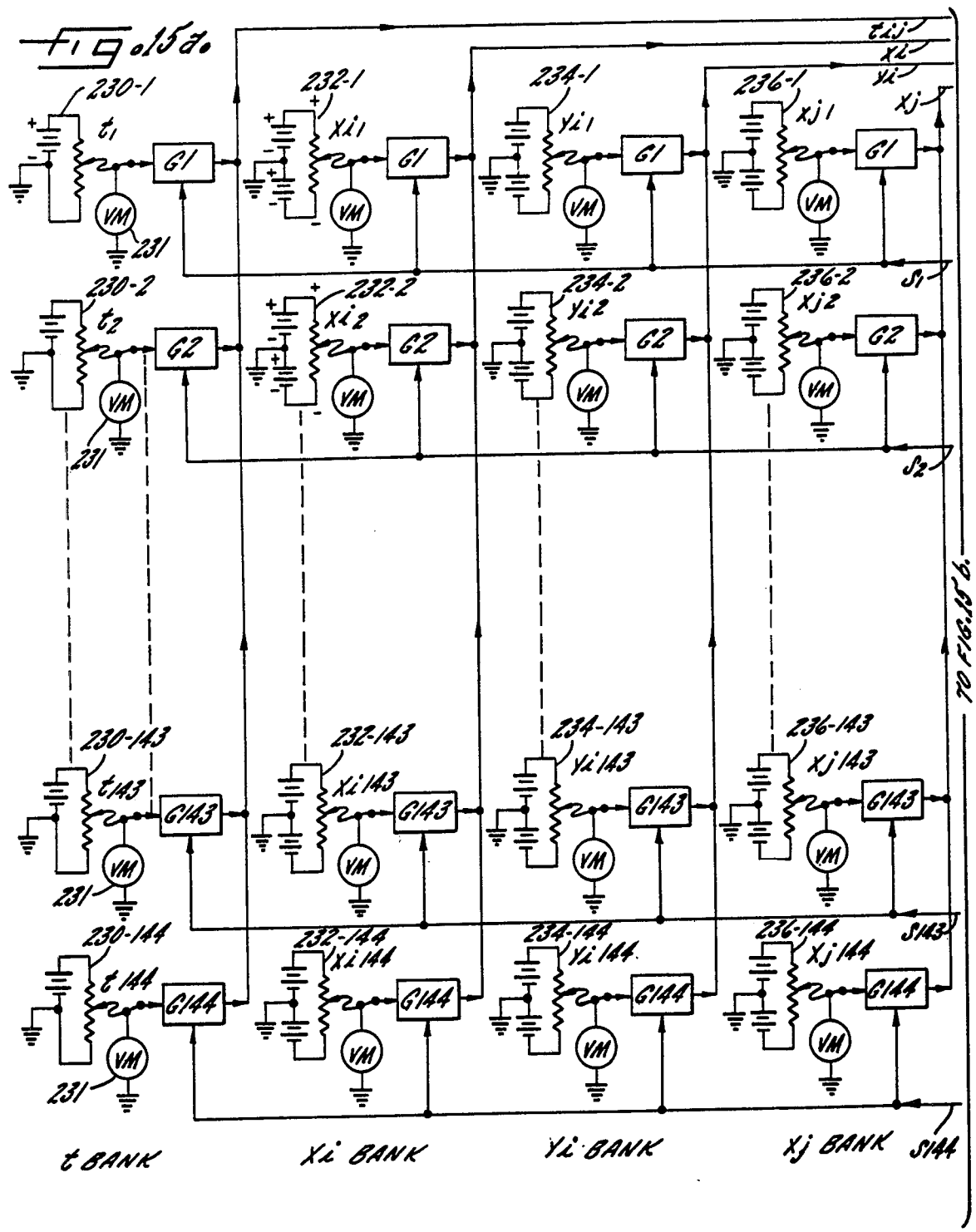

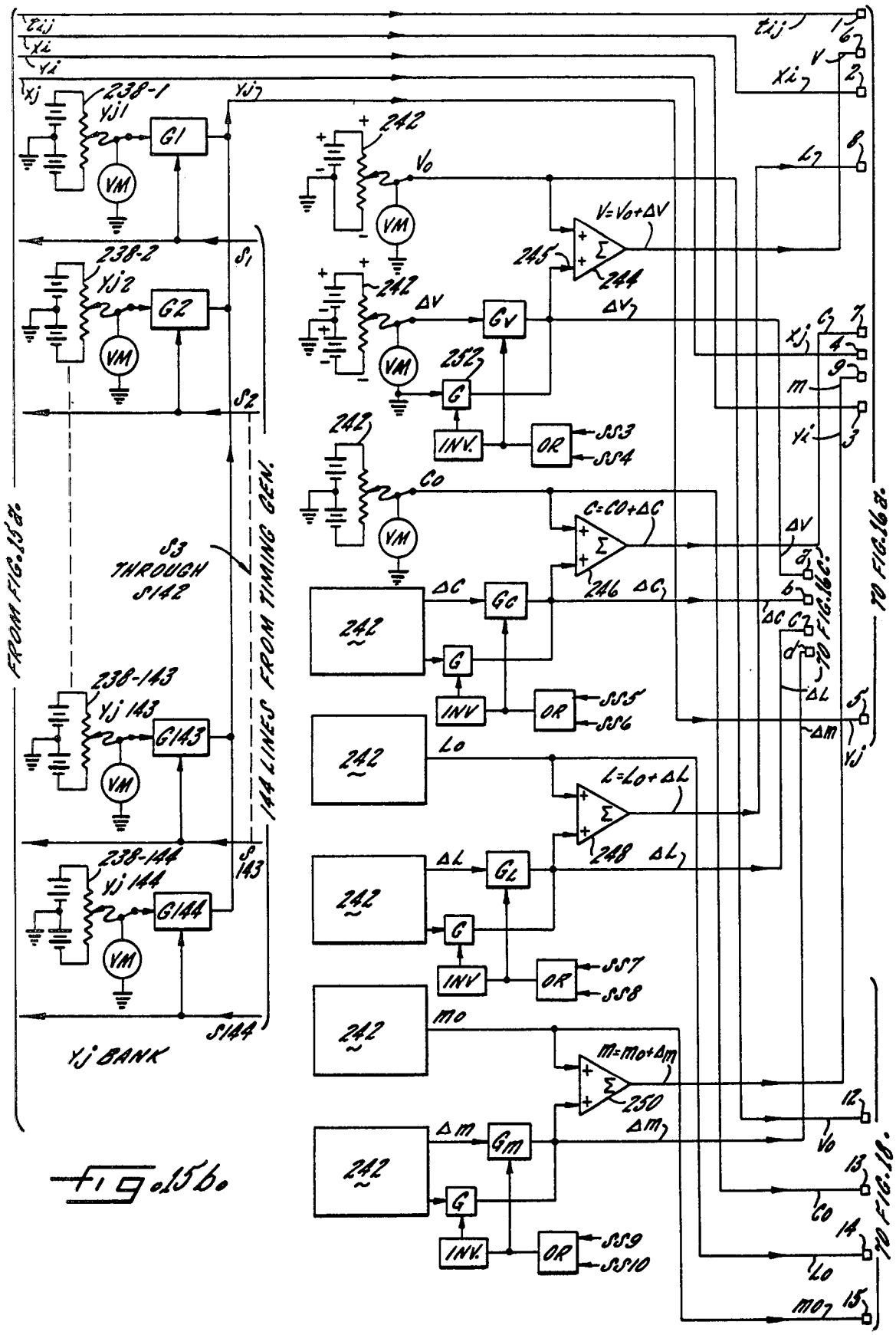

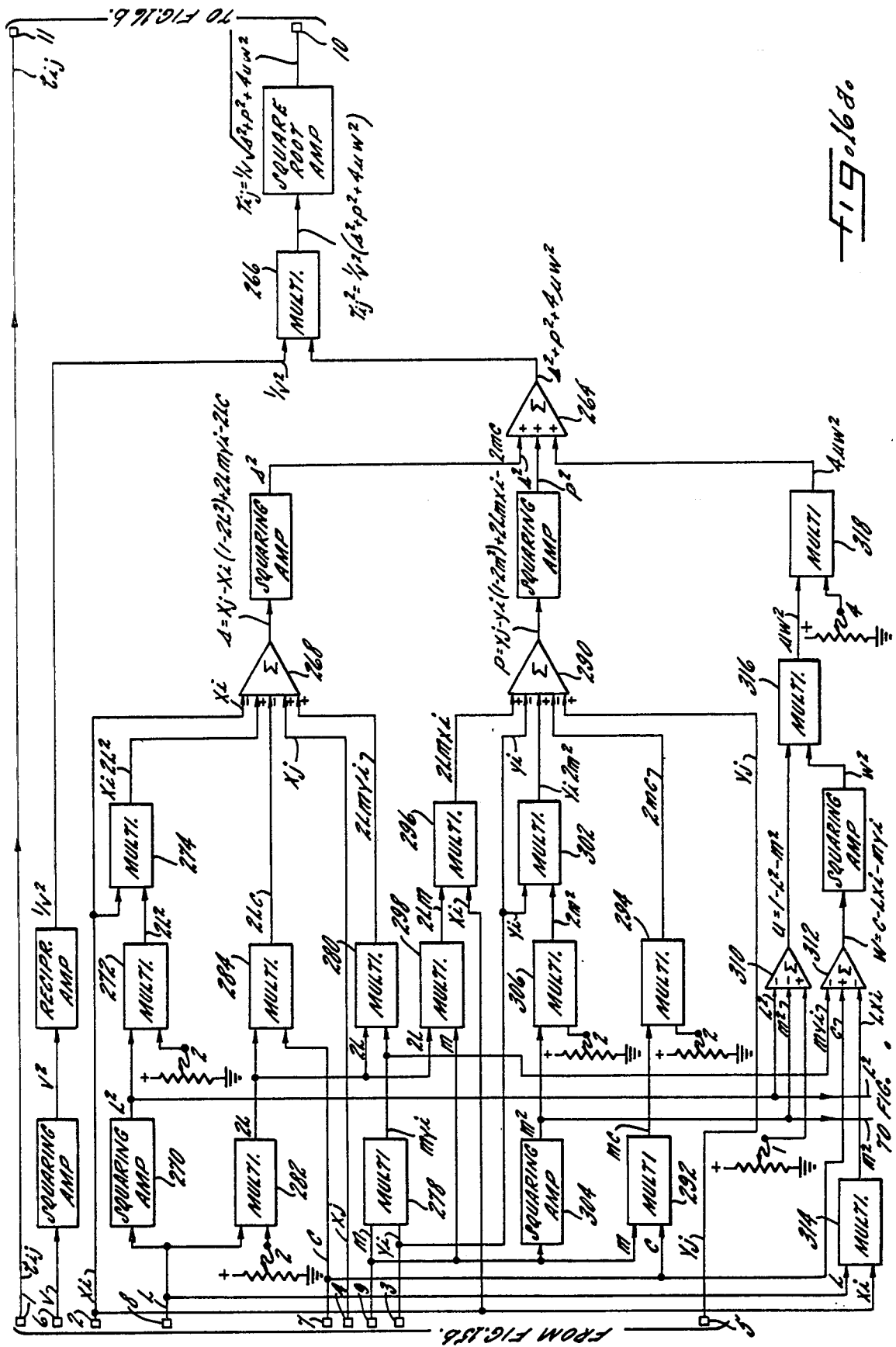

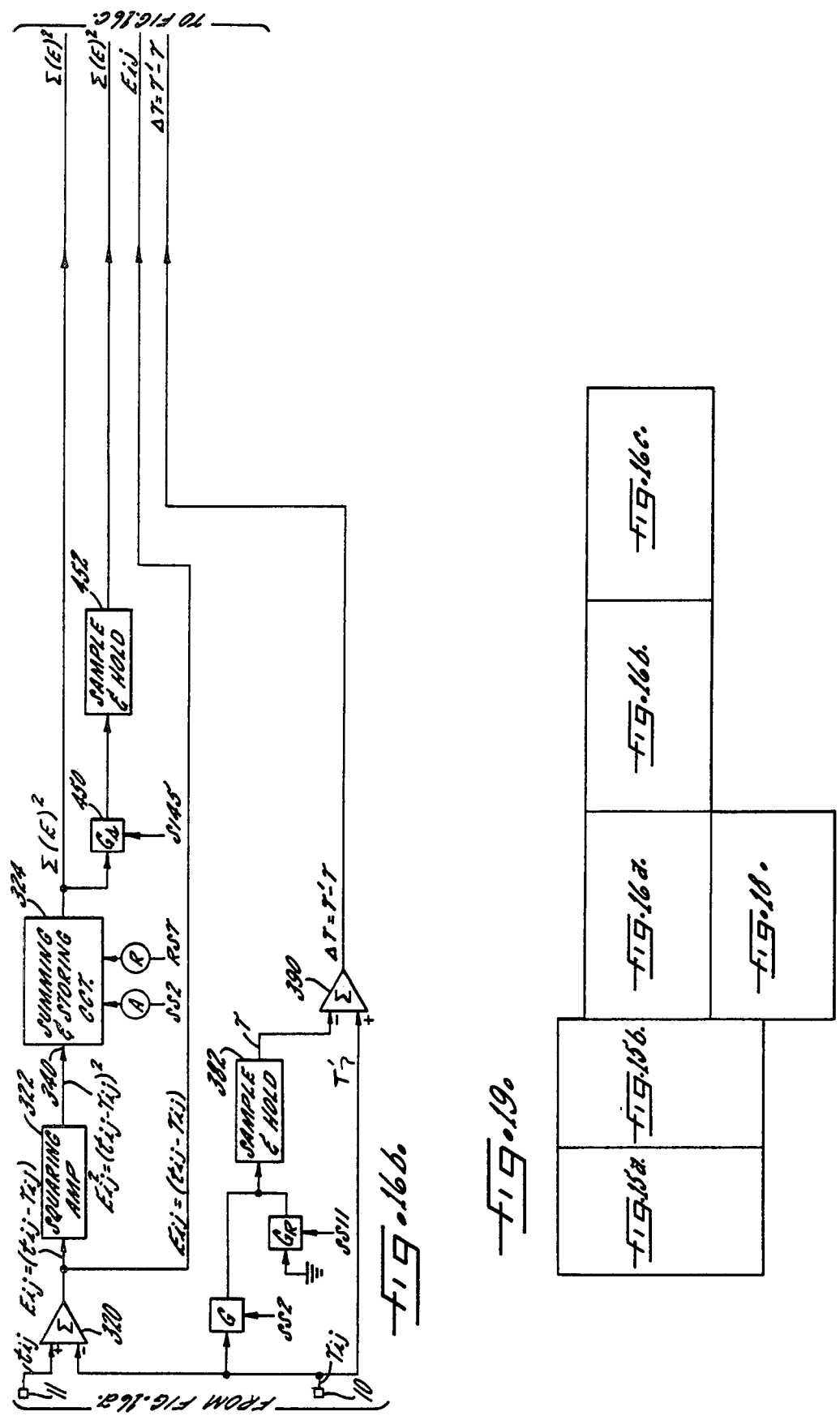

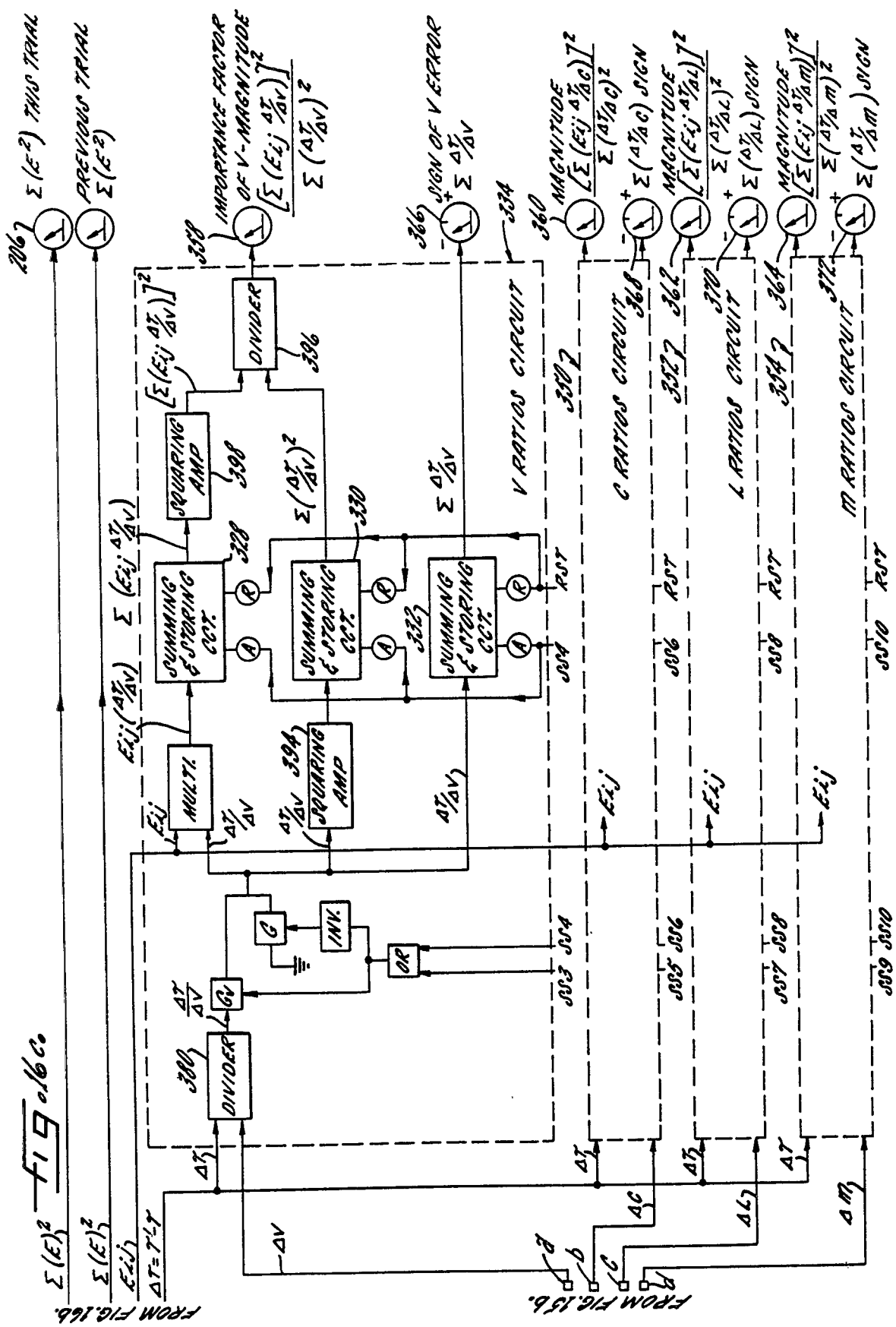

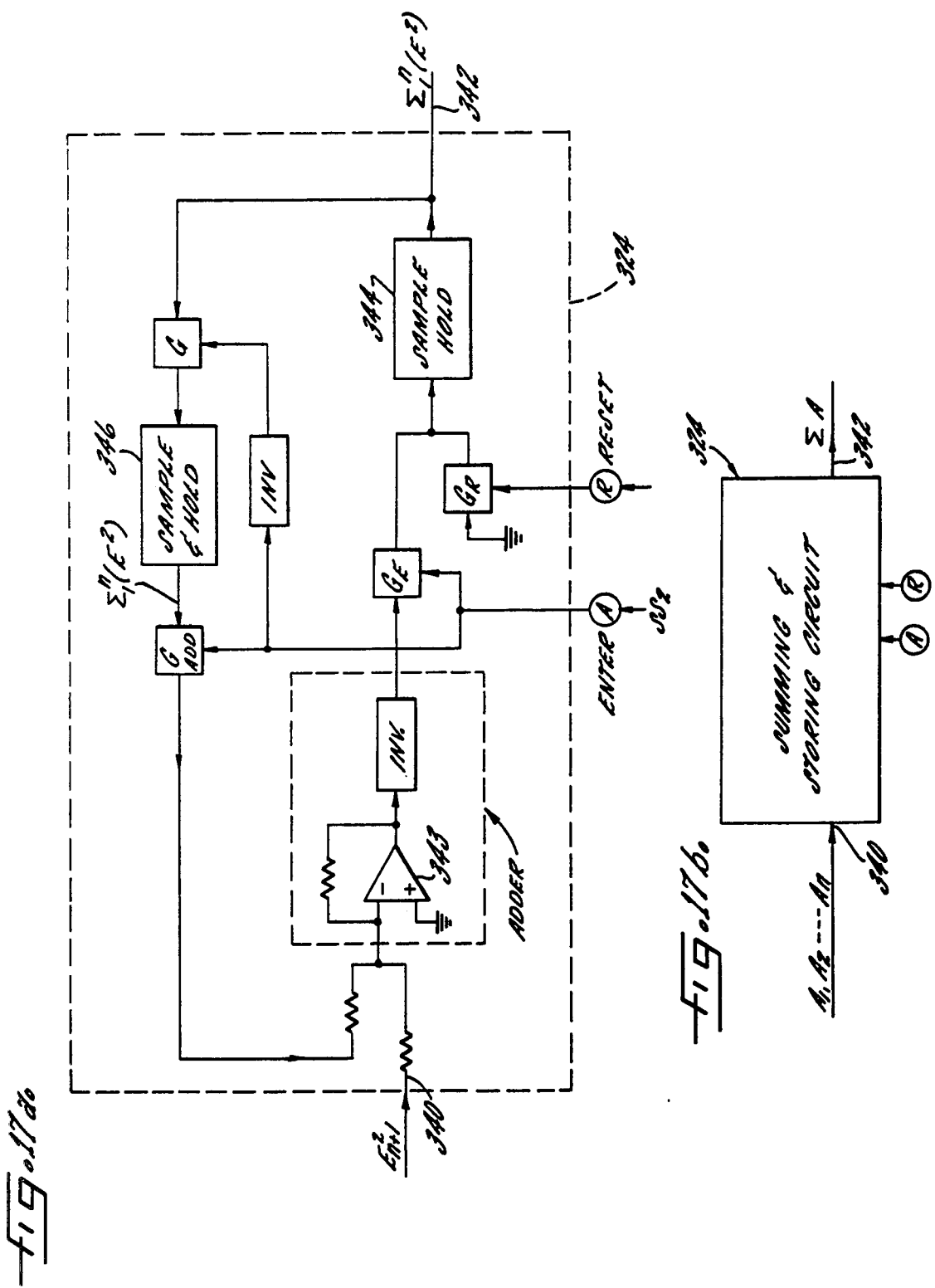

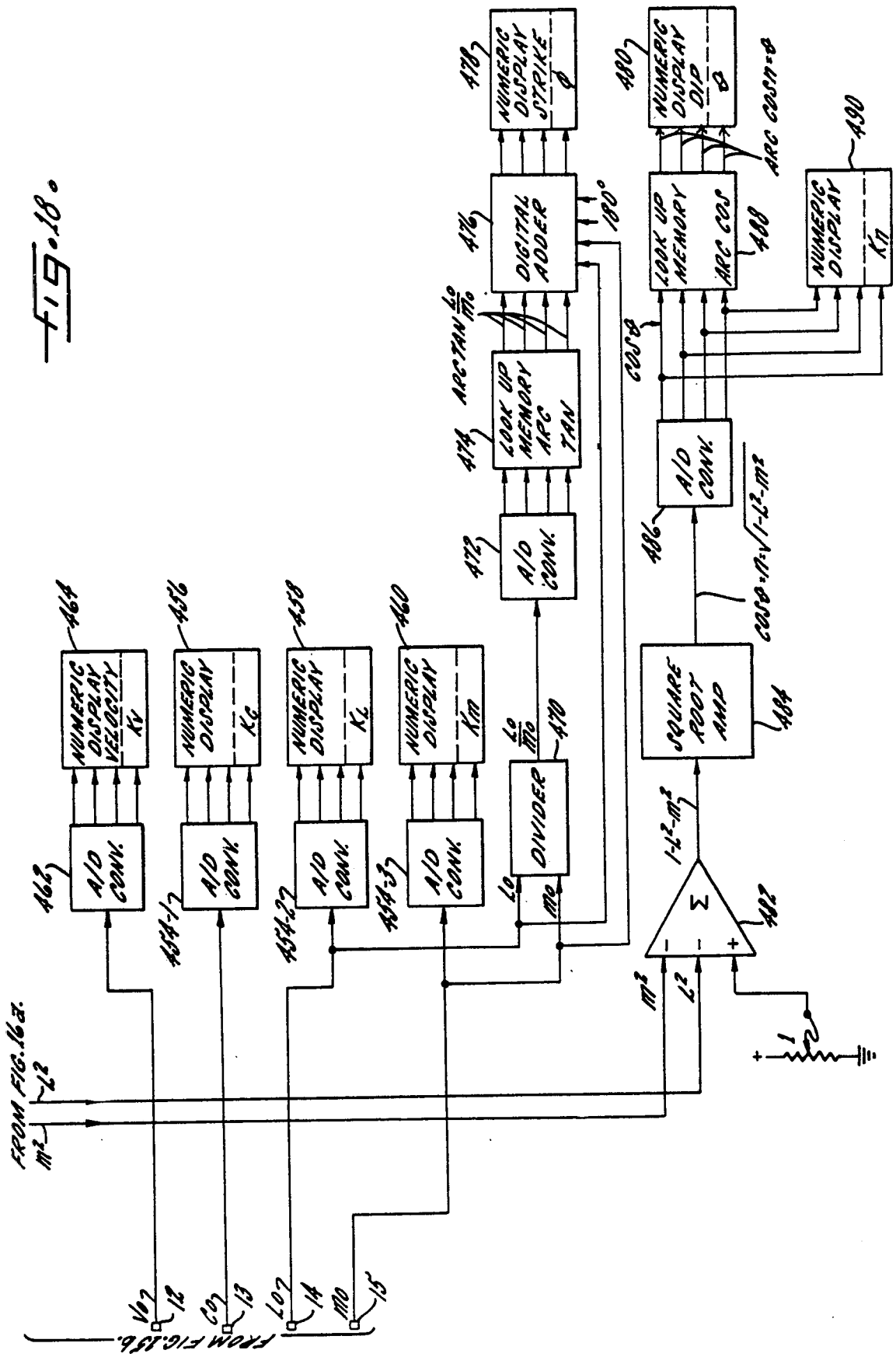

GEOPHYSICAL PROSPECTING METHODS

CROSS-REFERENCE TO RELATED APPLICATIONS

This is a continuation-in-part of Kenneth H. Waters et al. application Ser. No. 228,864, filed Feb. 24, 1972, now abandoned.

The present invention is related to the subject matter of U.S. patent application Ser. No. 174,744, filed Aug. 25, 1971 in the name of Waters et al. and entitled "Method for Reconnaissance Geophysical Prospecting".

BACKGROUND OF THE INVENTION

1. Field of the Invention

The invention relates generally to geophysical prospecting systems and, more particularly, but not by way of limitation, it relates to an improved seismic prospecting system wherein initial test information can be quickly obtained to provide specified reconnaissance data relative to a given subsurface area.

2. Description of the Prior Art

The prior art includes many and varied teachings related to types and patterns of seismic source-receiver communications, and there are many different types of receiver arrays, source arrays, and groups of such arrays which may be utilized in obtaining seismic information of predetermined content. Most geophysical sounding methods require, for best results, that the system consist of a large plurality of successive soundings compiled for a large number of locations of generally similar symmetry as effected at spaced locations along a predetermined line of survey. It is generally essential to operate along a line of survey in order to compile meaningful data which will then be checked through continuity of characteristics along the survey line. Recent innovations in shot patterns and data processing techniques have seen evolution of the crossed source-geophone pattern for determination of specific data through use of beam steering principles. Teachings of particular interest relative to seismic information derived through cross patterning are contained in U.S. Pat. Nos. 3,529,282 and 3,597,727; these teachings being directed to analog compilation of signal return derived through successive and continuous cross or oblique patterned beam steered signal compilation, stacking and general reduction of signal-to-noise ratio. The prior art methods are necessarily time consuming and best applied for detailing of a given area rather than for reconnaisance scanning to derive predetermined initial information.

SUMMARY OF THE INVENTION

The present invention contemplates a seismic energy prospecting method wherein two or more crossed source-goephone patterns are utilized to obtain both local and interrelated offset information from respective quadrature arrayed seismic return for further processing thereafter to determine strike, dip, velocity and interactive parameters. In a more limited aspect, the invention consists of the use of a plurality of sounding patterns wherein a plurality of sources and a plurality of receivers or geophones are arranged at each individual pattern in respective lines which are essentially at right angles one to the other; whereupon, repeated shot or vibrational impulse data is processed across diagonal reaches of the individual cross patterns to record data at selected stratum within the respective quadrants of the cross pattern. Data derived for each quadrant of each individual cross pattern is uniformly related with respect to the overall cross pattern and the centerpoint thereof such that the data can be effectively processed relative to selected strata to indicate the desired strike, dip, velocity, etc. (SDV) information. In like manner, data from individual cross pattern is then processed relative to the data derived from selected different cross pattern arrays to derive intermediate or offset information relative to the same selected strata.

Therefore, it is an object of the present invention to provide a reconnaissance method of geophysical prospecting wherein pertinent data can be quickly derived for a large area.

It is also an object of the invention to provide an accurate reconnaissance method which can be effected in a very short time over a large area to provide valuable initial information relative to strike, dip and velocity information, and thus enabling the controlling decisions as to further exploration.

It is yet another object of the invention to provide a seismic sounding method which enables obtaining of more specific data relative to selected strata within the earth.

It is still another object of the present invention to provide a method for obtaining desired data of relatively concentrated nature for a large land area with a minimum of time and crew expense.

It is also an object of the present invention to provide a geophysical prospecting method which enables initial assembly of strike, dip and average or interval velocity data for preselected strata of a large land area without the requirement of continuous sounding information along a survey line.

Finally, it is an object of the present invention to provide a geophysical prospecting method which enables derivation of greater content of seismic signal return relative to the number of times that source-receiver positions must be moved.

Other objects and advantages of the present invention will be evident from the following detailed description when read in conjunction with the accompanying drawings which illustrate the invention.

BRIEF DESCRIPTION OF THE DRAWINGS

FIG. 1 is a plan diagram of a source-receiver arrangement as employed in accordance with SDV reconnaissance as effected by the present invention;

FIG. 2 is a depiction of a three-dimensional model illustrating acoustic energy signal paths as carried out in accordance with the present invention;

FIG. 3 is a schematic diagram of an SDV quadrantal pattern;

FIG. 4 is a schematic diagram in top view of a pair of source-receiver cross pattern arrays as disposed in accordance with the present invention;

FIG. 5 is a schematic view in elevation of the cross pattern array disposition of FIG. 3;

FIG. 6 is a schematic diagram in elevation illustrating spaced cross pattern arrays with refractive seismic energy propagation through the offset information area;

FIG. 8 is a top view shown in schematic illustration of a form of reconnaissance survey as effected utilizing a series of cross pattern arrays;

FIG. 11 is a plan diagram of an exemplary field layout of three distinctly spaced arrays of sources and receivers, with seismic energy travel paths shown between sources of each array and receivers of each other array to illustrate how local and offset trace data is obtained;

FIG. 12 is a tabulation of reflection times and coordinate values for a set of source-receiver pairs, and represents a tabulation of both local and offset data;

FIG. 14 is a schematic circuit of a timing generator circuit included in the analog system;

FIGS. 15a and 15b taken together represent a schematic circuit diagram of a source-receiver pair measured time signal generator and parameter signal generator included in the analog system;

FIG. 16a is a schematic circuit diagram of a Determine T circuit included in the analog system;

FIGS. 16b and 16c taken together are a schematic circuit diagram of a Determine E circuit and V, c, L, m ratios circuits included in the analog system;

FIGS. 17a and 17b are a schematic circuit diagram and a block diagram, respectively, of summing and storing circuitry utilized in the analog system; and FIG. 18 is a block diagram of the display portion of the analog system.

DETAILED DESCRIPTION OF THE INVENTION

Figure 7:
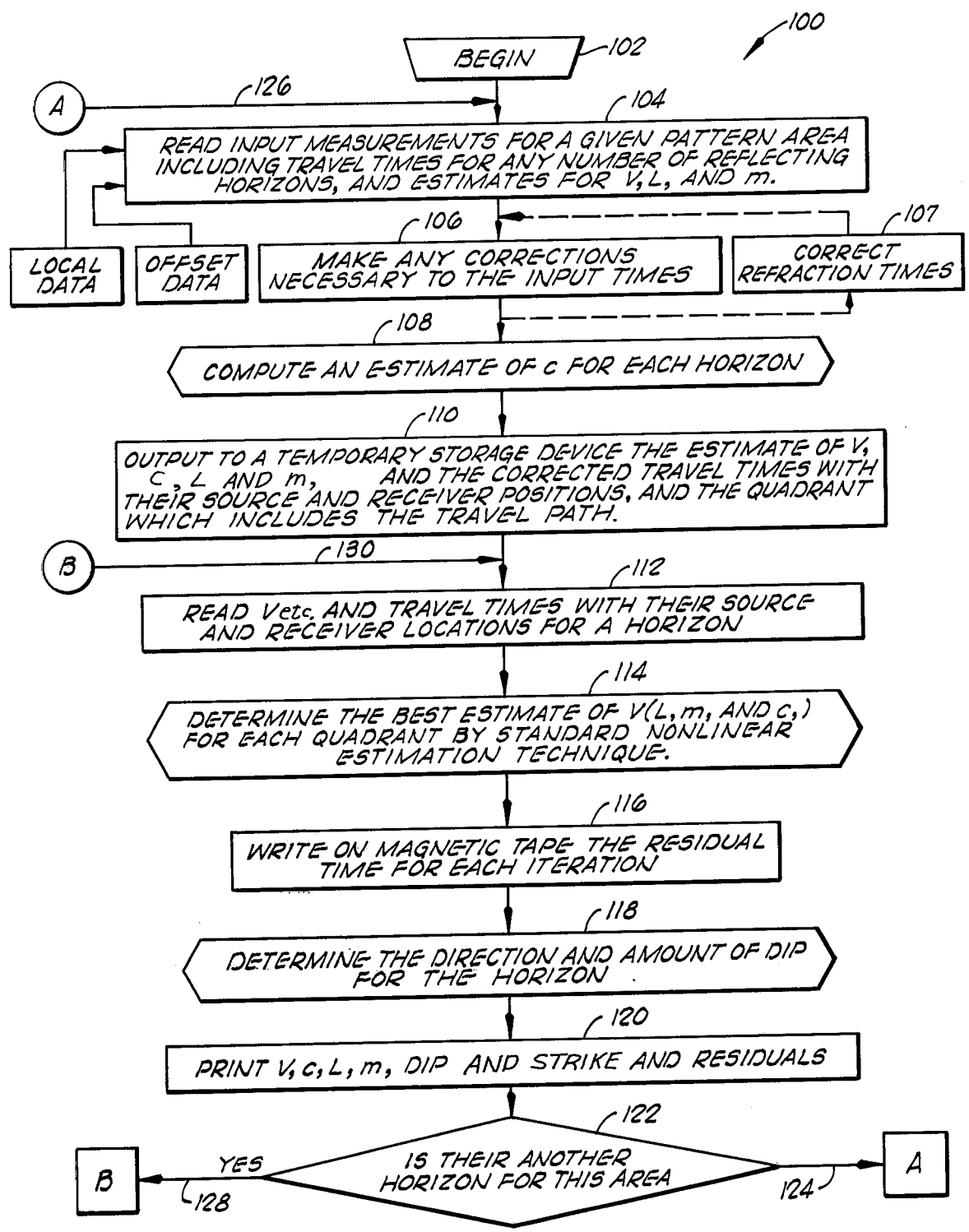
FIG. 7 is a flow diagram of the data processing program as utilized in carrying out the method of the present invention.

As shown in FIG. 1, an SDV cross pattern 10 consists of surface-disposed sources and receivers as arrayed in a cross pattern. Thus, a plurality of sources 12a through 12n are disposed in a line while a plurality of receivers 14a through 14n are disposed in a line generally perpendicular and essentially bisecting said source line. Each of adjacent sources 12a through 12n are equally-spaced as are receivers 14a through 14n and a center position 16 consists of both a source and receiver. The source-receiver position 16 enables direct depth measurements thereby to afford a depth equating factor to remaining energy paths about the cross pattern 10.

The SDV cross pattern 10 is fully disclosed in the related patent application Ser. No. 174,744, hereinabove cited as a related co-pending application. Selective source energization and reception enables return signal analysis relative to substrata lying beneath the quadrants of cross pattern 10. Thus, energization of sources 12g through 12n with detection of reflected signals at receivers 14a through 14e may be resolved through processing to define a quadrant reflection pattern 18 in quadrant A of the underlying substratum, e.g., a preselected reflecting strata underlying the surface-disposed source-receiver pattern. In like manner, energization of sources 12g through 12n in association with receivers 14g through 14n define quadrant pattern 20, and similar quadrant patterns 22 and 24 are defined by detection of signal return across remaining diagonal extremities of cross pattern 10.

In the particular cross pattern 10 shown by way of example in FIG. 1, the quadrant patterns 18 through 24 each consist of a square of reflection points, four reflection points per side. Thus, all receivers and sources across the lines are not employed. For example, excitation of source 12n propagates energy downward along ray paths 26 to respective ones of the row of relection points 28 with reflection back upward to respective receiver arrays or receivers 14i, 14j, 14k and 14n. In like manner, ray paths emanating from source 12k to the same receivers would derive the row of reflection points 30, and so forth as excitation of sources to the same receivers proceeds inward along the source line. The extent of coverage when utilizing all quadrantal sources and receivers and is illustrated with respect to the quadrant pattern 22 wherein all coordinated ray paths are shown as between sources 12a through 12e and receivers 14g through 14n. Each quadrant pattern will be a generally square configuration, variations being brought about only by the existing dip or other anomalies of the horizontal strata causing pattern 18.

The individual sources and receivers as indicated in FIG. 1 may be either individual operating units or plural units in specific array. Thus, receivers 14a through 14e are shown as consisting of receivers each comprised of a plurality of seisphones in linear array. Likewise, sources may be operated in specific array, for example linear, as shown by sources 12g through 12n. A normal field layout may consist of from 10 to 20 source units and 10 to 20 geophone arrays and, for example, the total distance from end to end may be on the order of 1.5 to 3 miles. It may be noted then that, if the distance from end to end were two miles, the area covered by the reflection points within the respective cross pattern quadrants would approach one square mile at each reflecting horizon. This ratio will, of course, be slightly affected by departures of the reflecting horizons from horizontal.

For the reflecting horizon having no dip, it will be possible to choose an average velocity to that stratum which will so affect the normal moveouts associated with the individual reflection points that it will reduce the attitude of the four rectangular reflection point quadrantal patterns to a single flat plane. If the velocity is not correct, it will give rise to a complex surface of symmetry about two directions at right angles, and the fitting of a least squares plane to the total set of depth points will result in increased variance. As will be further described below, an average velocity may also be chosen for energy from a sloping-reflecting layer except that the resulting least squares best plane will be dipping, and its angle of dip and strike may then be determined so that it will cause the variance to be a minimum.

Usage of the cross pattern source-receiver combination per se is fully set forth in the above-identified related application Ser. No. 174,744, and the cross patterns per se only constitute a tool of which many may be employed in carrying out the method of the present invention. Thus, one or more cross patterns are utilized in association with standard seismic field equipment to obtain the measurements of subsurface parameters relating to strike, dip, velocity, and depth to the reflecting horizon in the specified area of exploration. In addition to localized data for each cross pattern, offset information is obtained at intermediate reflecting points between each selected pair of cross patterns, which offset data is processed relative to localized data to derive a more complete data pattern for the selected horizon. Such data processing may be carried out either by analog equipment or by digital processing systems; however, the programmed digital computation system has proven to be the most efficient manner of processing the data, and such program, similar to that disclosed in U.S. application Ser. No. 174,744, is set forth below.

Input measurements will include travel time from source to reflecting stratum to receiver for at least four independent paths and preferably more for increased reliability of the parameter estimates. The velocity estimate will not assume a flat plane with no dip as is the case with most velocity estimates, and all parameters are allowed to vary simultaneously until the best fit to the travel times is obtained.

With reference to FIG. 2, we assume a constant velocity layer between the reference plane or surface and the reflecting horizon 32.

The quantity $c$ is the perpendicular distance from a selected origin (designated "O" in FIG. 2) to the reflecting plane (labeled REFLECTING HORIZON in FIG. 2). The quantities $L$ and $m$ are direction cosines of the perpendicular line $c$ relative to the X and Y axis respectively. To depict these direction cosines in FIG. 2, the angle between the perpendicular line $c$ and the X and Y axis are designated $\alpha$ and $\beta$, respectively and, thus, $\cos \alpha = L$ and $\cos \beta = m$ as shown on this figure. The angle between the perpendicular line $c$ and the Z axis is designated as $\theta$ in FIG. 2, and the quantity $n$, the direction cosine, equals $\cos \theta$, as shown. The relation between $L$, $m$ and $n$ will equate as:

$$L^2 + m^2 + n^2 = 1 \tag{1}$$

The equation of the plane is:

$$Lx + my + nz = c \tag{2}$$

where $c$ is the perpendicular distance of the plane from the origin O.

While the length of the line $c$ cannot be directly measured, its length may be estimated from the recorded data which reveals the travel times of seismic energy between sources S and receivers R, and from the velocity V of seismic energy traveling through the earth between the surface of the reflecting plane being analyzed, which velocity V may also be estimated.

Also shown in FIG. 2, are the additional geometric relationships for a ray path denoted as $Q_i$ which extends from the source position $P_j(x_j, y_j, O)$ and the receiver position $P_i(x_i, y_i, O)$. The image point of the source $P_j$ is the point $I_{ij}$, and the reflection point on the reflecting horizon 60 is $R_{ij}$. Thus, the reflection path from $P_j$ to $R_{ij}$ to $P_i$ is the same as the distance $I_{ij}$ to $P_i$ where $I_{ij}$ is the image of $P_j$ in the given plane. Then, it will follow that:

$$D^2_{ij} = [x_j - x_i(1 - 2L^2) + 2Lmy_i - 2L_c]^2 + [y_j - y_i(1 - 2m^2) + 2Lmx_i - 2mc]^2 + [2nc - 2Lnx_i - 2nmy_i]^2 \tag{3}$$

where $D$ is equal to the distance from source to reflector to receiver.

Letting K equal $(1/V^2)$ and $n^2$ equal the quantity $(1 - L^2 - m^2)$, where V equals velocity and T is equal to energy travel time, then the relation holds as $$T^2 ij = K\{[x_j - x_i(1 - 2L^2) + 2Lmy_i - 2Lc]^2 + [y_j - y_i(1 - 2m^2) + 2Lmx_i - 2mc]^2 + 4(1 - L^2 - m^2) [c - Lx_i - my_i]^2\} \tag{4}$$

In processing the data to obtain the best fit of an estimated reflecting plane to the measured travel times, it is preferred to utilize a non-linear estimation technique known as the method of least squares, where the variance or difference between the measured travel times $t$ and the determined travel times T to the estimated reflecting plane, is squared. The parameters L, V, $m$ and $c$ are then determined for the case where the sum of the squares of the variance is a minimum for all source-receiver pairs of a cross pattern, represented by the expression:

$$\Sigma_{ij}(t_{ij} - T_{ij})^2 \tag{5}$$

where $i$ and $j$ are conventional subscripts designating all the sources and receivers, which indices $i$ and $j$ are completely interchangeable, $T_{ij}$ are the determined travl times and $t_{ij}$ are the measured travel times.

Since it is necessary to estimate four independent parameters, it is necessary that at least four independent paths to the plane be measured in order to obtain a solution. For added statistical error cancellation, it is recommended that several more paths on the order of last least 10 also be measured andutilized. By knowing the source and receiver locations, and the measured travel time for all paths, L, $m$, $n$, $c$ and V can be estimated. As these parameters vary non-linearly, standard non-linear estimation techniques must be utilized in formulating the estimated values. Thus, it is suggested to use techniques such as those described in "BMD, Biomedical Computer Programs, X-Series Supplement", techniques which utilize step-wise Gauss-Newton iterations, such procedures being well documented in the statistical literature since about 1960. For convenience in reference, portions are reproduced below of certain sections from said BMD publication, specifically the sections entitled "General Description", "Card Preparation d. Fortran Statements", and "Computational Procedure Step 1 and Step 2".

"BMDX85 NONLINEAR LEAST SQUARES

"1. GENERAL DESCRIPTION

"a. This program obtains a weighted least squares fit $$y = f(x_1, \ldots, x_i, \theta_1, \ldots, \theta_p) + e$$

of a user specified function $f$ to data values $x_1, \ldots, x_i, y$ by means of stepwise Gauss-Newton iterations on the parameters $\theta_1, \ldots, \theta_p$. Within each iteration parameters are selected for modification in a stepwise manner. The parameter selected at a given step is the one which, differentially at least, makes the greatest reduction in the error sum of squares. If necessary to avoid singularity problems, only a subset of the parameters may be modified in a given iteration. In addition, parameters with boundary values whose modification in a given iteration would lead to boundary violations are not modified. In effect the iteration is performed "on the boundary" when it appears that the best fit occurs outside the parameter range.

"b. Output from this program includes:
(1) Parameter values and residual mean square after each iteration
(2) Asymptotic standard deviations and correlations for the estimated parameters after the last iteration
(3) For each case after the last iteration
  (a) Original data
  (b) Value of the function
  (c) Residual (d) Standard deviation of predicted y "c. Limitations per problem
(1) Total amount of data, $n(t + 1) \leq 15,000$
(2) Number of parameters, $p \leq 100$
(3) Number of Variable Format Cards, $f \leq 9$
where $n$ is the number of cases and $t$ is the number of independent variables.

"d. Estimated running time and output pages per problem: Running time is largely dependent on the function being fitted. For reasonably uncomplicated models and a few hundred cases, an estimate of five minutes should be sufficient. (IBM 7094) Number of pages: $20 + n/60$.

"3. CARD PREPARATION
Preparation of the cards listed below is specific for this program. All other cards listed in the preceding section are prepared according to instructions in the Introduction.

"d. FORTRAN Statements
These are compiled by the FORTRAN IV compiler and are executed n times for each iteration. They must define a function, $f$, and its derivatives, $d_i$, with respect to its parameters, $p_i$. The dependent, independent and weight variables may be altered in these statements.

Example: Suppose the model is $x_1 = p_1 \sin(p_2 x_2) + p_3 +$ where $x_1$ and $x_2$ are data values and $p_1, p_2, p_3$ are parameter values. Then $f = p_1 \sin(p_2 x_2) + p_3$ $d_1 = \sin(p_2)$ $d_3 = 1$
and the FORTRAN statements are:
F = P(1)*SIN(P(2)*X(2))+P(3)
D(1) = SIN(P(2)*X(2))
D(2) = P(1)*X(2)*COS(P(2)*X(2))
D(3) = 1.0
RETURN
END For any model, the last 2 cards should be RETURN and END.

"4. COMPUTATIONAL PROCEDURE For ease of description we denote the dependent variable as $y_i$, the weights by $W_i$, and assume the independent variables to have indices $l$ to $t$. Beginning with an initial set of parameter values $\theta = (\theta_1, \ldots, \theta_P)$ specified by the user, the program minimizes the error mean square $$s^2 = \frac{1}{n-p} \sum_{i=1}^{n} [(y_i - f(x_{il},\ldots,x_{il}; \theta_1,\ldots,\theta_p))^2 \cdot w_i]$$

by means of stepwise Gauss-Newton iterations. The function $f$ and its partial derivatives $f_j = \delta f/\delta \theta_j$ are evaluated by means of a user supplied subprogram (see Section 3, d.)

"Step 1. Let $d = p + 1$ and let $x_i = (x_{il}, \ldots, x_{il})$ and
$z_{ij} = f_j(x_i, \theta), i = 1, \ldots, n; j = 1, \ldots, P$
$z_{id} = y_i - f(x_i, \theta), i = 1, \ldots, n$.
The matrix $$a_{ij} = \sum_{K=1}^{n} z_{ki} z_{kj} w_k, i, j = 1,\ldots,d$$

is formed and the error mean square $S^2 = a_{dd}/(n-p)$ is computed.

"Step 2. The diagonal elements of $(a_{ij})$ are pivoted on in a stepwise manner. At each step the index $k$ of the pivot element is the one which maximizes $a^n_{kd}/a_{kk}$ among all $k$ satisfying (1) $0 < k \leq p$ and $k$ has not been used previously as a pivot index.
(2) $a_{kk}/\bar{a}_{kk} > T$ where T is the tolerance specified by the user and $\bar{a}_{kk}$ is the value of $a_{kk}$ before pivoting began.

If the tolerance drops too low, some diagonal elements (in addition to $a_{dd}$) may not be used as pivots."

Utilization of this technique will require as stated in the "General Description" section of the BMD publication reproduced above, that the function (4) which is the user specified function f, and the partial derivatives of the function with respect to each parameter be defined. Thus, the partial derivatives above-mentioned may be defined as follows:

$$\frac{\delta T_{ij}}{\delta V} = \frac{-1}{V^2} \{[x_j - x_i(1 - 2L^2) + 2Lmy_i - 2Lc]^2 \qquad (6)$$

$$+ [y_j - y_i(1 - 2m^2) + 2Lmx_i - 2mc]^2$$

$$+ 4(1 - L^2 - m^2)[c - Lx_i - my_i]^2\}^{\frac{1}{2}}$$

$$\frac{\delta T_{ij}}{\delta L} = \frac{4}{V} \{(x_j - x_i(1 - 2L^2) + 2Lmy_i - 2Lc)(2Lx_i + my_i - c) \qquad (7)$$

$$+ mx_i(y_j - y_i(1 - 2m^2) + 2Lmx_i - 2mc)$$

$$- 2x_i(1 - L^2 - m^2)(c - Lx_i - my_i - 2L$$

$$(c - Lx_i - my_i)^2\}$$

$$\{2[(x_j - x_i(1 - 2L^2) + 2Lmy_i - 2Lc)^2$$

$$+ (y_j - y_i(1 - 2m^2) + 2Lmx_i - 2mc)^2$$

$$+ 4(1 - L^2 - m^2)(c - Lx_i - my_i)^2]^{\frac{1}{2}}\}^{-1}$$

$$\frac{\delta T_{ij}}{\delta m} = \frac{4}{V} \{Ly_i(x_j - x_i(1 - 2L^2) + 2Lmy_i - 2LC) \qquad (8)$$

$$(y_j - y_i(1 - 2m^2) + 2Lmx_i - 2mc)$$

$$(2my_i + Lx_i - c)$$

$$- 2y_i(1 - L^2 - m^2)(c - Lx_i - my_i)$$

$$- 2m(c - Lx_i - my_i)^2\}$$

$$\{2(x_j - x_i(1 - 2L^2) + 2Lmy_i - 2Lc)^2$$

$$+ (y_j - y_i(1 - 2m^2) + 2Lmx_i - 2mc)^2$$

$$+ 4(1 - L^2 - m^2)(c - Lx_i - my_i)^2]^{\frac{1}{2}}\}^{-1}$$

$$\frac{\delta T_{ij}}{\delta c} = \frac{-4}{V} \{L(x_j - x_i(1 - 2L^2) + 2Lmy_i - 2Lc) \qquad (9)$$

$$+ m(y_j - y_i(1 - 2m^2) + 2Lmx_i - 2mc)$$

$$- 2(1 - L^2 - m^2)(c - Lx_i - my_i)\}$$

$$\{2[(x_j - x_i(1 - 2L^2) + 2Lmy_i - 2Lc)^2$$

$$+ (y_j - y_i(1 - 2m^2) + 2Lmx_i - 2mc)^2$$

$$+ 4(1 - L^2 - m^2)(c - Lx_i - my_i)^2]^{\frac{1}{2}}\}^{-1}$$

According to the "Computational Procedure" section of said BMD publication reproduced above, in Step 1 a matrix $a_{ij}$ is formed. Applied to the present method, using the symbols L, c, m and V for the various parameters, T for determined time and E for "error" or the difference $(t - T)$ between measured time $t$ and determined time T for the Case $i$, the matrix $a_{ij}$ is written out in full as:

$$\sum_{i} \left(\frac{\delta T_i}{\delta V}\right)^2 \quad \sum_{i} \left(\frac{\delta T_i}{\delta c} \cdot \frac{\delta T_i}{\delta V}\right) \quad \sum_{i} \frac{\delta T_i}{\delta c} \cdot \frac{\delta T_i}{\delta V} \quad \sum_{i} \frac{\delta T_i}{\delta m} \cdot \frac{\delta T_i}{\delta V} \quad \sum_{i} \left(E_i \frac{\delta T_i}{\delta V}\right)$$

$$\sum_{i} \left(\frac{\delta T_i}{\delta V} \cdot \frac{\delta T_i}{\delta c}\right) \quad \sum_{i} \left(\frac{\delta T_i}{\delta c}\right)^2 \quad \sum_{i} \frac{\delta T_i}{\delta L} \cdot \frac{\delta T_i}{\delta c} \quad \sum_{i} \frac{\delta T_i}{\delta m} \cdot \frac{\delta T_i}{\delta c} \quad \sum_{i} \left(E_i \frac{\delta T_i}{\delta c}\right)$$

$$\sum_{i} \left(\frac{\delta T_i}{\delta V} \cdot \frac{\delta T_i}{\delta L}\right) \quad \sum_{i} \left(\frac{\delta T_i}{\delta c} \cdot \frac{\delta T_i}{\delta L}\right) \quad \sum_{i} \left(\frac{\delta T_i}{\delta L}\right)^2 \quad \sum_{i} \frac{\delta T_i}{\delta m} \cdot \frac{\delta T_i}{\delta L} \quad \sum_{i} \left(E_i \frac{\delta T_i}{\delta L}\right)$$

$$\sum_{i} \frac{\delta T_i}{\delta V} \cdot \frac{\delta T_i}{\delta m} \quad \sum_{i} \left(\frac{\delta T_i}{\delta c} \cdot \frac{\delta T_i}{\delta m}\right) \quad \sum_{i} \frac{\delta T_i}{\delta L} \cdot \frac{\delta T_i}{\delta m} \quad \sum_{i} \left(\frac{\delta T_i}{\delta m}\right)^2 \quad \sum_{i} \left(E_i \frac{\delta T_i}{\delta m}\right)$$

$$\sum_{i} E_i \frac{\delta T_i}{\delta V} \quad \sum_{i} E_i \frac{\delta T_i}{\delta c} \quad \sum_{i} E_i \frac{\delta T_i}{\delta L} \quad \sum_{i} E_i \frac{\delta T_i}{\delta m} \quad E_i^2 \sum_{i} E_i^2$$

it being understood that the summations are taken over all possible source-receiver pairs.

The quantities of importance to the Gauss-Newton Iteration are the diagonal terms and the entire right hand column.

The computation proceeds by choosing the most important parameter, as far as the accurate determination of T is concerned, as being the one (given in Step 2) of the four quantities:

$$\frac{\left(\Sigma E_i \frac{\delta T_i}{\delta V}\right)^2}{\Sigma \left(\frac{\delta T_i}{\delta V}\right)^2}$$

$$\frac{\left(\Sigma E_i \frac{\delta T_i}{\delta c}\right)^2}{\Sigma \left(\frac{\delta T_i}{\delta c}\right)^2}$$

$$\frac{\left(\Sigma E_i \frac{\delta T_i}{\delta L}\right)^2}{\Sigma \left(\frac{\delta T_i}{\delta L}\right)^2}$$

$$\frac{\left(\Sigma E_i \frac{\delta T_i}{\delta m}\right)^2}{\Sigma \left(\frac{\delta T_i}{\delta m}\right)^2}$$

which has the largest value. When the parameters $V$, $c$, $L$ and $m$ have all been successively readjusted to bring the sum of the error squared, $\Sigma E_i^2$, to a least value or to below a pre-specified tolerance value, the then-established parameter values represent the best fit of Equation (2) to the stratum plane being analyzed and the best estimation of velocity $V$. The parameter values then yield numerical values of strike and dip of the stratum plane by well known solid geometry relationships.

If the reflecting horizon is significantly different from a plane, the estimates of the direction and amount of dip, as well as the average velocity will be affected. The validity of the planar assumption can be tested by processing the data by halves, i.e., computing independent estimates for ($Q_1$, $Q_2$), ($Q_3$, $Q_4$), ($Q_1$, $Q_4$), ($Q_2$, $Q_3$). If these estimates are sufficiently close to the same value, the planar assumption is valid. See FIG. 3.

Due to the high degree of correlation between the dip parameters ($L$, $m$) and the velocity parameter for a single quadrant, it is impractical to estimate separate parameters ($L$, $m$, $V$) for each quadrant independently. However, due to the physical characteristics of average velocity, it is reasonable to assume that the average velocity remains essentially constant over the extend of all four quadrants even though the direction and amount of dip changes from one quadrant to the next. If data quality is sufficiently poor, it may be necessary to place bounds on the amount of change which can be tolerated in the azimuth for each of the four quadrants. This constraint can be imposed in the mathematical solution for the parameter estimates.

The following derivatives are required for the quadrant analysis. In this solution, estimates of ($L$, $m$, $c$) are obtained for each quadrant, while the velocity estimate is required to be the same for all quadrants.

The equation for the travel time $T_{ij}$ from the source to the reflecting horizon and back to the receiver is given below, where parameters ($L_1$, $L_2$, $L_3$, $L_4$), ($m_1$, $m_2$, $m_3$, $m_4$) are the respective direction cosines for each quadrant, and ($c_1$, $c_2$, $c_3$, $c_4$) are the distances perpendicular to the horizon and $V$ is the average velocity to the reflecting horizon.

$$T_{ij} = \frac{1}{V}(S^2 + P^2 + 4UW^2)^{\frac{1}{2}} \tag{10}$$

where $$S = \sum_{k=1}^{4} qk\{x_j - x_i(1 - 2L_k^2) + 2L_k m_k y_i - 2L_k c_k\}, \tag{11}$$

$$W = \sum_{k=1}^{4} qk\{1 - L_k^2 - m_k^2\}, \tag{12}$$

$$U = \sum_{k=1}^{4} qk\{c_k - L_k x_i - m_k y_i\}, \text{ and} \tag{13}$$

$$P = \sum_{k=1}^{4} qk\{y_j - y_i(1 - 2m_k^2) + 2L_k m_k x_i - 2m_k c_k\}. \tag{14}$$

($x_i$, $y_i$) is the coordinate of the ith source, ($x_j$, $y_j$) is the coordinate of the jth receiver, and $gk$ is a binary variable which assumes a value of one when the ith source and jth receiver measure a basement point that falls in the kth quadrant with zero registration for other quadrants. The sign $$\sum_{k=1}^{4}$$

in the equations (11), (12), (13) and (14) together with the binary variable qk acts as a selector of those source receiver pairs which are in a quadrant selected for computation.

The nonlinear estimation process requires that partial derivatives of $T_{ij}$ with respect to each parameter be evaluated. The functional relationships for these partial derivatives are:

$$\frac{\delta T_{ij}}{\delta V} = \frac{-1}{V^2}(S^2 + P^2 + 4UW^2)^{\frac{1}{2}} \quad (15)$$

$$\frac{\delta T_{ij}}{\delta L} = \frac{1}{V}(S^2 + P^2 + 4UW^2)^{-\frac{1}{2}} \quad (16)$$

$$(S\frac{\delta S}{\delta L} + P\frac{\delta P}{\delta L} + 2W^2\frac{\delta U}{\delta L} + 4UW\frac{\delta W}{\delta L})$$

with expressions similar to (16) for the then partial derivations with respect to m and c obtained by replacing L by the appropriate symbol.

The values of $\delta S/\delta L$, $\delta S/\delta m$ and $\delta S/\delta c$ can then be easily derived from expressions (11), (12), (13) and (14).

FIGS. 4 and 5 illustrate the essential method of the present invention wherein a pair of spaced cross patterns 40 and 42 are utilized to obtain localized data relative to a selected substratum as shown by the respective localized data patterns 44 and 46. Thus, selective source activation and reception, as between receiver line 48 and source line 50, will enable local data collection and establishment of reflection points within each of quadrants 52, 54, 56 and 58, a localized pattern relative to cross pattern 40. In like manner, selective excitation along source line 60 and receiver line 64 of cross pattern 42 will derive the local data defining reflection points within localized quadrant patterns 64, 66, 68 and 70.

An offset data pattern 72 at some point approximately intermediate the position of cross patterns 40 and 42 may then be established by selective excitation of sources of one cross pattern in conjunction with receivers of the other cross pattern. Thus, acoustic energy emanating from sources $S_1$-$S_n$ of source line 50 may be received across receivers $R_2$-$R_{2n}$ of cross pattern 42 to establish a plurality of ordered reflection points within offset data pattern 72. For purposes of illustration, corner reflection points 74 of offset data pattern 72 are shown; however, it should be understood that source energy as received at all receivers $R_2$ through $R_{2n}$ will define reflection points in essentially equal quadrature distribution, according to dip and anomalies of the selected strata, over the whole area of offset data pattern 72. Redundancy and reinforcement of this offset data pattern 72 may then be achieved by processing of the energy travelling in the reverse direction. That is, acoustic energy emanating from sources $S_2$-$S_{2n}$ of cross pattern 42 for reflection within offset data pattern 72 to the respective ones of receivers $R_1$-$R_n$ of cross pattern 40.

As can be seen from FIG. 5, a great multiplication of useful data is enabled by the employ of such as spaced cross patterns 40 and 42 with the further advantage that the additional long offset data pattern 72 is gained without necessity for moving the source-receiver positions within cross patterns 40 and 42. By way of example, the cross pattern widths, i.e. length of source line and crossed receiver line, may be on the order of 2 miles with a pre-set number of equally spaced sources and receivers contained therein; and if two such cross patterns are disposed 8 miles apart, the offset data pattern may also be gained for the substrata position halfway between the two cross patterns or approximately centered at the 4 mile designation.

The exact distances as well as exact and symmetrical relationships of individual quadrantal reflection point patterns within the local and offset data patterns will depend upon the variances as to depth, dip and velocity characteristics of the horizontal stratum under examination. In any event, it becomes readily apparent that a reconnaissance survey can be run along a survey line extending a considerable distance with but few selectively chosen and spaced cross pattern arrays. The same data as derived for the line of survey may be further reinforced by selective disposition of cross patterns at either oblique or essentially perpendicular spacing from the line of survey to further coordinate pattern data from a selected substratum over a desired breadth of terrain adjacent to or disposed on either side of the line of survey.

In the event that the distance between cross patterns 40 and 42 is too long, or if subsurface anomalies dictate, the long offset information or data pattern may be derived through well-known refractive techniques. Thus, as shown in FIG. 6, a pair of spaced cross patterns 80 and 82 are disposed on the surface of the earth to span a selected subterrain. Cross pattern 80 consists of source line 84 and a receiver line 86 and can be operated in a local mode to derive localized quadrantal pattern information from a local data pattern 88 as reflected from a selected substrata therebelow. Derivation of this data is essentially the same as that carried with respect to the method of FIGS. 4 and 5. In like manner, a remotely disposed cross pattern 82 includes a source line 90 and receiver line 92 which serve to derive localized information for the same event or horizontal substrata causing local data reflection point pattern 94.

Refractive sounding techniques may then be utilized to establish the offset information data in intermediate subterranean area 96. Thus, energy from sources $S_1$-$S_n$ of cross pattern 80 propagate to the selected substrata for refractive movement therealong and detection at receivers $R_2$-$R_{2n}$ of cross pattern 82. Redundant data may be compiled by propagation of acoustic energy from sources $S_2$-$S_{2n}$ of cross pattern 82 to the refracting horizon for return to the receiver line comprising receivers $R_1$-$R_n$ of cross pattern 80. The refractive energy return is then processed in well-known manner to derive the necessary event information which will enable establishment of an offset data pattern in the substrata area 96. If it is assured that at least one vibrator position (or preferably more) is also a receiver position, then the depth to the refractor strata at both source and receiver positions may be calculated using the least squares procedure called the TIME TERM METHOD. FIG. 1 illustrates such as the cross pattern 10 having center position 16 which includes both a source and receiver for direct depth sounding purposes.

While some analog equipmentation may be utilized in systems carrying out the present invention, digital data processing provides the most accurate and facile way of determining the requisite strike, dip, velocity information from the derived event parameters. A flow diagram outlining the program which may be utilized for control of such digital data processing equipment is illustrated in FIG. 7. Thus, referring to FIG. 7, a program 100 begins at input stage 102 which functions with a processing stage 104 to read the input measurements for a given local or offset area, which input measurements include travel times for any number of reflecting horizons, and estimates for the values of V, c, L and m. These values can be made available utilizing any of various well-known analog or analog/digital seismic signal processing equipment. Further, depending upon the phase of the method operation, the input measurements will be governed by the particular data pattern being processed, i.e. whether it is a local data information pattern or an offset data information pattern as derived between two separate cross patterns, or a combination thereof.

The output from processing stage 104 is then applied to a processing stage 106 which functions to make corrections to the input times. Processing stage 106 will make any corrections which may be necessary to the input travel times, i.e. source and receiver elevation corrections, re-insertion of $\Delta t$, elimination of times associated with a designated source or receiver position, etc. In the case of processing of refractive signal return, output from processing 106 is recycled through a stage 107 which serves to correct refraction times in one of the various well-known procedures, e.g. the TIME TERM METHOD.

The time corrected data from processing stage 106 is then applied to a pre-defined process stage 108 which serves to compute an initial estimate of c for each horizon or reflecting stratum. Thus, this amounts to computation of an estimate of perpendicular depth to the stratum selected for investigation. The output from pre-defined process stage 108 is then applied to a processing stage 110 which serves to select and store certain information relating to the processing. Processing stage 110 provides data output to temporary storage devices, which data represent an estimate of the velocity V, an estimate of the perpendicular depth c, as well as the corrected energy travel time and their related source and receiver positions. Output data from processing stage 110 proceeds through a processing stage 112 wherein data selection relative to a specific reflecting horizon is made. Stage 112 serves to read initial estimate values for the velocity V, c, L and m, and the respective travel times with their source and receiver locations for a specific reflecting horizon.

Information flow from processing stage 112 then proceeds to a pre-defined process stage 114 which serves to determine the best estimate of V, L, m and c values, this stage carrying out the standard nonlinear estimation technique. The pre-defined processing stage 114 may utilize such as the step-wise Gauss-Newton iterations, and these techniques use the function (Equation 4) as well as the partial derivatives (Equations 6 through 9) of the function with respect to each of V, c, L and m, for the respective local and offset information data patterns. An iterative solution must be utilized in order to obtain a least squares solution due to the fact that the parameters V, L, m and c are nonlinearly related.

Output from pre-defined process stage 114 then proceeds to a processing stage 116 wherein the residual time data for each iteration is written on magnetic tape. That is, the difference between the input time and the time obtained by evaluating the function (Equation 1) for an iteration. The residual times for all source-receiver paths may be optionally saved. These times may be used subsequently to provide an estimate of weathering or to test the assumption of a planar reflector. Output from processing stage 116 then proceeds to a pre-defined process stage 118 which effects determination of the direction and amount of dip for the selected reflecting horizon or stratum. This stage utilizes the final estimates of V, c, L and m to make such determinations, and this information is then output to stage 120 to provide an output record. The stage 120 provides print out of data for V, c, L, m, and dip information, as well as for residual values. The output stage 120 is also processed through a decision stage 122 to ascertain as to the completion of the processing as decision stage 122 tests for additional horizons related to the selected area. If there exists no more horizons to be processed, negative output via line 124 to the auxiliary operation stage A will serve to terminate the data processing function as this information is recycled to input connector A and lead 126 for signification to the input of processing stage 104. Alternatively, if another horizon does exist for the area, affirmative data output via lead 128 to auxiliary operation stage B will provide indication via connector B and lead 130 for restart of data processing at the processing stage 112. Thus, processing stage 112 will read next additional values of V, L, travel times, and receiver locations for the new data.

FIG. 8 illustrates another form of field array utilizing a plurality of cross pattern arrays to establish strike, dip, velocity information over a wide area while having the capability of achieving several fold redundancy as well as Common Depth Point (CDP) recording and stacking. The array of FIG. 8 consists of one continuous line of sources or source nests 140 which include equi-spaced sources $S_1$ through $S_{19}$. The source line 140 is then crossed generally perpendicularly by geophone nests within receiver lines 142, 144, 146 and 148 as disposed in equi-spaced relationship along source line 140. The length of source line 140 as well as the number and spacing of individual sources is a matter of choice, selection being dictated by availability of equipment and the exigencies of the particular applications. Similarly, the number and spacing of receivers or geophone nests would be equally alterable in accordance with requirements. In the particular illustration, it may be assumed by way of example that the individual receivers and sources are one-third mile apart such that this particular array would span a survey line length of 6 miles and a width, e.g. at more central points, of 2 miles. These dimensions can obviously be expanded or contracted as required.

Each individual source-receiver cross pattern will basically define its own basement reflection point pattern. The cross pattern consisting of receiver line 142 and sources 1 through 7 will have a localized reflection point pattern 150 disposed immediately therebelow. In like manner, SDV cross patterns including each of receiver lines 144, 146 and 148 will coact with respective ones of the adjacent sources to define the localized reflection point cross patterns 152, 154 and 156. Information derived as such would merely constitute a progression of localized cross pattern data along a selected line of survey; however, the method extends the capability of achieving data redundancy and selective Common Depth Point stacking through integral evaluation of seismic signal return from all cross pattern arrays, i.e.

a redundant integration of localized and offset reflection points along the line of survey.

The method of stacking is shown by the illustrative ray paths of FIG. 8. Thus, a reflection point A within localized reflection point pattern 154 is established and embellished not only by signal return from the local cross pattern but also by offset reflection (or refraction) data derived from the source-receiver combinations $S_{14}-R_{1,2}$; $S_{11}-R_{2,2}$; $S_8-R_{3,2}$; and $S_5-R_{4,2}$. As another example, a reflection point B lying within still another localized cross pattern 152 is established by data derived from $S_{11}-R_{1,6}$; $S_8-R_{2,6}$; $S_5-R_{3,6}$; and $S_2-R_{4,6}$.

Such stacking of reflection point signal return is effected several fold with respect to all reflection points lying along the line of survey. In addition, terrain permitting, acceptable redundancy and stacking can be achieved without the necessity for overlapping the localized reflection point patterns and by stretching out the individual cross pattern arrays. It may also occur that the method so carried out would utilize refractive signal return in establishing the offset cross pattern information. In suitable country, the reconnaissance sounding method can be carried out in very short time as compared to present surveying methods and approaches to the problem. It should be understood, too, that sources and receivers in the entire layout are obviously interchangeable if one mode of operation is more convenient than the other.

After derivation and storage of the reflection data for the various reflection points contained within a survey area, e.g. such as that shown in FIG. 8 and made up of continuous reflection point patterns 150, 152, 154 and 156, further processing can be carried out to output Common Depth Point (CDP) data or visual record for selected lines along the line of survey. That is, data can be printed out to show Common Depth Point information along the reflection point line indicated by arrow 158, and it may be extended as long as the survey progresses. The CDP information can be established for any desired line of reflection points along the survey line; for example, it may be desirable for comparison purposes to also establish a CDP record for the reflection point line 160 or any other reflection point line extending parallel thereto. The CDP information may also be output for any selected transverse or diagonal reflection point line wherein it may be deemed useful as a tool in further defining the strata under inspection.

Figure 9A:
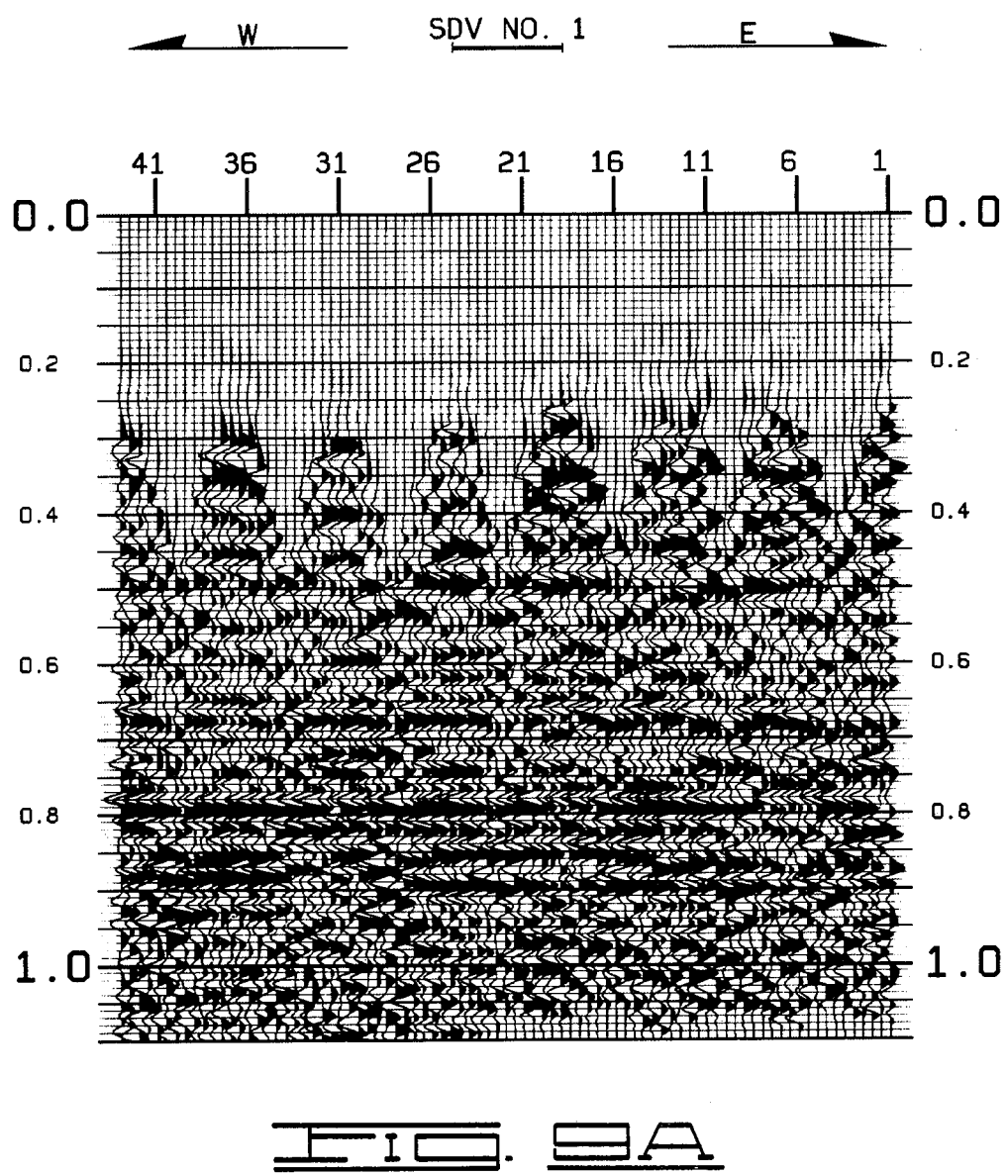
FIGS. 9A, 9B and 9C are reproductions of actual field cross-section data deplecting SDV data as compiled for adjacent rows of reflection points along a line of survey; and, FIG. 10 is a schematic representation of a reflection point swath showing various processing patterns.
Figure 9B:
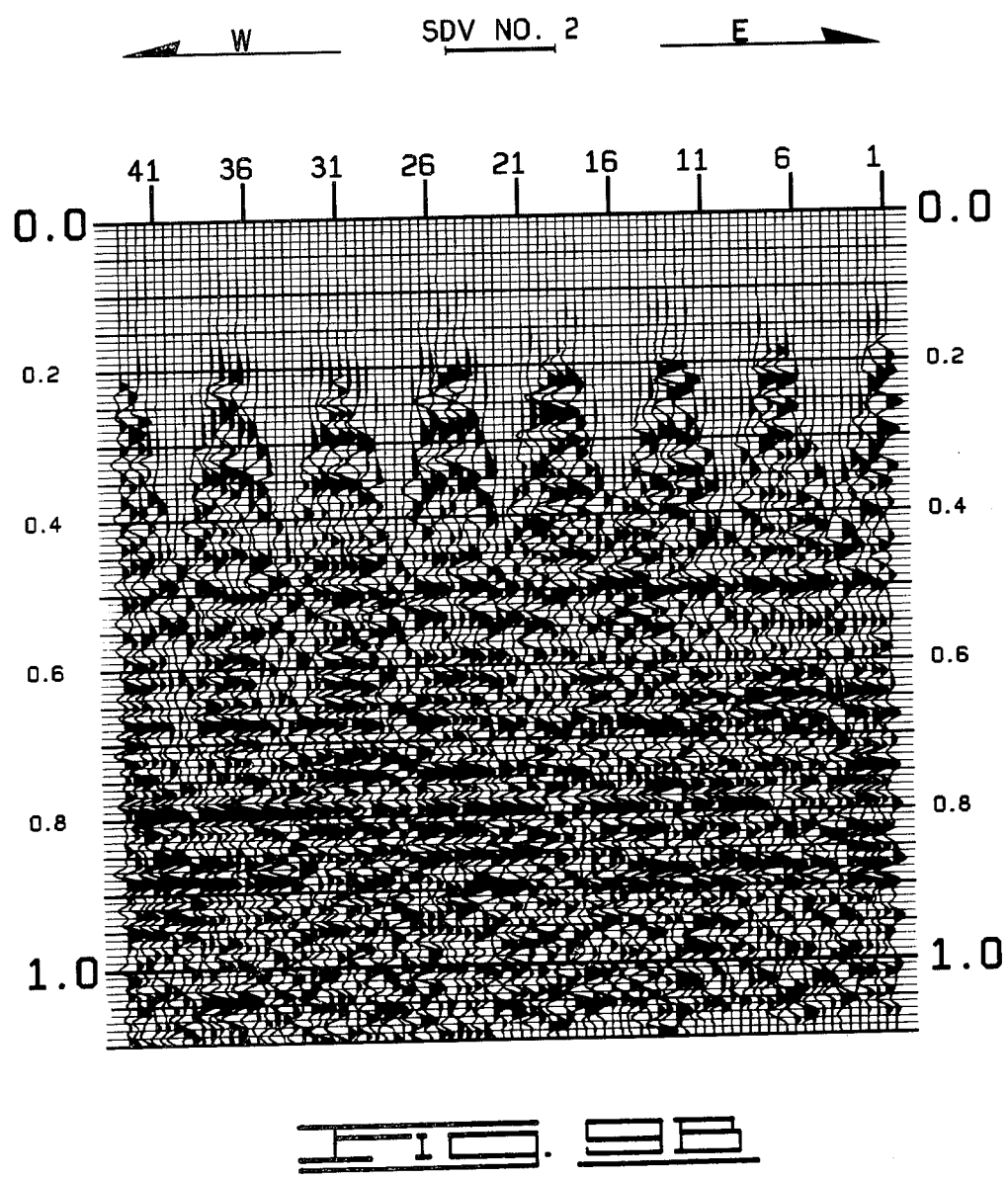
Figure 9C:
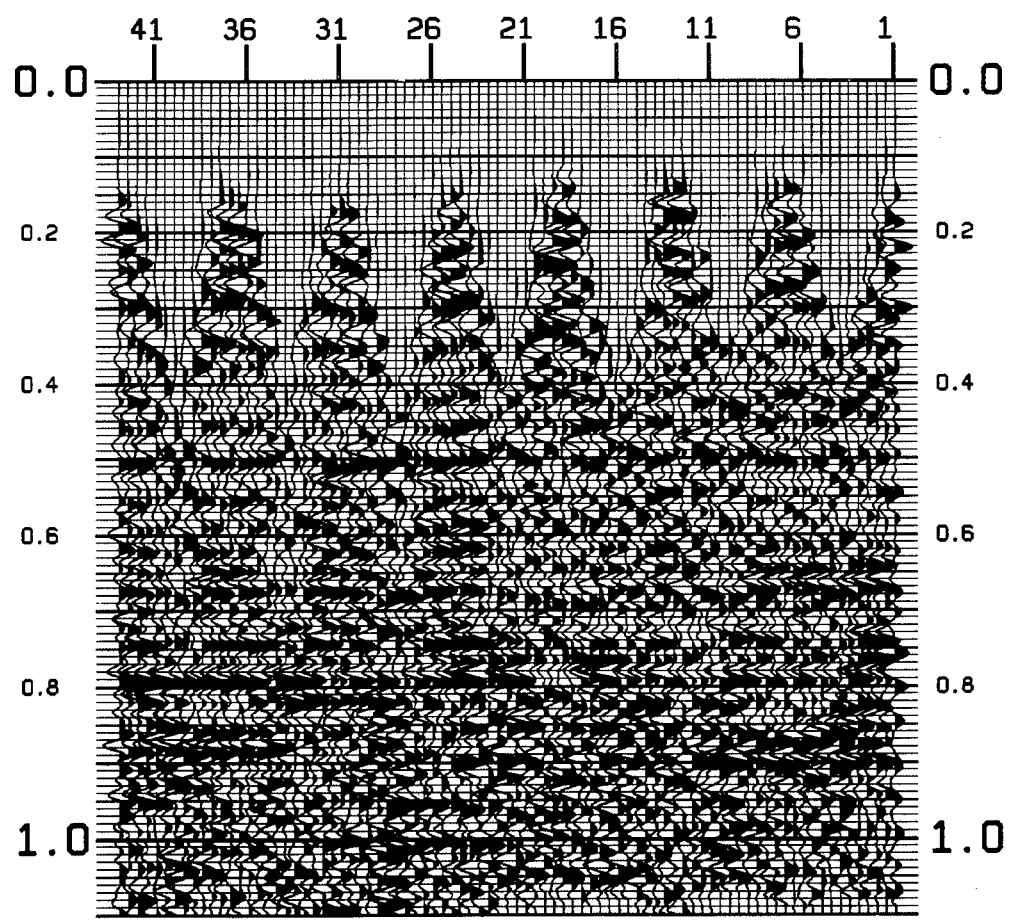

FIGS. 9A, 9B and 9C represent reproductions of actual field data as taken along a line of survey to establish a linear or two-dimensional data representation along the extent thereof. Thus, for example, the data of FIGS. 9A, 9B and 9C would be taken along parallel, equi-distance separated survey reflection point lines such as, for example, lines as indicated by reflection point lines 160, 162 and 164 (FIG. 8). As many such adjacent two-dimensional data lines can be obtained as are required for the particular survey and, in some cases, a great many of such two-dimensional data representations may be recorded for input to computer processing equipment to derive particular forms of sub-strata contour depictions, selected parameter outputting, and so forth.

After establishment of a subsurface pattern of reflection points, the data process is not restricted to evaluation of data in alignment with or directly transverse to the line of survey. FIG. 10 illustrates an expanse or swath of reflection points 170 as may be established along a survey line 171. The reflection point swath 170 is made up of a large plurality of individual reflection points 172, which reflection points 172 may be established by any number of surface-disposed SDV cross patterns operating in conjunction to define both local and offset reflection point patterns. Thus, a shifting SDV cross pattern may be utilized to establish local reflection point data at subsurface points within boundaries 174 and 176, and the progressive movement of SDV cross patterns may be carried along until such as reflection point swath 170 is fulfilled. The distance of incremental movement will, of course, be directly dependent upon the size or number of sources and receivers in the individual SDV cross patterns employed.

Reflection point construction may also be carried out by establishing a plurality of juxtaposed reflection point patterns through optimal disposition of the surface SDV cross patterns, such as the reflection point sub groups shown in boundaries 178, 180, 182 and 184. Thus, sufficient tying data common to two or more of the sub group patterns may be utilized in establishing the strike, dip, and velocity data within that overall group. In addition to the directly reflected or local data, offset information as derived from a sub group of offset reflection points is readily available for evaluation relative to data from one or more selected local patterns.

It should be understood that the reflection point groups 174 through 184 of FIG. 10 are necessarily directly related to one or an integral combination of SDV cross patterns, as the boundaries may be established for selected sub groups of such reflective points. Sub group selection may also be effected in adherence to other reflection point patterns such as the generally circular pattern of boundary 186 or the non-symmetrical pattern of boundary 188. For example, data selection may be made to establish reflection points 172 within non-symmetrical boundary 188, whether derived from offset or local information, and whether derived from in-line or obliquely aligned SDV cross patterns; and the data may be processed to determine strike, dip and velocity within that particular sub group of reflection points 172. In nearly all cases the reflection points 172 will be redundantly determined, with all of them being so determined in the overlapping SDV cross pattern case as illustrated by boundary 174 and boundary 176 and additional patterns incrementally established along line of survey 171. Establishment of redundancy requires that the separate times of arrival of received energy must be evaluated relative to the appropriate offset distance in each case.

The foregoing discloses a method utilizing plural SDV cross pattern source-receiver arrays wherein strike azimuth, dip and velocities can be established for one or more selected strata underlying the field of operation, the procedure being enabled through utilization of nonlinear estimation technique and reliance upon the fact that smooth changes of velocity will nearly always be experienced progressing from one cross pattern set up to the next. Upon smoothing of velocity values, dip and strike can be readily recalculated for any selected points within the SDV pattern coverage along a line of survey. Establishment of the SDV data will then allow further refinement and processing to output such as isochron maps of one or more selected strata to better distinguish such as fault traces, meander patterns, structural axes and the like, these determinations being enabled independent of weathering corrections in the area traversed.

A geophysical survey carried out in accordance with the present invention will enable utilization of a modified constant offset weathering determination since weathering corrections may not be separated for the same depth points. Such corrections can be compared and adjusted from residual maps made at each horizon from SDV determinations. Further, upon establishment of Common Depth Point data along a line of survey, the CDP data may be individually processed and will yield its own velocity information which is then available for further determinations as to strike, dip and related parameters.

Use of the present prospecting method makes possible the choice of any sub group from the reflection point swath of reflection points along with the determination of reflection point (sub stratum) attitude and energy velocity. It also enables the construction of lines of cross-section, all points of which are redundantly determined, so that a multiplicity of such cross-section lines are parallel to the line of survey and will represent the geology in planes which are essentially parallel but displaced perpendicularly to each other by relatively small distances. Establishment of such linear two-dimensional data enables the tracing of common geological features from one to the next and renders visible the change of character of such a feature from each cross-section to the next. The present method is operational to derive strike, dip and velocity information of continuous nature without the necessity for utilizing beam steering principles.

The method has extreme versatility in that it may be utilized for reconnaissance survey or concentrated data establishment for any of various selected substrata beneath the field of survey. In addition, a maximum of data can be acquired while necessitating a minimum of equipment movement, i.e., repeated measured relocation of surface vibrators, seisphone nests, and the like. The inherent flexibilities of digital data processing also allow for variations in SDV cross pattern alignments, i.e., variations from perpendicular or particular selected angles of array, and this feature becomes particularly important in rock or lake country and thickly wooded terrain.

An Alternative, Equivalent Analog Embodiment

It will be appreciated that the best mode contemplated for carrying out the method according to the present invention is reflected in the exemplary embodiment described above with reference to FIGS. 1–10. That embodiment utilizes a programmed digital computer, as described, for processing the data to determine the specific values of parameters which mathematically define a reflecting plane best fitting or approximating that portion of an earth stratum within a boundary containing a group of reflection points for which reflection times are obtained from either local or offset trace data. From the parameter values defining that portion of earth stratum, strike and dip of the stratum may be obtained together with the velocity of seismic energy. It is, however, not necessary in the practice of the invention to utilize a digital system for processing the data, nor is it necessary to utilize either a software program or a digital computer. One skilled in the art may readily and routinely visualize and construct, from the teachings contained in the disclosure set out above, an "analog equivalent" of the digital system for carrying out the method which has been described. To make this abundantly clear, FIGS. 13–18 illustrate a suitable analog system which may be employed to process field gathered local and offset seismic trace data, and from such data, to determine a best fit plane from which the strike and dip of a particular stratum position may be obtained — together with velocity of energy travel to and from the stratum.

General Description of Method

The present invention may be readily understood from a brief summary of the concepts providing the basis for the invention. The first concept is that the approximate configuration of some substantial portion of a stratum underlying the earth's surface may be represented by a plane. Next, such a plane, herein called a reflecting plane or horizon, may be mathematically defined by a well known equation having constants, here called parameters. Such a reflecting plane may be estimated by estimating these parameters ($c$, L and $m$) defining the plane. Further, by the known relation of distance, velocity and time ($D = V \cdot T$), the estimated reflecting plane may be fitted to the measured travel times of seismic energy transmitted between source-receiver pairs and reflected from the portion of stratum being analyzed; by changing the originally estimated parameter values, a best fit of an estimated reflecting plane to the measured travel times may be determined. The best fit plane then will represent the portion of earth stratum being analyzed, and the strike and dip of the best fit plane together with seismic energy velocity (V) used in the final determination of the best fit plane, will represent the strike and dip of that portion of earth stratum and the actual velocity of the seismic energy.

In carrying out the invention, seismic trace data is obtained which is representative of travel time of seismic energy transmitted from source to reflecting stratum to receiver of locally associated source-receiver pairs (local trace data). Further, from source-receiver cross-patterns placed in the field at spaced positions, seismic data is obtained for events reflected from a stratum underlying the earth's surface at a position intermediate to the first and second spaced positions (offset trace data) resulting from seismic energy emanating from one cross-pattern and recorded at the other cross-pattern. In carrying out the invention, the local trace data derived by each source-receiver cross-pattern is utilized to produce parameter signals representing parameters of an estimated plane common to local reflection points and by determining the best fitting reflecting plane to the measured travel times, a reflecting plane approximating or representing the stratum local to each cross-pattern is obtained. By an essentially identical separate procedure, the offset trace data is utilized to produce parameter signals representing parameters of an estimated plane common to offset reflection points and reflection times established by the offset trace data. It should also be noted that in keeping with an important aspect of the invention, local trace data and offset trace data may be obtained both of which relate to reflection points of a discrete sub-group, and where local and offset data is obtained which relates to such a reflection point sub-group, it may be utilized in combination to determine a best fit plane to the measured reflection times for that sub-group of reflection points.

Further, in carrying out the invention, the fitting of the best plane is preferably obtained by the method of least squares, a method which is per se known but particularly applicable where, as here, it is desired to infer the most probable from a number of measurements. The method of least squares involves a determination of variance values between measured travel times $t$ and determined travel times T to reflection points in an estimated reflecting plane and making the sum of the squares of the variance values E a minimum. According to the BMD publication hereinbefore mentioned, a computer program may be written which obtains a weighted least squares best fit by means of iterations on the non-linearly related parameters which in the present case are V, $c$, L and $m$. Within each iteration, parameters are selected for change in a step-wise manner. The parameter selected at a given step is the one which differentially makes the greatest reduction in the error sum of squares. While the best fit of a reflecting plane to the measured travel times by the method of least squares may be obtained with a digital computer and program as described in the BMD publication, essentially the same result may be achieved with the analog processing equipment of FIGS. 13 to 18.

Selecting and Correcting Measured Data

In the digital computer program, part of the input data is the designation of the binary variable $qk$ of Equation (11) set forth above, which enables a selection process to be carried out in the course of the program which confines the data processed to local data, offset data, or a selected combination of both local and offset data relating to a discrete group of reflection points. Thus, for example, as illustrated in FIG. 11, trace data for two selected quadrants $Q_1$ and $Q_3$, may be processed together to derive the best fit plane common to the reflection point patterns in those quadrants. In the utilization of the data with the analog equipment of FIGS. 13 to 18, to reduce the complexity of the equipment while still carrying out a counterpart step to the selection process involved in the digital computer program, selection is made from the local and offset trace data of a group of reflection point patterns and corresponding set of source-receiver pairs as a preliminary step, and only the data for the selected source-receiver pairs is tabulated in the form of FIG. 12 and thereafter utilized in the best fit plane determination to the reflection times obtained by that set of source-receiver pairs. After such data for a set of source-receiver pairs has been processed, the data is processed for another set of reflection points. The selection of reflection points in quadrants taken from both local and offset data is based upon examination of the data. The determination required to be made is the same whether a digital computer or an analog computer is utilized to process the data, and that determination is based upon examination of the trace data and assembling the reflection points into groups which should be considered together.

Referring, for example, to the upper right portion of FIG. 11, sources and receivers are arranged in an array 180 including a single source line 182 and a pair of transverse receiver lines 184. Cross patterns or arrays 185, 186 are also shown in FIG. 10 at distant positions from the first array 180. The multiple receiver line array 180 provides an arrangement for obtaining a swath of data, upon successive energization of the sources $S_7 \ldots S_{17}$ and recording of travel times for events at the receivers $R_7 \ldots R_{18}$, and the swath may be extended by setting out additional lines of receivers transversely to a survey line extending along the source line 182. Considering the cross-patterns 185, 186 of sources and receivers, it will be seen that when the sources $S_1 \ldots S_6$, $S_{18} \ldots S_{23}$ of those cross-patterns are energized and the receivers $R_1 \ldots R_6$, $R_{19} \ldots R_{24}$ operated to record time travel data as to events reflected from a selected underlying stratum, local trace data will be obtained by each cross-pattern 185, 186 relating to the quadrantal related reflection points associated with each of the cross-patterns.

In keeping with the invention, however, when a source of any one of the three arrays shown on FIG. 10 is energized, the recorders in all arrays are operated to record the events reflected from underlying stratum. This mode of operation will produce records of events reflected from offset portions of the stratum underlying earth positions between the arrays of source-receivers. For example, when the sources $S_1-S_6$ of the source-receiver array 185 in the upper left hand portion of FIG. 11 are successively energized and reflection times recorded by the receivers in the other two arrays 180, 186, trace data will be obtained as to events reflected from reflection points under earth positions intermediate the source-receiver arrays, illustratively reflection point 190 between the upper two arrays 180, 185. Thus, by sequentially energizing the sources of all three source-receiver arrays 180, 185, 186 and recording the events by the receivers of all three arrays, local and offset trace data will be obtained relating to seismic events reflected from several portions of the underlying stratum. The reflection point portions set out on FIG. 11 thus lie both in the quadrants of the cross-patterns of the arrays and within groups remote from and intermediate to the arrays. It will also be understood that the swath illustration in the upper right portion of FIG. 11 may be extended along a survey line coincident with the source line, or a combination of swaths proceeding along parallel survey lines may be provided by the addition of other lines of receivers arranged in transverse relationship to the source lines, or by shifting sets of receivers to new locations along the survey lines as the distance between sources and receivers becomes too remote for effective gathering of data. It should also be noted that a number of the reflection points which appear as local data of one array, also appear as offset data between that array and a distant array. Local and offset data is thus provided in many cases for common reflection points, which data is redundant but when utilized in the present method invention increases the reliability of the determination of a best fit plane.

FIG. 11 is intended to represent how the method of this invention may be carried out to obtain both local and offset trace data, and further to illustrate that offset data solely may be utilized in the method, or that a combination of local and offset trace data may be utilized in the method by selecting a group of reflection points for which data is available from such a combination, thereby to enable the determination of best fit planes. Further, more reliable information, or information covering a more extensive area, may be obtained with the present invention at the same time local information is obtained as to the configuration of an underlying stratum and with the same receivers and sources utilized to obtain the local information.

In carrying out the present invention with analog equipment, upon analysis of all the local and offset data gathered in the field a selection is made of a group or reflection points and corresponding source-receiver pairs for which trace data is available, and the group of reflection points may be represented by local data, offset data, or a combination of both local and offset data. Of course, the coordinates of the source and receiver, associated with any particular reflection point and measured from any arbitrarily chosen origin 0 on the earth's surface, are known from the field data. Generally speaking, a common origin 0 will be chosen for use with respect to the two or more spaced cross patterns which are involved. Thus, the source coordinates $x_i$, $y_i$ of any of the many sources, and the receiver coordinates $x_j$, $y_j$ of any of the many receivers, in the plural cross patterns are all numerically known relative to a common origin 0. The source-receiver pairs corresponding to the selected group of reflection points constitute a set which are to be considered together. The reflection point group may include multiple quadrant patterns or it may have a discrete boundary, for example, the boundary labeled B in FIG. 11. Data for the corresponding set of source-receiver pairs ($t$, $x_i$, $y_i$, $x_j$, $y_j$ for each pair) will then be assembled and tabulated, to form the basis for analysis of the stratum common to the reflection points in the group. For example, referring to FIG. 12, a partial tabulation of the travel times $t$ and $x$, $y$ coordinates for such a set of source-receivers is given. This tabulated data will then serve as the basis for setting input signals to the analog equipment for determining the best fit plane for a specific reflecting horizon, common to the reflection points of the sub-group. The tabulation of FIG. 12 is provided, for exemplary purposes and does not purport to be a complete tabulation of events for a particular group, but it is fairly representative of typical field-gathered data for an illustrative set of pairs of source-receiver combinations. For explanation purposes with regard to the values for the $x$ and $y$ coordinates of the sources and receivers in the set on the tabulation of FIG. 12, it will be seen that the $y_i$ coordinate is zero and therefore the sources $S_1$, $S_7$ and $S_{14}$ lie along the $x$ axis of the coordinate system assumed for the multiple source-receiver arrays depicted in FIG. 11. The origin of the coordinate system, it will be recognized, lies at the center of the left source-receiver array 185.

Before processing the data and making the tabulation of FIG. 12, certain adjustments are required to be made in the measured trace data to provide corrected travel times of seismic energy transmitted between the source-receiver pairs. Adjustments are required for variations in elevation of the sources and receivers so that they are brought, in effect, to a common x-y surface plane. Conventional methods may be utilized for adjusting the original recording traces for differences in elevation (and weathering) of the actual locations of seismic sources and receivers. FIG. 12 therefore represents a partial tabulation of the corrected travel times and x-y coordinates for the source-receiver pairs of a group. Such adjustments may be made manually or with the aid of analog equipment as is well known in the art, an example of such analog equipment for adjusting recording traces for "moveout" being shown in Wedenburg U.S. Pat. No. 3,077,573. In FIG. 12, the travel times are taken from traces corrected for elevation but after reinsertion of normal moveout.

In the columns of FIG. 12 headed $t_{(1)ij}$, $t_{(2)ij}$ and $t_{(3)ij}$, there are listed times for measured reflections from three reflecting stratum at different depths. It should be understood that the trace data for only one of the reflecting horizons will be considered at a time, and after a reflecting plane determined for a stratum at one depth, a reflecting horizon at a different depth may be analyzed by following the same procedure. For one of the parameters for the plane determination an estimate of the distance $c$ is required, which will be based upon average time $t_{av}$ for a selected stratum.

From the average time of arrival for each of the reflection horizons ($t_{1av}$, $t_{2av}$, $t_{3av}$) based on the data in FIG. 12, and with an estimate of velocity for each reflection horizon ($V_1$, $V_2$, $V_3$), an initial estimate of parameter $c$ may be derived;

$$c_1 = \frac{V_1 t_{1av}}{2}$$

$$c_2 = \frac{V_2 t_{2av}}{2}$$

$$c_3 = \frac{V_3 t_{3av}}{2}$$

Analog System

Figure 13:
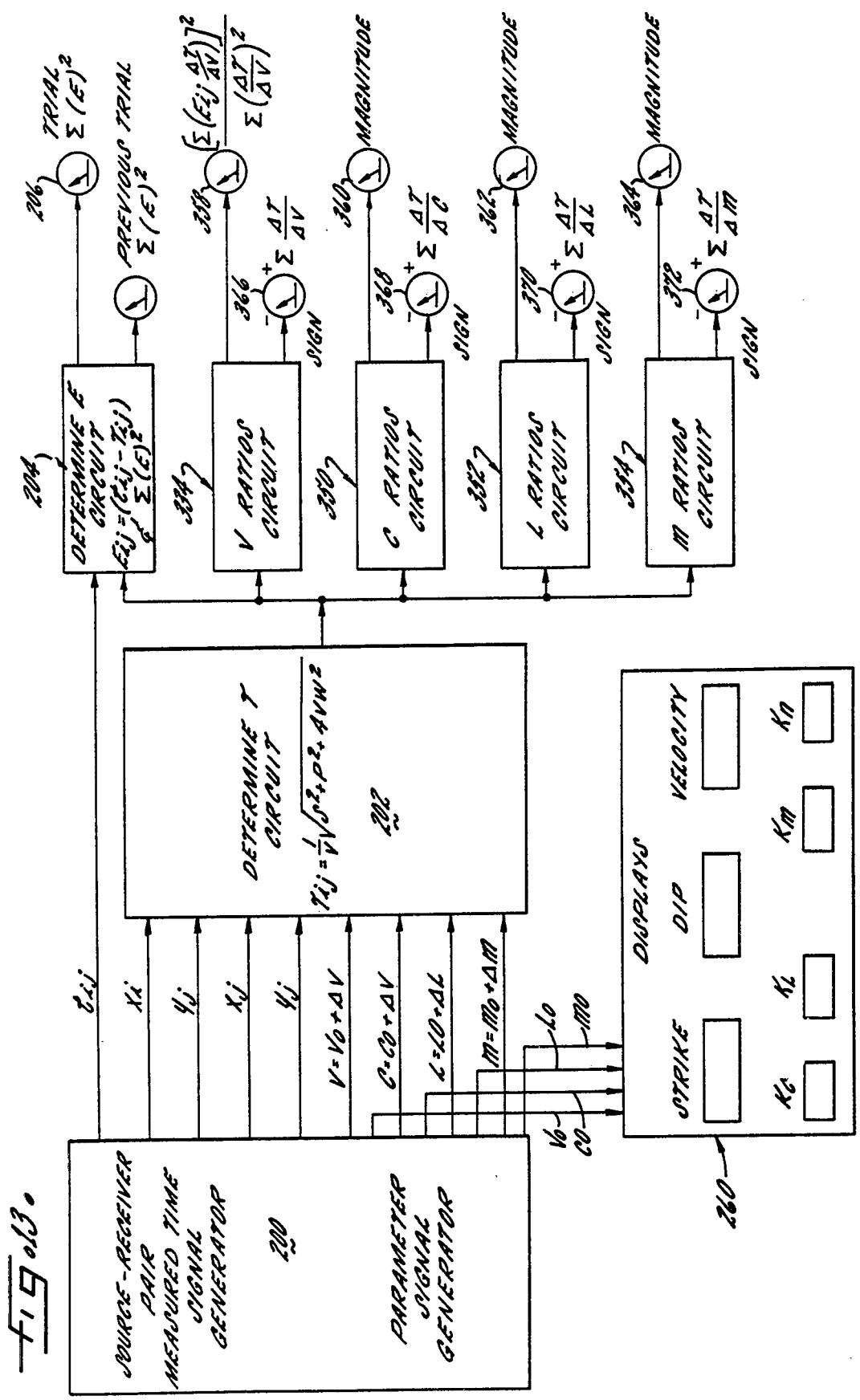
FIG. 13 is a block diagram of an analog system for carrying out the present invention.

The analog system is shown overall in block diagram form in FIG. 13. Utilizing the reflecting time data derived from a combination of local and offset trace data obtained by a given set of source-receiver pairs (a portion of which data is tabulated in FIG. 12) and specifically the time of travel $t^{(1)}$ of an event reflected from the first (shallowest) stratum, measured time of travel signals ($t_{ij}$) are generated in block 200 for each source-receiver pair of the set for which data are tabulated. For purposes of this explanation, the analog system has been shown with circuits to process signals for a total of 144 source-receiver pairs. Only a portion of the total number of circuits may be used, however, and the system can be expanded to include additional circuits if desired.

In addition to containing circuits for generating measured time of travel signals ($t_{ij}$), the block 200 contains circuits for generating signals representing the $x$ and $y$ coordinates of each source-receiver pair. Circuits are also included for generating parameter signals ($c$, L, $m$ and V) representing geometrical parameters ($c$, L and $m$) mathematically defining an estimated plane underlying the earth's surface and representing velocity (V) of seismic energy between the earth's surface and the estimated plane.

The signals representing $x$ and $y$ coordinates of each source-receiver pair, and the parameter signals (V, $c$, L, $m$) are shown in FIG. 13 transferred to a block 202 which is a Determine T circuit for producing estimated plane time of travel signals ($T_{ij}$) representing time of travel for each source-receiver pair of seismic energy reflected from the estimated plane.

In accordance with the method of this invention, error signals ($E_{ij}$) representing the difference E for each source-receiver pair between the measured time of travel signals ($t_{ij}$) and the estimated time of travel signals ($T_{ij}$) are produced by circuits in block 204, which also contains circuits for providing signals representing the sum of the error values squared $\Sigma(E)^2$ for all source-receiver pairs in a set, and the output from the circuit block 204 is supplied to a meter for visually indicating the sum of the error squared values for an iteration involving a full set of source-receiver pairs.

In carrying out the method of this invention, after an iteration for a full set of source-receiver pairs, the parameter signals produced by the circuit block 200 are adjusted by means included in the circuits in a direction to reduce the error signals (E) and the sum of the errors squared $\Sigma(E)^2$, and such adjustments are repeated after successive iterations until the error signals and the sum of the errors squared are brought to a minimum value thus providing a best fit estimated plane to the measured time of travel signals. In order to determine after each iteration which parameter should be changed and its direction of change to make the most rapid progress in obtaining the best fit estimated plane, the circuit blocks 334, 350, 352 and 354 are utilized to produce signals representing the ratios corresponding to quantities (11), (12), (13), (14) hereinbefore set forth:

$$\frac{[\Sigma(E_{ij}\frac{\Delta T}{\Delta V})]^2}{\Sigma(\frac{\Delta T}{\Delta V})^2} \quad (15)$$

$$\frac{[\Sigma(E_{ij}\frac{\Delta T}{\Delta c})]^2}{\Sigma(\frac{\Delta T}{\Delta c})^2} \quad (16)$$

$$\frac{[\Sigma(E_{ij}\frac{\Delta T}{\Delta L})]^2}{\Sigma(\frac{\Delta T}{\Delta L})^2} \quad (17)$$

$$\frac{[\Sigma(E_{ij}\frac{\Delta T}{\Delta m})]^2}{\Sigma(\frac{\Delta T}{\Delta m})^2} \quad (18)$$

Visual indications are provided on dials on devices herein shown as voltmeters 358, 360, 362, 364 of the magnitudes of said ratios (15), (16), (17) and (18), and the parameter of most importance can be selected from the voltmeter dial showing the greatest magnitude together with the direction of the required change from the "sign" indication on the voltmeter dial 366, 368, 370, 372.

Further in accordance with the method of the invention, after an iteration for a full set of source-receiver pairs, the parameter of most importance is selected and while the other parameter signals are held at constant values, then adjusted and another iteration performed, and adjusted one or more additional times, changed until the sum of the errors squared $\Sigma(E)^2$ as indicated on the voltmeter dial 206 is brought to a minimum value. The parameter of most relative importance among those remaining is then selected from the voltmeter dials 358, 360, 362, 364, and then adjusted in stepwise fashion while the other parameter signals are held constant, until the errors squared is brought to a minimum. That iteration procedure is followed for all four parameters (V, c, L and m). The entire procedure involving at each stage iteration on the most significant parameter may be repeated one or more times until a minimum value of the sum of errors squared within a predetermined tolerance factor is obtained. The best fit plane is then defined by the values of the parameters which have been reached as the final outcome of the iteration procedure, and from those parameter values can be obtained by conventional solid geometry techniques the attitude of the best fit plane which is the angle of the plane relative to a horizontal plane herein called "dip", and the azimuth of the plane which is its direction herein called "strike". The final parameter values c, L, m and n may be directly displayed on a digital display panel 260 (FIG. 13), if desired, together with strike, dip and the value of velocity used in the best fit plane determination.

During the digital processing of data described in an earlier section hereof, computations are made with the digital equipment of the partial derivatives of calculated time (T) with respect to each of the variable parameters V, c, L, m, and these partial derivatives $\delta T/\delta V$, $\delta T/\delta c$, $\delta T/\delta L$ and $\delta T/\delta m$ are utilized in the computational process to select the parameter to be changed in the stepwise iteration to obtan a best fit plane. In the determination made with the analog equipment described herein, the value of time T is determined directly and the ratios utilizing the partial derivatives of time T in the digital computation are provided by making the assumption that the partial derivative with respect to velocity can be replaced $\Delta T/\Delta V$; that is, the incremental change of T produced by an incremental change of V. In this determination, the signals representing c, L and m are held constant.

In a similar manner, $\delta T/\delta c$ is replaced by $\Delta T/\Delta c$, this quantity being determined while V, L and m are held constant. Likewise, $\delta T/\delta L$ and $\delta T/\delta m$ are replaced by $\Delta T/\Delta L$ and $\Delta T/\Delta m$, respectively, and are determined while the other variables are held constant. Signals representing these quantities which replace the partial derivatives of time with respect to each of the variable parameters, are utilized in the ratios circuits 334, 350, 352 and 354 appearing on the right hand side of FIG. 13.

Source-Receiver Pair Measured Time Signal Generator

For producing measured time signals representing measured time of travel of an event transmitted from a source to a receiver of the same pair and reflected from a reflection point at a selected stratum, together with signals representing the x and y coordinates for the source-receiver pair, a circuit represented at block 200 in FIG. 13 is provided, which circuit is detailed in FIG. 15a. Since for each iteration, to define the fit of an estimated plane to the time of travel data requires signals representing the measured time $t_{ij}$ and the x and y coordinates for each receiver pair, the circuit detailed in FIG. 15a provides means for pre-establishing the signals for all source-receiver pairs of a set from corrected field data so as to supply them to the analog system when required in the iteration procedure. Thus, by means of the circuit detailed in FIG. 15a, as a preliminary matter the measured travel times for all source-receiver pairs of a full set (e.g., 144 pairs) may be set up before the overall circuit is started in operation, and by means of timing signals produced from a timing generator shown in FIG. 14, signals from the source-receiver measured time signal generator are gated into the analog system when required in the iteration procedure.

Thus, referring to FIG. 15a, a bank of potentiometers 230 labeled the "t bank" is provided, each being manually adjustable to set the magnitude of its output voltage so as to represent measured time $t_{ij}$ for a corresponding source-receiver pair at respective coordinates $x_i$, $y_i$, $x_j$, $y_j$. The measured time of travel data is obtained from a tabulation based on field data and such as shown in FIG. 11. Each potentiometer 230 in the bank (which for 144 source-receiver pairs would have 144 such potentiometers) is shown as having a voltmeter 231 for visually representing the voltage appearing at the potentiometer wiper. It will be recognized that for convenience a voltmeter has been shown connected to each potentiometer wiper. A single voltmeter could be switched to each potentiometer wiper as it is being adjusted, if desired. The conductors leading to each potentiometer wiper are labeled $t_1 \ldots t_{144}$, this representing that the voltage appearing on the conductor is set by adjustment of the wiper to represent the measured time of travel for the corresponding source-receiver pair in the full set of 144. The magnitude of the dc. voltage utilized to represent time of travel is on the order of 1 to several volts dc, with the units being 1 volt = 1 second of time. Referring to FIG. 14, for the shallowest reflecting plane or horizon, it will be seen from the tabulation that for the source-receiver pair $S_1$, $R_1$ the time $t_{ij}$ is 1.039 seconds, which by the corresponding potentiometer of the $t$ bank would be represented by 1.039 volts dc.

It will be seen from FIG. 15a that the conductors connected to the wipers of the potentiometers of the $t$ bank transfer the signals from the potentiometers through gates $G_1 \ldots G_{144}$ to an output line (1), labeled $t_{ij}$ to represent the signal appearing on that line. The measured times ($t$) for all source-receiver pairs of the set are successively transferred from the potentiometer $t$ bank to the output line (1) in a sequence determined by the operation of the gates $G_1 \ldots G_{144}$, which will be described in greater detail hereinafter in the description of the operation of the system.

It will be seen, however, that a similar set of gates $G_1 \ldots G_{144}$ are included in each of four additional banks of potentiometers labeled $x_i$ bank, $y_i$ bank, $x_j$ bank and $y_j$ bank. The potentiometers 232 of the $x_i$ bank are provided for establishing on the conductors connected to the wipers of the respective potentiometers, signal voltages representing the $x$ coordinates of each of the sources of the 144 sets of source-receiver pairs. Similarly, the potentiometers 234 of the $y_i$ bank provide means for providing signal voltages representing the $y$ coordinates of each of the sources of the 144 pairs. The potentiometers 236 of the $x_j$ bank and the potentiometers 238 of the $y_j$ bank provide, respectively, means for providing signal voltages representing the $x$ and $y$ coordinates of the receivers of each source-receiver pair of the entire 144 sets. As with the potentiometers 230 of the $t$ bank, each potentiometer of the $x$ and $y$ banks has associated therewith a voltmeter to represent visually the voltage obtained on the conductor leading from the wiper and representing the particular coordinate.

As indicated in the tabulation of FIG. 11 the $x$ and $y$ coordinates may be established in feet. As shown, the $x$ coordinate of the source $S_1$ is minus 1600 feet. The magnitude of output voltages from the $x_i$ bank potentiometers may be on the order of 1 volt = 1000 feet and thus the corresponding potentiometer of the $x_i$ bank for the source-receiver pair $S_1$-$R_1$ (the first line of entries on the tabulation of FIG. 11) would be set to produce from the potentiometer a dc. voltage with a magnitude of $-1.6$ volts.

It will be recognized that the other potentiometers of the $x$ and $y$ banks are similarly set from the complete tabulation of $x$ and $y$ coordinates determined in the field by the surveying team laying out the cross patterns of sources and receivers so that the source-receiver signal generator circuit of FIG. 15a may be set up as a preliminary matter to have the signal voltages representing the coordinates of all sources and receivers of all pairs, available for transfer into the analog system when required in the iteration procedure under the control and guidance of the timing generator.

It should also be recognized that where as shown in the tabulation of FIG. 11, time of travel is determined for events reflected from successively deeper reflecting horizons, the $x$ and $y$ coordinates of the source-receiver pairs will be the same. Thus, the $x$ and $y$ banks of potentiometers may be set up to represent the $x$ and $y$ coordinates of all source-receiver pairs, and only the $t$ bank of potentiometers will require adjustment in using the analog system to determine a reflecting plane for each of the successively deeper reflecting horizons.

It will also be seen from FIG. 15a that the gates $G_1 \ldots G_{144}$ are arranged similarly for all of the potentiometer banks. This means that the output lines (1), (2), (3), (4) and (5) which carry the signals $t_{ij}$, $x_i$, $y_i$, $x_j$, $y_j$, carry the set of signals associated with any one of the source-receiver pairs. The particular source-receiver pair represented by the signals on the output lines (1) ... (5) will be established by the gating circuits $G_1 \ldots G_{144}$, which are supplied, respectively, with gating signals on the input conductors labeled $S_1 \ldots S_{144}$, which are the output conductors $S_1 \ldots S_{144}$ from the binary to absolute count decoder 240 of the timing generator detailed in FIG. 14.

Parameter Signal Generator

For each iteration, signals representing estimated plane parameters values are also required. For providing such parameter signals, a parameter signal generator circuit detailed in FIG. 15b is provided. This circuit is also arranged to be set up as a preliminary matter, so that the magnitudes of the parameter signals may be established and the signals gated into the analog system when required in the iteration procedure. As shown in FIG. 15b, a bank of potentiometers 242, arranged in pairs for each of the parameters V, c, L, m provides means for producing signals representing the parameters and parameter increments. Since velocity will always be a positive number, the potentiometer for producing a signal voltage representing the parameter V may be adjusted to produce a positive voltage of a magnitude representing the velocity parameter. The other parameters c, L and m may be positive or negative, and hence the potentiometers for producing signal voltages representing those parameters are bipolar potentiometers, as shown, as is the potentiometer for producing the signal voltages representing all incremental values for all parameters.

Thus, by adjusting each one of the wipers of the bank of potentiometers 242, signal voltages of the requisite magnitude may be provided and transferred into the analog system under the control of the gating circuits shown in FIG. 15b. It will also be observed that signal voltages from the pairs of potentiometers 242 associated with each parameter, are supplied to an operational amplifier 244, 246, 248, 250 of a conventional type for summing the voltages applied to its input terminals.

Referring to the operational amplifier 244 associated with the velocity parameter potentiometers, it will be recognized that the output from this particular operational amplifier 244 will either be $V_o$, or the sum $V_o + \Delta V = V$, depending on whether or not the signal voltage representing $\Delta V$ is transferred from the $\Delta V$ potentiometer 242 to the input terminal 245 of the operational amplifier 244. The gating circuit associated with the $\Delta V$ potentiometer 242 is so arranged that when the voltages are low on lines $SS_3$ and $SS_4$ leading through the OR gate, the gate 252 is enabled which connects ground or a zero voltage to the input terminal 245 of the operational amplifier 244, and the gate $G_V$ is disabled, thus blocking the transfer of any $\Delta V$ voltage to the summing amplifier 244. With low voltages on lines $SS_3$, $SS_4$, therefore the output from the summing amplifier 244 will be the voltage derived from the $V_o$ potentiometer 242, and will represent in magnitude a velocity estimate of the value $V_o$.

Likewise, examining the circuits associated with the parameter c, it will be observed that when the lines $SS_5$, $SS_6$ carry a low voltage, the output from the summing amplifier 246 will be the voltage $c_o$ as established by adjustment of the wiper of the c potentiometer 242. When either input lines $SS_5$ or $SS_6$ carry a high voltage, the summing amplifier 246 associated with the parameter c will operate to sum two input voltages $c_o + \Delta c$, and produce a signal on its output terminal (7) representing the sum. The gating circuits associated with the L and m parameter potentiometers, are operated in a similar manner, depending on the signals carried over the timing conductors $SS_7$, $SS_8$ and $SS_9$, $SS_{10}$, respectively. These timing lines $SS_3 \ldots SS_{10}$ represent output lines from the binary to absolute decoder 254 and the timing generator detailed on FIG. 14.

In the operation of the analog system, signal voltages representing estimated values of the parameters V, c, L and m are utilized during each iteration for a set of source-receiver pairs. The potentiometer bank of potentiometers 242 in the parameter signal generator circuit are arranged such that the voltages representing these parameters are obtained from the potentiometers $V_o$, $c_o$, $L_o$, and $m_o$. To change these parameter-representing voltages involves movement of the wipers associated with the potentiometers $V_o$, $c_o$, $L_o$ and $m_o$. In the iteration procedure there is also required signals representing increments of change in these parameters. Such signal voltages are provided by the potentiometers $\Delta V$, $\Delta c$, $\Delta L$ and $\Delta m$. Once these $\Delta$ potentiometers have been set, they will not normally be changed unless the operator desires to change the partial differentiation approximation carried out by the analog system circuitry. As representative values, the $\Delta$ potentiometers will be set to provide an increment of 0.1 volt, representing an increment of one hundred feet per second to the velocity parameter, 100 feet to the distance parameter c, and 0.1 in the range of 0 to 1 in the direction cosine parameters L and m.

In summary, in carrying out the method of this invention with the analog system, signals are produced with the parameter signal generator representing estimated values for the parameters V, c, L and m defining an estimated reflecting plane common to a sub-group of reflection points for which reflection times are available from a set of source-receiver pairs. These reflection times may be established by local trace data, by offset trace data, or by a combination of local and offset data. The method entails comparing the signals representing estimated travel times of reflections from the estimated plane with signals representing the measured reflection times from the actual stratum. It can be seen that if there were no differences between the estimated travel time signals and the measured travel time signals for reflections measured by a number of source-receiver pairs, the estimated reflecting plane would precisely represent directly the configuration of the underlying stratum. In carrying out the method of this invention, by adjusting the parameter signals so that the differences are brought to a minimum value, a close approximation or best fit of the reflecting plane of the measured data can be obtained. The parameter signal generator provides analog equipment for establishing the original estimate of the parameter values and for making the requisite parameter value adjustments to carry out the method.

Determine T Circuit

Referring again to the overall block diagram in FIG. 13, the center circuit block 202 represents that circuit detailed in FIGS. 16a and 16b and utilized in the method of this invention for determining estimated time of travel signals $T_{ij}$. These signals are herein called estimated time of travel signals since they depend upon estimates of velocity and estimates of the mathematical parameters c, L and m defining the estimated plane. The circuit block 202 receives parameter signals from the parameter signal generator and signals from the source-receiver pair measured time generator, and from those signals determines the estimated time of travel signals $T_{ij}$ for each source-receiver pair.

How the determination $T_{ij}$ for each source-receiver pair is made with the analog equipment can be seen by reference to FIG. 16a which at its left hand edge shows the input conductors (2), (3), (4), (5) which are the like numbered output conductors from the source-receiver pair measured time generator detailed in FIG. 16b. This set of input conductors (2), (3), (4) and (5) provide for each source-receiver pair signals representing the coordinates $x_i$ and $y_i$ for the source $S_i$, and the $x_j$ and $y_j$ coordinates of the receiver $R_j$. The other input conductors required for the Determine T circuit are at the left hand side of FIG. 16a and include conductors (6), (7), (8) and (9) which are like numbered output terminals from the parameter signal generator detailed in FIG. 15b. As the legends on the input conductors (5), (7), (8) and (9) indicate, these conductors carry signals from the parameter signal generator representing the parameters V, c, L and m.

It will be noted that the conductor (1) designated as carrying signals representing $t_{ij}$ at the left hand side and at the top of FIG. 16a, is the output conductor (1) also from the source-receiver pair measured time generator and carries measured time of travel signals $t_{ij}$, and this conductor (1) extends without interruption across FIG. 16a and is shown as an output conductor (11). Thus, the measured line signals $t_{ij}$ are not utilized in the Determine T circuit shown in FIG. 16a.

For facilitating this explanation, the analog circuit "Determine T" can be viewed as comprising three separate input sections at the top, center and lower portions, respectively, of FIG. 16 for producing signals representing the values s, p and $4uw^2$. The full equation represented by s is a portion appearing within the brackets on the first line of Equation (4) for $T_{ij}^2$ given in an earlier section thereof, while the equation represented by p as fully set forth on FIG. 16a is found within the brackets on the second line of Equation (4). Similarly, $4uw^2$ represents the portion in the third line of Equation (4) set forth in an earlier section thereof. From FIG. 16a it will also be seen that dc. signals representing s and p are each carried into a squaring amplifier which on its output provides signals representing $s^2$ and $p^2$, respectively. Those signals and the signals representing the expression $4uw^2$ are input signals to a summing amplifier 264 and the output of the summing amplifier 264 is carried to a multiplier 266. The other input to the multiplier 266 receives a signal voltage representing the quantity $1/V^2$ which is obtained from the input terminal (6) carrying a voltage representing V through a squaring amplifier and reciprocal amplifier to provide a voltage representing the input $1/V^2$ to the multiplier 266. The output from the multiplier 266 is carried to a square foot amplifier and thence to an output conductor (10) which thus carries a signal voltage representing estimated time T.

It will be recognized that all the input conductors to the Determine T circuit on FIG. 16a will be energized together to produce an output signal T representing estimated time of travel for a particular source-receiver pair. The source-receiver pair is uniquely identified by the signals on the input conductors (2), (3), (4) and (5) representing the $x$ and $y$ coordinates of the source and receiver of that particular pair. It will also be recognized that in the method of this invention, the iteration procedure involves sequentially supplying such signals uniquely representing each source-receiver pair to the Determine T circuit. Thus, the output signal on the conductor (10) and representing T, changes as the signals uniquely representing the source-receiver pair change. The timing of each iteration step is determined by the timing generator of FIG. 15, but for any given source-receiver pair it can be seen that in deriving signals representing the quantity $s$, the signals are required representing $x_j$, $x_i$, $L^2$, $L$, $m$, $y_i$ and $c$ which are the $x$ and $y$ coordinates of the source of a source-receiver pair and the $x$ coordinate of the receiver of the same pair, and the parameters mathematically defining an estimated plane. The signals representing the $x_j$ coordinate of the receiver $R_j$ is provided by the input conductor (4) which leads to the summing amplifier 268 directly. The signal representing the $x_i$ coordinate of the source $S_i$ is obtained directly from the input conductor (2) which leads directly to an inverting terminal of the summing amplifier 268. The estimated plane parameter L appears in the equation represented by s, first as $L^2$, and is obtained from the input conductor (8) and a squaring amplifier 270 and as a signal voltage $L^2$ is carried to a multiplier 272 for multiplication by the constant 2 to produce a voltage representing $2L^2$ at the output of the multiplier 272. The signal representing $2L^2$ is supplied to the multiplier circuit 274 which at its other input terminal receives a signal representing $x_j$ so as to produce at its output terminal a signal representing $x_j \, 2L^2$ which is carried to a non-inverting input terminal of the summing amplifier 268.

Incidentally, for the sake of brevity and simplicity, the well-known operational amplifiers shown in FIGS. 13–18 have been purposely illustrated with a conventional feedback connection omitted. Multiple input operational amplifiers are well known and conventional in the art and are available with both non-inverting and inverting input terminals, as shown for example on the input side of the operational amplifier 268 in the circuit for deriving voltages representing the quantity $s$.

The other voltages required to complete the inputs to the summing amplifier 268 are voltages representing the quantity 2L and $y_i$ obtained as shown on FIG. 16a from input conductors (3), (8) and (9). Thus, from the input conductor (3) a signal representing the $y_i$ coordinate of the source $S_i$ is supplied as one input to a multiplier circuit 278 which receives as its second input a signal from the input conductor (9) representing the parameter $m$. The output from the multiplier circuit 278 is passed to one input of a multiplier circuit 280, the other input to the circuit 280 being derived from the output of a multiplier 282 which serves to multiply a constant 2 and a signal representing the parameter L obtained from the input conductor (8).

The other input to the operational amplifier 268 is a voltage representing the quantity 2Lc obtained from the multiplier circuit 284 which receives on its input terminals a voltage representing the parameter $c$ from the input conductor (7) and a voltage representing the product of the parameter L and the constant 2 obtained from the output of the multiplier circuit 282.

To carry out the method of this invention, the Determine T analog circuit also provides means for deriving a voltage representing the quantity $p$ and including an operational amplifier 290 having five inputs. Voltages supplied to two of those inputs representing the $x_i$ coordinate of the source $S_i$ and the $y_j$ coordinate of the receiver $R_j$ are obtained directly from the input terminals (2) and (5), respectively. Another input to the operational amplifier 290 supplied in the inverting mode represents the quantity $2m_c$, obtained from a multiplier 292 supplied on its input terminals with voltage representing the parameters $c$ and $m$ from the input terminals (7) and (9), respectively. The output from the multiplier 292 is supplied as one input to the multiplier 294 the other input comprising a voltage representing the constant 2 and the output from the multiplier 294 is supplied to an inverting input to the summing amplifier 290. The voltage representing the quantity $2LMX_i$ is supplied to a non-inverting input of the amplifier 290 from a multiplier circuit 296 having two inputs, one representing the $x_j$ coordinate of the source $S_i$ obtained from the input terminal (2), and the other obtained from a multiplier circuit 298. The multiplier circuit 298 has two inputs in the form of voltages representing the parameters $m$ and L with the latter having been multiplied in the multiplier 282 by the constant 2 to provide the requisite voltage representing the quantity 2L. The voltage representing $m$ is obtained from the input conductor (9).

Also supplied to a non-inverting input terminal of the operational amplifier 290 is a voltage representing $y_j^2 m^2$ derived from the multiplier 302. One input of the multiplier 302 is a voltage representing the $y_i$ coordinate of the source $S_i$ obtained from the input terminal (3). The other input to the multiplier 302 is a voltage representing the quantity $2m^2$, $m$ being one of the estimated plane parameters and a signal representing $m$ being supplied from the input terminal (9), and through the squaring amplifier 304 to provide a signal representing $m^2$ and through the multiplier 306, having as its other input a voltage representing the constant 2, to supply the requisite voltage representing $2m^2$ for input to the multiplier 302.

Now turning to the lower portion of the FIG. 16a circuit which provides circuit components for deriving signals representing the quantity $4uw^2$ required for the method of this invention, the voltage representing the quantity $u$ is obtained from an operational summing amplifier 310 having an input supplied with voltages representing the constant 1 and two inverting inputs supplied with voltages representing the quantities, respectively, $L^2$ and $m^2$. These parameter voltages are obtained from the terminals 270 and 304, respectively. Voltages representing the quantity $w$ are provided by the operational amplifier 312 which has supplied to its two inverting inputs voltages representing expressions $LX_i$, obtained from the multiplier circuit 314 with two inputs supplied respectively from terminals (8) and (2) which provide signals representing the parameter L and the $x_j$ coordinate of the source $S_i$, respectively. The other inverting input to the operational amplifier 312 is supplied with a voltage representing the quantity $my_i$, derived directly from the output of the multiplier circuit 278. After operation by the squaring amplifier circuit 314 providing at its output a voltage representing the quantity $w^2$, the voltage representing $u$ and $w^2$ are supplied as inputs to the multiplier circuit 316 and after operation on the output signals from the multiplier circuit 316 and the multiplier 318, a signal representing the quantity $4uw^2$ is provided for input to the summing amplifier 264.

To summarize briefly, the Determine T circuit is utilized in carrying out the method of this invention to produce estimated time of travel signals $T_{ij}$ for each source-receiver pair. During the iteration procedure, signals representing the coordinates of each source-receiver pair are fed to the Determine T circuit, and as the coordinates change, the output signal $T_{ij}$ will change. The successive steps of an iteration procedure are, as mentioned above, carried out under the control and direction of the timing generator shown in FIG. 13.

Determine E Circuit

In carrying out the method of this invention, the analog system is utilized to produce error signals representing the difference for each of the source-receiver pairs between measured time of travel signals $t_{ij}$ and estimated time of travel signals $T_{ij}$. The circuits for producing the error signals E are shown in FIG. 16b, and include an operational amplifier 320 having the measured time of travel signals $t_{ij}$ supplied from the input conductor (11) to an non-inverting input and the estimated time of travel signals $T_{ij}$ supplied to an inverting input from the input terminal (10), which is the output terminal (10) from the Determine T circuit detailed on FIG. 16a and described in the preceding section. Assuming signals $t_{ij}$ and $T_{ij}$ for a source-receiver pair $S_i$, $R_j$, the output from the operational amplifier 320 will represent the difference $E_{ij} = t_{ij} - T_{ij}$. In the step-wise iteration procedure, known as the method of least squares, preferably followed in carrying out the method of this invention, the error signal $E_{ij}$ is squared in the squaring amplifier 322 and is supplied to an accumulator 324 designated as a summing and storing circuit, which sums the squared error signals $E_{ij}^2$ produced for each of the source-receiver pairs.

Summing and Storing Circuit

Since the internal circuitry for the summing and storing circuit, herein also called an accumulator since that is its primary function, is the same as utilized in other summing and storing circuits in the analog system, for example, the circuits 328, 330 and 332 in the V ratios circuit 334, such internal circuitry will be briefly summarized with reference to FIG. 17 which shows in detail the internal circuitry. Where the circuits such as circuits 328, 330 and 332 are labeled in the analog system "summing and storing circuit", it can be assumed that this same internal circuitry detailed in FIG. 17 is utilized.

The summing and storing circuit 324, shown in FIG. 17b in block diagram form, serves to sum signals appearing on its input terminal 340 under the control of timing signals received at its enter input (A). Thus, the voltage appearing at the input terminal 340 when a timing signal is supplied to the enter terminal (A) is gated into the summing and storing circuit and summed with voltages previously entered, and a voltage representing the sum appears at the output terminal 342. Referring to FIG. 17a the input signals on the conductor 340 are supplied to the inverting input of an operational amplifier 343.

The output from the operational amplifier 343 is inverted and supplied to the gate $G_e$ which is normally disabled. When a timing pulse is received at the enter terminal (A), the gate $G_e$ is opened to carry the input signal designated $E_{n+1}$ in FIG. 17a to a sample and hold circuit 344, such that after the timing signal has been removed from the enter terminal (A) and the gate $G_e$ closed, the output from the sample and hold circuit 344 will remain as the input voltage $E_{n+1}$. The output of the sample and hold circuit 344 is carried to the sample and hold circuit 346 through a normally enabled gate G so that the output of the second sample and hold circuit 346 will normally be the same as the output of the first sample and hold circuit 344. When a next timing pulse is received at the enter terminal (A), however, the timing pulse enables the gate $G_{add}$, and disables the input gate G to the sample and hold circuit 346, so that the voltage appearing at the output of the sample and hold circuit 346 is routed to the input to the operational amplifier 343 and added to the incoming voltage $E_{n+2}$. Thus, the output from the operational amplifier 343, after the second timing pulse is received at the enter (A) terminal, is the sum of the first voltage entered $E_{n+1}$ plus the second voltage entered $E_{n+2}$, and after that output voltage is inverted and gated through the gate $G_e$ which is enabled by the same timing pulse, the sum voltage will be transferred to the input of the first sample and hold circuit 344, and appear at its output terminal as the sum of the voltage $E_{n+1} + E_{n+2}$. When the timing pulse is removed from the enter terminal (A), thus disabling the input gate $G_e$ to the first sample and hold circuit 344, that circuit 344 will hold the sum voltage on its output terminal. Therefore, as the timing pulses are successively received at the enter terminal (A) to the summing storage circuit 324, the error voltage E appearing on the input terminal coincident with the arrival of the timing pulse will be added to the sum of the error voltages previously entered and held in the sample and hold circuit 344, and thus will appear as the sum at the output terminal 342.

When the circuit 324 is utilized in the Determine E circuit in the top portion of FIG. 16c, the voltages supplied to the summing and storing circuit 324 represent $E_{ij}^2$, that is, the square of the error signals. Thus, the output of the summing and storing circuit in the Determine E circuit will represent the sum of the error squared, and that output from the terminal 342 will be supplied to means such as a voltmeter for visually indicating the magnitude of the sum of the error squared. The summing and storing circuits 324 in addition to the input and output terminals hereinbefore mentioned, also include the reset terminal R. A pulse supplied to the reset terminal R enables the reset gate $G_r$ which supplies a zero voltage to the input of the sample and hold circuit 344 to clear the sample and hold circuit of any accumulated voltage, and through the connection to the second sample and hold circuit 346 will also clear that circuit of any accumulated voltage. When the reset pulse is removed from the terminal R, it disables the reset gate $G_r$ and the circuit is cleared for operation.

Iteration Procedure

It will be understood from the description hereinbefore set forth, that the method of this invention begins with the placing of seismic sources and receivers in a crossed-line array at each of a number of spaced locations on the earth's surface such that local trace data is obtained by the locally associated sources and receivers, and offset data is obtained establishing reflection times for events reflected from reflection points in a sub group at a portion of the stratum underlying an intermediate location. From the recorded energy data, measured time of travel of events reflected from portions of the stratum selected for analysis will be provided for source-receiver pairs of a selected set. The sub group of reflection points at a portion of the stratum and the corresponding set of source-receiver pairs, are selected as a preliminary step based upon examination of all the trace data and a determination that certain portions of a strata should be analyzed together, and other portions should be analyzed separately. The analog system disclosed herein is shown with circuits for processing the collected data obtained by a set of up to a total of 144 source-receiver pairs, however, the system can be readily expanded to accommodate a larger number set of source-receiver pairs, if desired, and is fully functional as shown for a set havig fewer source-receiver pairs.

In carrying out the method of this invention, the data relative to the source-receiver pairs is processed in sequence. The sequence begins with any given source-receiver pair $S_i$, $R_j$ in the selected set at their locations identified by coordinates $x_i$, $y_i$ and $x_j$, $x_j$, respectively. It will be appreciated that a common origin 0 is chosen for all the source receiver arrays and the coordinates are given for each source-receiver pair in whatever array it happens to lie relative to the chosen origin. The error signal E, and the error signal $E^2$ is obtained for that particular source-receiver pair as a first step in the iteration procedure. The next step in the procedure is to obtain the error E, and the error $E^2$, for the next source-receiver pair in the selected set, and to sum the error squared for the first receiver pair and the error squared for the second receiver pair. With a set of 144 source-receiver pairs, 142 additional such steps are involved in the iteration so that after a total of 144 steps, a signal representing the sum of the error squared for 144 source-receiver pairs will be stored in the summing and storing circuit 324 and represented visually on the voltmeter dial 206. With a set having a different number of source-receiver pairs the iteration has a number of steps corresponding to the numbers of pairs in the set.

At each step of this iteration procedure, the values of the parameters V, c, L and m are held at constant values representing the original estimates. At the conclusion of a complete iteration, in carrying out the method of this invention, one of the parameters is selected for adjustment in a direction to reduce the sum of the error squared after a complete iteration has been carried out with the new parameter values. In carrying out the invention, the analog circuitry also provides means for indicating to the operator of the system, after the completion of a first iteration, which parameter should be adjusted and the direction of its required change to more rapidly reduce the sum of the errors squared towards a minimum value, and thus obtain a best fit reflecting plane to the measured data.

Referring to FIG. 16c, the circuits 334, 350, 352, 354 labeled respectively, V ratios circuit, c ratios circuit, L ratios circuit m m ratios circuit, are included in the analog system to provide means for indicating the parameter to be adjusted for each successive iteration to reduce the error signals.

The iteration procedure carried out with the analog circuitry herein disclosed follows the computational procedure (Section 4 of the BMD publication reproduced above) closely, as can be seen by the following outline of a step-by-step procedure detailed in that section in terms of the variables used in the present method invention.

The computational procedure seeks to minimize the sum of the squares of the errors, which are the quantities given by the difference between the field measured reflection times and the determined reflection times for a given set of parameters (V, c, L, m) values. This sum is taken over all pairs of source and receiver points in the set. In carrying out the method with the analog apparatus, the error squared is obtained for each source-receiver pair and these are added to give the sum of the errors squared.

In the computational procedure outlined in the BMD publication, the values of $\delta_{ij}/\delta V$, $\delta T_{ij}/\delta L$, $\delta T_{ij}/\delta m$, $\delta T_{ij}/\delta c$, are calculated, whereas in the analog equipment, these quantities are determined by utilizing signals representing increments of the parameter values $\Delta V$, $\Delta c$, $\Delta L$ and $\Delta m$. The ratios circuits 334, 350, 352 and 354 include circuitry for operating upon input signals representing ratios corresponding to the foregoing partial derivatives, namely, $\Delta T/\Delta V$, $\Delta T/\Delta c$, $\Delta T/\Delta L$, $\Delta T/\Delta m$, to derive output signals representing the more complex ratios given above incorporating the partial derivatives, and in the analog form represented on FIG. 16c adjacent the output voltmeters for the ratios circuits 334, 350, 352 and 354, respectively, and reproduced immediately below:

$$\frac{[\Sigma\left(E_{ij}\frac{\Delta T}{\Delta V}\right)]^2}{\Sigma\left(\frac{\Delta T}{\Delta V}\right)^2} \tag{15}$$

$$\frac{[\Sigma\left(E_{ij}\frac{\Delta T}{\Delta c}\right)]^2}{\Sigma\left(\frac{\Delta T}{\Delta c}\right)^2} \tag{16}$$

$$\frac{[\Sigma\left(E_{ij}\frac{\Delta T}{\Delta L}\right)]^2}{\Sigma\left(\frac{\Delta T}{\Delta L}\right)^2} \tag{17}$$

$$\frac{[\Sigma\left(E_{ij}\frac{\Delta T}{\Delta m}\right)]^2}{\Sigma\left(\frac{\Delta T}{\Delta m}\right)^2} \tag{18}$$

After a full iteration for all source-receiver pairs of a set based on a first estimate of the values for the paramters (V, c, L, m) the operator of the analog equipment looks at the dials of the voltmeters 358, 360, 362, 364 to determine which parameter should be changed to make the most rapid progress in minimizing the error squared, and obtaining a best fit plane. The voltmeter dial indicating the largest magnitude designates the most sensitive parameter and the one to be changed. The dials of the other set of output voltmeters 366, 368, 370, 372, from the ratios circuits designate by the sense (positive or negative) of the signal displayed, whether the chosen parameter should be incremented or decremented. The voltmeters of this latter set can be connected either to show by a negative display that the respective parameters should be incremented, or vice versa, as desired. This latter set of "sign" voltmeters 366, 368, 370 and 372 represent, respectively, the sums of the analog equivalents of the partial derivatives of time with respect to the parameters V, c, L, m, namely:

$$\Sigma \frac{\Delta T}{\Delta v} \tag{19}$$

$$\Sigma \frac{\Delta T}{\Delta c} \tag{20}$$

$$\Sigma \frac{\Delta T}{\Delta L} \tag{21}$$

$$\Sigma \frac{\Delta T}{\Delta m} \tag{22}$$

By examination of the functions (15) through (22), it should be clear that to derive signals representing these function in these ratios circuits, at each step of an iteration which involves determination of an error squared signal for one source-receiver pair, a determination is also required of signals representing an incremental change in determined time T ($\Delta T$) with respect to an incremental change in each of the parameters V, c, L and m ($\Delta V$, $\Delta c$, $\Delta L$, $\Delta m$). In carrying out this method invention, the analog circuitry is utilized to perform a sub-sequence at each source-receiver step of an iteration, before the next source-receiver iteration step is performed. Thus, when a full iteration for all source-receiver pairs has been completed, the sum of the incremental change in the determined time T relative to each of the parameters, obtained during the sub-sequences, is obtained for all the source-receiver pairs. Those sums $\Sigma(\Delta T/\Delta V)$, $\Sigma(\Delta T/\Delta c)$, $\Sigma(\Delta T/\Delta L)$ and $\Sigma(\Delta T/\Delta m)$ are displayed on the second set of output voltmeters 366, 368, 370 and 372 to represent the sign of the parameter quantity contained in the error sum of the squares $\Sigma(E)^2$. Also, when a full iteration has been completed, signals representing the more complex ratios (15), (16), (17) and (18) are also displayed on the first set of output voltmeters 358, 360, 362, 364, involving a determination during each sub-sequence of the increment ratios (example $\Delta T/\Delta V$) and the sums shown in the complex ratios for all source-receiver pairs.

Ratios Circuits

The iteration steps, as well as the sub-sequence carried out at each iteration step, are timed by signals from the timing generator circuit detailed in FIG. 14. Each sub-sequence requires a determination of the incremental change in determined time T for a given source-receiver pair, produced by an incremental change in each of the parameters V, L, c and m. How such determinations are made with the analog circuitry can be seen by referring to FIG. 16c, and particularly the V ratios circuit 334 which contains the circuitry used in the c ratios circuit 350, L ratios circuit 352, and m ratios circuit 354. Only the V ratios circuit 334 has, therefore, been detailed.

The V ratios circuit 334 is supplied by two input signals carried to the divider circuit 380, one input signal representing $\Delta T$, and the other input signal representing $\Delta V$ from the input terminal (a) which is the output terminal (a) at the right hand side of FIG. 17b from the $\Delta V$ potentiometer 242. The $\Delta V$ signal may be assumed to be of constant magnitude, although it may be changed and increased or decreased by adjustment of the pot wiper for the potentiometer 242, the assumed magnitude being 0.1 volts dc. representing seismic energy velocity of 100 feet per second. With the gating circuits associated with the $\Delta V$ potentiometer 242 (FIG. 17b) under the control of the timing generator, a $\Delta V$ signal is supplied to the input of the V ratios circuit when required in the sub-sequence. Parenthetically it may be mentioned that the inputs to the c ratios circuit, L ratios circuit and m ratios circuit include, respectively, signals representing $\Delta c$, $\Delta L$ and $\Delta m$ also obtained from the potentiometers 242 of the parameter signal generator.

The other input to the V ratios circuit 334, as mentioned, is a signal representing $\Delta T$, i.e., an incremental change in determined time T resulting from the incremental change in velocity $\Delta V$. To produce a signal representing $\Delta T$ involves with the analog circuitry shown, successive determinations of T herein designated as T, T'. The initial determination of T is made with the use of the Determine T circuit and the pre-set potentiometers 242 of the parameter signal generator from which are obtained voltages representing estimated values of the parameters V, c, L, m, designated in FIG. 17b as $V_o$, $c_o$, $L_o$ and $m_o$.

A second determination of T, herein called T', is made with the use of the Determine T circuit and the same parameter values and voltages representing $c_o$, $L_o$ and $m_o$, except with the velocity parameter voltage $V_o$ incremented by a voltage representing $\Delta V$ such that the velocity parameter is represented by a voltage $V = V_o + \Delta V$.

In order to produce $\Delta T$, representing the difference $T' - T$, the initial determination of T is supplied to a sample and hold circuit 382 (FIG. 16b) under control of an input gate G supplied by a pulse from the timing generator over the line labeled $SS_2$ which pulse is supplied to open the input gate G momentarily substantially coinciding with the beginning of each successive iteration step. When the short duration pulse supplied over line $SS_2$ is removed from the input gate G, the sample and hold circuit 382 then holes the initial determination of T. After the initial determination of T, the sub-sequence is started under the control of the timing generator and a pulse is supplied from the timing generator (FIG. 19) over an output line labeled $SS_3$. That $SS_3$ signal is conveyed through the gating circuit associated with a $\Delta V$ potentiometer 242 to open the output gate and convey the $\Delta V$ voltage from the potentiometer 242 to the summing circuit 244 and thus produce on the output line to the terminal (6) a voltage representing $V = V_o + \Delta V$. That voltage is then supplied by the input terminal (6) to the Determine T circuit and produces, from operation of the internal circuitry, a voltage T' at the output terminal (10).

With the Determine T circuit functioning to produce an output voltage representing the quantity T' based upon the voltage representing $V = V_o + \Delta V$, the signal T' is conveyed by the input terminal (10) on FIG. 16b toward the ratios circuits. It is transferred to the summing amplifier 390 where the other input to the summing amplifier 390 being conveyed to an inverting terminal from the sample and hold circuit 382, a subtraction is made to produce a voltage representing $\Delta T = T' - T$. That $\Delta T$ signal is then supplied to the divider 380 at the input to the V ratios circuit. The output of the divider circuit 380 is conveyed through a gate $G_v$, opened by the same sub-sequence timing signal $SS_3$ and appears now as a voltage representing $\Delta T/\Delta V$. That output voltage from the divider 380 is conveyed to a squaring amplifier 394 producing at its output a voltage representing $(\Delta T/\Delta V)^2$ which is carried to a summing and storing circuit 330 serving as an accumulator. By means of this accumulator 330, voltages representing the quantities $(\Delta T/\Delta V)^2$ are summed for all source-receiver pairs when a full iteration has been completed. That output voltage is conveyed to a divider 396. The divider 396 has two input terminals, the other receiving a voltage representing the quantity:

$$[\Sigma\left(E_i \frac{\Delta T}{\Delta V}\right)]^2$$

The input voltage to the upper terminal of the divider circuit 396 is obtained from a squaring amplifier 398 supplied with an output voltage from the summing and storing circuit 328. The summing and storing circuit 328 is supplied with an output from the multiplier 398 which receives input signals representing the error signals $E_{ij}$ representing the error for a corresponding source-receiver pair, and a signal representing $\Delta T/\Delta V$ from the output of the divider 380. Looking to the output indicator 358 from the V ratios circuit it can be seen that the divider circuit 396 operates on the signals that are supplied to its two inputs to produce the output signal representing the complex ratio designated Equation (15) hereinbefore and represented on FIG. 16c adjacent the output voltmeter 358. The dial of that voltmeter 358 displays the sum of signals produced for each source-receiver pair each step of the iteration, and at the completion of the full iteration, by the magnitude displayed on the voltmeter 358 the operator can determine the relative importance of the parameter V with respect to the sum of the error squared determinations. The other output voltmeter 366 is supplied with a signal representing $\Sigma(\Delta T/\Delta V)$ from the output of the summing and storing circuit 332, which receives as its input at each step of the iteration a signal representing $\Delta T/\Delta V$. It also can be seen from FIG. 16c that the summing and storing circuits 328, 330 and 332 are supplied by enter signals over the line designated SS$_4$ which is supplied by a pulse from the timing generator so that once each iteration step, during the sub-sequence, the quantities on the input lines to the summing and storing circuits are entered and accumulated therein, thus to provide at the completion of the iteration the summed voltages for all source-receiver pairs.

In like fashion, as will be explained in greater detail later, during each sub-sequence for each source-receiver pair the ratios circuits 334, 350, 352, 354 are operated in succession to derive output signals and to sum those output signals with the output signals for all source-receiver pairs. By referring to FIG. 16c it can be seen that the derived signals which are a function of $\Delta T$ in each of the ratios circuits 350, 352, 354 are entered into the accumulators in those circuits under the sub-sequence control provided by the timing generator over the signal lines SS$_5$, SS$_6$ for the c ratios circuit, SS$_7$, SS$_8$ for the L ratios circuit and SS$_9$, SS$_{10}$ for the m ratios circuit, the timing pulses over these SS lines being supplied at discrete sub-sequence steps such that these ratios circuits are operated in timed succession during the sub-sequence.

Analog Circuitry Operating Sequences

In performing the method of this invention with the use of the analog circuitry of FIGS. 13–18, it has been stated before that both local and offset trace data is obtained from distantly spaced arrays of sources and receivers, and that by selection of a sub group of source-receiver pairs reflection time data and coordinate data for the selected set of source-receiver pairs is obtained, tabulated as in FIG. 12, and then used in the operation of the system to determine a best fitting reflecting plane. When we mention reflection times herein, we mean the measured time for transmittal of seismic energy, created by energizing a source, from a source to a receiver of one pair and reflected from a reflection point at an underlying stratum, illustrated on FIG. 11. Reflection planes or horizons may be of different depths, but each one is treated separately and the determination completed for a best fit plane for each stratum before a plane determination is made for a stratum at a different depth, in carrying out the method of this invention.

Before the operation of the analog circuitry to determine the strike and dip of a portion of a selected stratum, based upon the assembled data from cross patterns of sources and receivers, as a preliminary step the tabulation of FIG. 12 is made to list the $x$ and $y$ coordinates for each source-receiver pair and the reflection times obtained after correction of the original field recorded trace data as hereinbefore described. Thus, a complete tabulation for all source-receiver pairs of the set will be made like the entries for seven of the pairs as shown on FIG. 12.

Also required as a preliminary matter are original estimates for a selected underlying stratum, of the parameters V, c, L and m for an estimated plane having the configuration of the stratum. Seismic energy velocity can be estimated for the particular location and with knowledge of the general character of earth layers between the earth's surface and the underlying portion selected for analysis. How to estimate the distance c was explained above. Estimates for the plane parameters L and m can also be made by assuming a horizontal reflecting plane or based on previously obtained trend data, a dipping plane at any given angle of strike may be assumed.

With the values estimated for the parameters, the first step before starting operation of the analog circuit is to adjust the potentiometers 242 of the parameter signal generator (FIG. 15b) to provide output voltages representing the essential parameter values. Also, the $\Delta$ potentiometers 242 are adjusted for a predetermined increment, i.e., 0.1 volts dc. in each case representing increments of one hundred feet for the distance c, 100 feet/-second for velocity of seismic energy V, and 0.1 for both of the direction cosine values for L and m.

Next, from a tabulation made like FIG. 12, the corrected reflection times are used for adjusting the measured time of travel potentiometers 230 (called the t bank) of the signal generator (FIG. 15a). Thus, all of the potentiometers of the t bank can be adjusted as a preliminary matter, so that measured time of travel signals are available when required for each of the source-receiver pairs. Similarly, the $x$ and $y$ banks potentiometers (FIG. 15a) are also adjusted to establish signals representing the coordinate locations of each of the source-receiver pairs, and thus voltages representing locations of each source-receiver pair are available when required in the operation of the analog circuit.

Timing Generator

Now turning to FIG. 14, a timing generator is shown which operates gating circuits throughout the analog system to carry out the present method invention in an orderly and reasonably rapid manner, although in presenting this analog counterpart of the digital system disclosed in an earlier section hereof, no effort has been made to minimize the time required for analog system operation. As stated above, it is preferred to use a digital computer with suitable software program to process the data and carry out the method invention. However, the disclosed analog system does provide the requisite circuitry and does operate in a manner much like a digital computer, although more slowly and with less accuracy, to produce parameters of a best fit plane representing directly the configuration of a selected strata.

Assuming, therefore, that preliminary setting up has been accomplished of the potentiometers 242 of the parameter signal generator, and the $t$, $x$ and $y$ bank pots of the measured time source-receiver signal generator, the start of the operation of the analog system is begun by actuating the start switch 400 in the timing generator section of the circuit on FIG. 14. This will start the operation of the analog system to carry out a first trial to derive a best fit plane to the measured reflection time data for a selected strata and tabulated for a full set of up to 144 source-receiver pairs.

The timing generator outputs two sets of timing pulses. The first set of timing pulses, herein called the master sequence or master iteration timing pulses, is provided by the binary to absolute count decoder 404, and these master timing pulses define each step of the master iteration and appear at the rate of about 8 Hz on the output lines $S_1 \ldots S_{145}$, in succession. A second set of timing pulses, herein called the sub-sequence timing pulses, is provided by the binary to absolute count decoder 254, these sub-sequence timing pulses defining successive steps of a sub-sequence which occurs between each step of the master sequence. The sub-sequence timing pulses appear at the rate of the clock pulses. For purposes of this explanation, it can be assumed that the clock frequency is 96 Hz, which with the divide by 12 counter will produce the above mentioned master sequence rate of 8 Hz, but the clock oscillator output frequency can be increased, if desired, to reduce the total time required for a complete iteration.

The master sequence timing pulses as shown on the output lines $S_1 \ldots S_{145}$ from the decoder 240, primarily time the operation of the analog system to carry out each iteration step in succession. At each step, signals representing determined time T are derived for each source-receiver pair, the error E is determined, squared, and accumulated, so that at the completion of the master sequence of 144 steps and representing one "trial" to obtain an estimated best fit plane, the accumulator 324 in the Determine E circuit (FIG. 16b) stores the sum of the errors squared ($\Sigma(E)^2$) for all the source-receiver pairs of the full set. That quantity is also displayed on the voltmeter dial 206. Master sequence timing pulses operate the requisite gating circuits within the system to carry out the functions involved in the master sequence.

The sub-sequence timing pulses primarily time the operation of the analog system in carrying out a sub-sequence during the interval between the master sequence timing pulses. In each sub-sequence, voltages are derived representing incremental change in determined time T relative to incremental changes in each of the parameters V, c, L and m, and the ratios circuits 334, 350, 352, 354 are operated in succession during the sub-sequence to produce output voltages representing the complex ratios (15), (16), (17) and (18) in order to provide a display indicating the parameter to be adjusted for the next "trial" in obtaining a best fit plane. These sub-sequence timing pules appear at lines $SS_1 \ldots SS_{11}$ from the decoder circuit 254 and are utilized as gate drivers where required in the analog system to carry out these sub-sequence operations.

How the timing generator operates to produce these two sets of timing pulses should be clear from a consideration of the circuit detailed in FIG. 14. Thus, the clock oscillator 405 is turned on by actuation of the start switch 400 and feeds pulses at the clock rate (i.e., 96 Hz.) to the input gate G which is also opened by the start switch 400 via a high signal from the output of a flip-flop 406 having its set input connected to the start switch 400.

A divide by 12 counter 408 receives the clock pulses and the first clock pulse that produces a carry pulse from the counter 408 to the S counter 410, sets the first flip-flop 412 in the S counter 410, which through the binary to absolute count decoder 240, converts a high voltage on the output line $S_0$ to a low, and shifts a high voltage to the output line $S_1$, representing the first master sequence timing pulse for the analog system. The S counter 410 has a 145 count capacity, and for this purpose is comprised of eight flip-flops 412-1 . . . . 412-8 with interconnected gates (not shown) which make it go through one full counting cycle in response to 146 input pulses. Such gating to produce a count cycle of any desired length is routinely organized by one skilled in the art. The S Counter is supplied by pulses from the divide by 12 counter 408 at the rate of 8 Hz. The output from the S Counter represents in binary form on its output terminals 414, the output pulse count from zero to 145 ($S_0$ to $S_{145}$) which is decoded in the decoder 240 to advance the high voltage successively from each output line to the next, i.e., $S_1$ to $S_2$ to $S_3$ . . . to $S_{145}$. The master sequence signals are thus provided on the output lines $S_1 \ldots S_{145}$ in sequence and at the timing rate of 8 Hz. At the completion of the master sequence, i.e., at the end of a "trial" to determine the fit of an estimated plane, a carry pulse is produced from the S counter flip-flop 412-8. It is fed back to reset the flip-flop 406 adjacent the start switch 400, which flip-flop 406 terminates operations by closing the input gate G to the divide by twelve counter 408. The high signal on the final output line $S_{145}$ from the decoder 240 is shifted to the line $S_o$, which turns on a signal light 420 indicating the end of a "trial".

The sub-sequence timing pulses which appear on the output lines $SS_2 \ldots SS_{11}$ of the binary to absolute decoder 254, appear in succession on these lines at the clock rate of 96 Hz. These 10 output lines are made successively high by an SS counter 422. The latter is formed by four tandem flip-flops interconnected by gates (not shown) to cycle successively through 12 count states ($SS_0$ to $SS_{11}$). The decoder lines $S_2$ to $S_{11}$ are respectively high during count states $S_2$ to $S_{11}$.

In the input to the sub-sequence counter 422 is a gate 424 which is enabled by and passes the first pulse of a first 12 clock pulse sequence. Thus, with the S and SS counters in a zero count state, a clock pulse which carries through counter 408 switches the S Counter to the $S_1$ state and this in turn enables gate 424 quickly so that the same first clock pulse switches the SS counter to the $S_1$ state. The second clock pulse switches the SS counter to the $SS_2$ state and the decoder 254 places a high signal on the $SS_2$ output line. Thus, the second pulse of a twelve pulse sequence marks the start of the 10 step sub-sequence represented successively on the sub-sequence output lines $SS_2 \ldots SS_{11}$.

The input gate 424 to the SS counter is enabled by a high output AND gate 426. On the first pulse of a twelve pulse sequence at the very beginning of a 144 step trial, the output line $S_0$ from the decoder 240 shifts from high to low. An inverter 428 thus supplies a high voltage to one input terminal of the AND gate 426. The other input of the AND gate 426 is connected to the output line $S_{145}$ from the decoder 240. That output line $S_{145}$ also carries a low voltage until the S counter reaches a count state of 145. Such low voltage is converted to a high in the inverter 430. The AND gate 426 thus enables the pulse transmission gate 424 at all times except when the S Counter is in count state $S_0$ or $S_{145}$. During each 144 step trial, the gate 424 is enabled at the start of the count state $S_1$ and disabled at the end of count state $S_{144}$.

Also, shown in FIG. 14 are two clear switches. The first such switch 432 clears the SS counter 422 to a zero count state (in most cases redundantly) after each 144 step trial of the system. Thus, the clear switch 432 is ganged with the start switch 400. A clear switch 434 is also provided to clear the S Counter. That clear switch 434 is ganged with a reset switch 436 which connects a positive voltage to all reset terminals (R) in the summing and storage circuits, or accumulator circuits, found throughout the analog system. The S Counter is cleared when the system is first put into operation and redundantly after each 144 step master sequence of iteration.

Illustrative Sequence

After the preliminary setup of the parameter signal generator and the measured times source-receiver pair signal generator, as earlier stated, and startup of the analog system by actuation of the start switch 400 (FIG. 14) to carry out a first "trial" to derive a best fit plane, the master sequence S Counter operates to shift an output signal from the output line $S_o$ leading from the decoder 240, to the line $S_1$ which corresponds to the first source-receiver pair in the tabulation of source-receiver coordinates and measured reflection time by that source-receiver pair.

The output signal on the line $S_1$ from the S Counter opens the output gates $G_1$ in the $t$, $x$ and $y$ potentiometer banks of the measured time source-receiver pair signal generator, so that voltages picked off the first potentiometer in each bank energize the output lines (1), (2), (3) and (4) and (5) with signals representing $t_{ij}$ and the $x$ and $y$ coordinate values. The coordinate value output lines (2), (3), (4), (5) bring in the coordinate value signals to the Determine T circuit, which is also supplied with signals representing the original estimates ($V_o$, $c_o$, $L_o$, $m_o$) of the parameter values, and in this stage of operation of the circuit the $\Delta V$, $\Delta c$, $\Delta L$ and $\Delta m$ parameter increments are treated as zero, from the parameter signal generator, and the Determine T circuit functions to produce on its output line (10) a signal representing determined reflection time $T_{ij}$ for that particular source-receiver pair. The Determine E circuit which receives the signals representing $T_{ij}$ from the Determine T circuit also directly receives the measured time signal $t_{ij}$ and functions to produce signals representing the error ($E_{ij} = t_{ij} T_{ij}$) and error squared $E_{ij}^2$.

As each successive master sequence timing pulse is generated by the decoder 240, at the rate of 8 Hz., representing each step of an iteration, the output lines $S_1 \ldots S_{145}$ are energized in sequence. The signals representing coordinate values for each succeeding source-receiver pair in the tabulation and signals representing the original estimated parameters, are operated on by the Determine T circuit, and the signals for the error squared $E_{ij}^2$ determined in the Determine E circuit are summed until all 144 source-receiver pairs have been covered in the complete iteration for the first trial.

In order to explain in greater detail the sub-sequence which is carried out between each master sequence step, to provide the information to the operator of the analog system as to which parameter should be adjusted for the next trial, we can take as an example the S Counter step which shifts a high voltage from the output line $S_{142}$ to the output line $S_{143}$ representing the shift from the 142nd to the 143rd step of the iteration.

A pulse on the $S_{143}$ line will enable the output gates $G_{143}$ in the $t$, $x$ and $y$ banks of the source-receiver pair measured time signal generator. This results in five output signals representing that 143rd source-receiver pair in the tabulation (FIG. 12) together with the measured time $t$ by that pair. The coordinate signals are carried into the Determine T circuit and a signal representing determined time T produced. The Determine E circuits produce a signal representing the error squared $E^2$ for that source-receiver pair.

The same clock pulse that is carried into the S counter to shift its count from 142 to 143, also enables the input gate 424 to the SS Counter. It also will be observed that the output line $S_{143}$ remains high for the period between 12 clock pulses from the clock oscillator. Thus, the first clock pulse of the series of 12 which shifts the master S Counter, enables the input gate to the sub-sequence SS Counter, while the second clock pulse is passed through the input gate 424 to shift the SS Counter, and through the decoder 254 produces a pulse on the output line $SS_2$ which is the first energized line of the 10 output lines timing the sub-sequence steps.

In this first sub-sequence step, the previously determined error squared signal is stored in the accumulator 324 in the Determine E circuit, and the determined time T signal produced by the Determine T circuit is stored for subsequent use. Thus, the output line $SS_2$ is connected to the enter terminal (A) of the accumulator 324 of the Determine E circuit, so that the signal representing error squared which is on the input to the accumulator 324 when the timing signal arrives on the line $SS_2$, is entered into the accumulator and summed with the error squared signals previously entered during the prior 142 steps of the master sequence. The line $SS_2$ is also connected to the input gate G to the determined time T sample and hold circuit 382, so as to enable that gate to pass the determined time signal T to the sample and hold circuit 382.

The next sub-sequence step is timed by an output pulse appearing on the output line $SS_3$ of the SS Counter which is produced by the third clock pulse of the 12 pulse series. The timing pulse appearing on the line $SS_3$ is used to operate the V ratios circuit 210 (FIG. 16c). Thus, the output line $SS_3$ is connected to the OR gate in the gating circuits associated with the $\Delta V$ potentiometer 242 in the parameter signal generator (FIG. 15b). With the OR gate enabled by the arriving pulse on the line $SS_3$, the output gate $G_v$ of the $\Delta V$ potentiometer is enabled, and the voltage $\Delta V$ is picked off the potentiometer 242 and passed to the summing amplifier 244 so that the output of this amplifier then appears as $V = V_o + \Delta V$. Thus, the effective $\Delta V$ is changed at this step in the sub-sequence from zero to $\Delta V$. With a changed signal value for the parameter V, the Determine T circuit functions to produce a different value for determined time T, hereinbefore called T'.

The signal representing the value of determined time T' based upon the incremented value of $V = V_o + \Delta V$ is supplied from the output line (10) of the Determine T circuit to the summing amplifier 390 which produces an output signal representing $\Delta T = T' - T$, and the timing signal over line $SS_3$ is also conveyed to enable the output gate $G_v$ from the divider 380 which thus passes into the V ratios circuit a signal representing $\Delta T/\Delta V$. The next timing pulse produced by the SS Counter over the output line $SS_4$ also holds the output gate $G_v$ from the divider 380 enabled, so that the signal representing $\Delta T/\Delta V$ is carried for the duration of the $SS_4$ timing pulse into the three summing and storing circuits 328, 330, 332 of the V ratios circuit. The enter lines (A) of each of those summing and storing circuits or accumulators are also connected to the timing line $SS_4$ so that during the time increment represented by the timing pulse over line $SS_4$, the signal representing $E(\Delta T/\Delta V)$ for the 143rd source-receiver pair is entered into the accumulator 328 and stored therein to produce the sum $\Sigma(E[\Delta T/\Delta V])$ for all source-receiver pairs including the 143rd pair, and that sum is squared in the squaring amplifier and carried to the divider 396. Likewise the signal representing $\Delta T/\Delta V$ is carried into the squaring amplifier 394 and the resulting voltage is carried into the accumulator 330, entered and stored therein and the resulting output voltage carried to the divider 396 which produces the output voltage represented by the Equation (15) for all source-receiver pairs from one to 143, and which will produce a magnitude represented by the dial on the voltmeter 218.

Also, the signal representing $\Delta T/\Delta V$ is carried into the third summing and storing circuit or accumulator 332 of the set in the V ratios circuit, and the value entered and stored therein so as to produce an output signal representing $\Sigma(\Delta T/\Delta V)$ which is carried to the output voltmeter 226 and represented on the output dial as a positive or negative signal for all source-receiver pairs from one to 143.

With the arrival of the next clock pulse to the SS Counter, the output signal is shifted from the output line $SS_4$ to $SS_5$. During the time increment represented by the next two timing pulses on the output lines $SS_5$ and $SS_6$, the signal representing the original estimated parameter $c_o$ is incremented by a signal representing $\Delta c$, and the Determine T circuit produces an output voltage representing T' based upon the original parameter estimates $V_o$, $L_o$ and $m_o$, but with the parameter c incremented to the value $c = c_o + \Delta c$. The output timing pulse of the line $SS_5$ is effective with the gating circuits associated with the $\Delta c$ potentiometer and the parameter signal generator to pick off a signal representing $\Delta c$ and pass it into the Determine T circuit. The signal produced over the $SS_6$ output line from the SS Counter on the next clock pulse is then effective to operate the set of three accumulators in the c ratios circuit to enter signals representing $E(\Delta T/\Delta c)$, $(\Delta T/\Delta c)^2$ and $\Delta T/\Delta c$ into such accumulators to produce the sum of such signals for all source-receiver pairs one through 143, and output signals which are conveyed to the output voltmeters 360 and 368 associated with the c ratios circuit such that the dials from these voltmeters display the accumulated sums represented by the equations shown adjacent the voltmeters in FIG. 16c.

It should be clear from the foregoing, and referring to FIG. 16c, that the timing pulses appearing on the lines $SS_7$ and $SS_8$ from the S counter operate, respectively, the $\Delta L$ potentiometer gating circuits and the L ratios circuit accumulators to sum the signals representing $E(\Delta T/\Delta L)$, $(\Delta T/\Delta L)^2$ and $\Delta T/\Delta L$ for source-receiver pairs one through 143; and the timing pulses occurring on output lines $SS_9$ and $SS_{10}$ from the S Counter are effective, respectively, to operate the gating circuit associated with the $\Delta m$ potentiometer in the parameter signal generator to increment the signal representing the m parameter and produce a signal $m = m_o + \Delta m$, and also to operate the accumulators in the m ratios circuit to enter and store the signals produced as a consequence of the change in determined time T due to the increase in m from the incremental voltage $\Delta m$. In the case of operation of all the ratios circuits, it should be noted that the original estimates of parameters are used except for the incremental value of the particular parameter being operated on in the determination of T. It is also noted that the signal representing $\Delta T$ is different for each successive determination in the sub-sequence but is only gated into the respective ratios circuit by the corresponding sub-sequence timing pulse produced by the sub-sequence decoder.

When the SS Counter shifts to transfer an output pulse from the output line $SS_{10}$ to the output line $SS_{11}$ of the decoder 254, the sample and hold circuit 382 connected to the output of the Determine T circuit is cleared by the signal over line $SS_{11}$ enabling the clear reset gate $G_r$. This clears from the sample and hold circuit 382 the stored value of determined time T for the 143rd source-receiver pair and readies the sample and hold circuit 382 for the next step of the master sequence, which in this example would involve the determination of T for the 144th source-receiver pair.

Thus, a timing pulse appearing on the output line $SS_{11}$ from the SS Counter decoder 254 is effective to clear the signal representing determined time T from the sample and hold circuit 382 connected to the output of the Determine T circuit and this is achieved by the signal over line $SS_{11}$ which enables the reset gate $G_r$ and connects ground to the input of the sample and hold circuit 382. The gate $G_r$ connects a zero voltage to the input of the sample and hold circuit 382 and clears it, so that a new value of determined time T can be stored in the sample and hold circuit 382 for the next source-receiver pair, in our illustrative example the 144th pair of the set.

The final pulse in the 12 pulse series from the clock when received by the SS Counter, rolls over the SS Counter to a zero count state. That same twelfth clock pulse is entered into the S Counter and produces a carry pulse from one flip-flop to the next to advance the S Counter by one state, for example from the 143rd to the 144th count, and results in an output signal on the output line $S_{144}$ from the S Counter decoder 240. A new sub-sequence will then start.

The final pulse of the next 12 pulse series will shift the count from 144 to 145 in the S Counter, producing an output pulse on the line $S_{145}$ which disables the AND gate 426 and, in turn, the input gate 424 to the SS Counter. The output pulse representing the 145th count of the S Counter is also utilized to open a gate associated with the Determine E circuit; the gate 450 is enabled by the 145th timing pulse to transfer the output of the accumulator 324 which holds at that stage of the master iteration, a signal representing the sum of the error squared for all source-receiver pairs in that trial, and enters that signal to a sample and hold circuit 452 and as such represents error squared $(E)^2$ for the just concluded trial. The voltmeter connected to the output of the sample and hold circuit 452 displays the previous trial sum of the errors squared for reference after the next iteration has been carried out. With the S Counter having a 145 count capacity, the next input pulse entered to the S Counter, the 145th input pulse, appears as a carry from the final flip-flop 412-8 in the series which is carried back to the reset input of the flip-flop 402 associated with the start switch 400, to reset that flip-flop and in turn close the input gate G to the S Counter. This terminates the operation of the analog system after a full iteration and trial at a best fit plane to the measured reflection time data for all source-receiver pairs of a set. The binary to absolute count decoder 240, when the S Counter is set to a zero count by the 146th timing pulse, is shifted to its zero state causing an output signal to appear on its output line $S_o$ and light the indicator light 420, thus indicating that a trial is completed.

After a trial at fitting an estimated plane to the measured time travel signals, carried out with the analog system as described, in accordance with the method invention another trial to obtain a better fit of an estimated plane to the measured time travel signals is taken based upon a new set of values for the parameters V, c, L, m. In the step-wise Gauss-Newton iteration which may be programmed for a digital computer and which follows the Computational Procedure outlined in the portion reproduced above from the BMD publication, after a first iteration has been completed, the parameter of greatest significance in the error squared value is selected and that parameter adjusted in succeeding iterations until a minimum error squared is obtained for that parameter. That procedure is repeated for each parameter in the order of relative importance until all four parameters have been adjusted, and the process involving multiple iterations with adjustment of all four parameters may be repeated until a minimum error squared is obtained within a given tolerance factor, thus indicating a best fit plane.

It should be evident that such a procedure may be carried out with the analog computer counterpart disclosed herein; the operator after completing the first trial examines the dials of two sets of output voltmeters, the magnitude voltmeters 358, 360, 362, 364 and the sign voltmeters 366, 368, 370, 372. The magnitude voltmeters will indicate by the dial displaying the largest magnitude which parameter is of greatest sensitivity. The associated voltmeter of the sign voltmeter set will indicate by the sense displayed whether the sensitive parameter should be incremented or decremented. With the parameter and its sign so indicated, the potentiometers for that parameter and the parameter signal generator, i.e., the v, c, L or m potentiometer, is adjusted as a precedent to taking the next trial. The Δ potentiometer settings may be left undisturbed for the next trail and all succeeding trials of a best fit determination until the final adjustments when finer increments than those utilized initially may be established, if the system accuracy warrants such fine adjustments.

Display of Strike, Dip and Velocity

Once the best fit plane is obtained, the value of $V_o$ used in the final determination will represent the actual velocity of seismic energy in the layers between the earth's surface and the reflecting plane. The values of $c_o$, $L_o$ and $m_o$ used in the final determination may be used for determining strike and dip of the reflecting plane by the following geometrical relations.

If $\theta$ is the angle of dip of the reflecting plane, and $\phi$ is the azimuth of the dip (clockwise from north), then:

$$\cos \theta = n = \sqrt{1 - L^2 - m^2}$$

and $$\phi = \text{Arc Tan}\,(L/m) + (180°)$$

Referring to FIG. 18, suitable display arrangements for velocity and the reflecting plane parameters, together with strike and dip of the selected strata, are illustrated revealing more detailed exemplary circuitry than in the overall block diagram of FIG. 13; the latter figure shows that the sgnals representing the parameter values used in the best fit reflecting plane determination serve as the input signals to a display panel 260. As depicted in FIG. 18, for providing a visual representation of the geometrical parameters $c_o$, $L_o$ and $m_o$ of the best fit plane, signals representing these values from the input terminals (12), (13), (14) and (15) are conveyed to analog to digital converters 454 which interface with and drive numeric display devices 456, 458, 460 to display the values $K_c$, $K_L$ and $K_m$. Likewise the value for actual velocity $V_o$ used in the final determination, is conveyed to an analog-to-digital converter 462 which interfaces and drives its display 464 of velocity $K_V$.

To produce signals representing strike, the signals representing parameters $L_o$ and $m_o$ are conveyed through a divider circuit 470 to an analog to digital converter 472 and to a digital adder 476, which converter 472 supplies a digital representation of the ratio $L_o/m_o$, to a memory device 474 storing arc tan values. The memory device 474 produces as its output signals representing arc tan $L_o/m_o$ in digital form with the correct quadrant being assigned by the digital adder 476, which interfaces and drives a numeric display 478 for the azimuth of the dip or "strike". To display dip on a numeric display 480, signals representing the parameters $m_o^2$ and $L_o^2$ are supplied to the operational amplifier 482 to produce a signal representing $1 - L_o^2 - m_o^2$, which is operated on in the square root amplifier 484 to provide a signal representing cosine of the dip angle $\theta$ ($\cos \theta$). That $\cos \theta$ signal is converted to a digital signal in the analog-to-digital converter 486, and by the arc cos memory circuit 488 produces a digital signal displayed on a numeric display 480. To display a digital representation of the parameter n, the analog to digital converter 486 outputs to the numeric display unit 490 to display n directly.

Following the display of strike, dip and velocity determined for that portion of a stratum represented by the reflection times obtained by a selected set of source-receiver pairs, for example the shallowest reflecting horizon evidenced by the data tabulated in FIG. 12 as reflecting times T(1), another stratum evidenced by the data may be selected, for example the next deeper reflecting plane for which reflection times are listed on the tabulation in FIG. 12, and the method of this invention carried out to obtain strike, dip and velocity related to that selected stratum. The procedure may be repeated for all the reflection planes listed on the tabulation, which then finishes the interpretation of recorded data from a selected set of source-receiver pairs.

The individual components which are shown throughout FIGS. 13–18 (e.g., operational amplifiers, sample and hold circuits, multipliers, counters, dividers, decoders, converters, etc.) are all per se known to those skilled in the art. It is thus unnecessary to describe each of these components in greter detail. Of course, variations of the system shown in FIGS. 13–18 may be readily adopted by those skilled in the art. It will be seen that the system of FIGS. 13–18 functions wholly with analog circuits and analog voltage signals but in a manner which is fully parallel to the opertion of the digital system described earlier with reference to FIGS. 1–10. Noteworthy is the fact that in both embodiment of FIGS. 1–10 and the embodiment of FIGS. 13–18, there are means for producing from original local and offset trace data measured time of travel signals for each of a preselected set of source-receiver pairs. The measured time of travel signals represent measured time of travel of a seismic event reflected from a reflection point at a portion of a stratum which may either be underlying a cross-pattern of sources and receivers (local) or remote from the cross-pattern and intermediate that cross-pattern and another (offset), and a combination of local and offset data may be used during the measured time of travel signals. Moreover, there are means for producing parameter signals representing parameters defining an estimated plane underlying the earth's surface. Still further, in both embodiments there are means for producing estimated time of travel signals for each of the source-receiver pairs of the selected set, the estimated time of travel signals representing time of travel of seismic energy reflected from an estimated plane. Finally there are in both embodiments included means for producing error signals representing the difference for each of the plural source-receiver pairs between the measured time of travel signals and the estimated time of travel signals, and for adjusting the parameter signals until the error signals are brought to a minimum value and an estimated plane is obtained which best fits the measured time of travel signals. The attitude and azimuth of the best fit plane provides the dip and strike of the local or remote portion of the stratum being analyzed. While the system of FIGS. 13–18 is not a preferred embodiment because it may involve more manufacturing expense, labor and time of operation as compared to the embodiment of FIGS. 1–10, the second embodiment of FIGS. 13–18 confirms that those skilled in the art may practice the method of the present invention with analog components and signals and without employing a programmed digital computer.

We claim:

1. A method of geophysical prospecting to derive strike, dip, velocity and related data for a selected stratum underlying an earth area comprising the steps of:
   disposing first and second source-receiver cross patterns at first and second spaced positions of said earth area, said cross patterns each including a plurality of aligned seismic energy sources with a plurality of seismic energy receivers positioned transversely thereto;
   obtaining first and second local seismic trace data establishing reflection times for events reflected from said selected stratum underlying said first and second spaced positions;
   obtaining offset seismic trace data establishing reflection times for events reflected from said selected stratum underlying said earth area at a position intermediate to said first and second spaced positions, said offset seismic trace data resulting from seismic energy emanating from one source-receiver cross pattern and detected at the other source-receiver cross pattern;
   utilizing the first and second local trace data to produce parameter signals which define first and second planes under said first and second earth positions which best fit the reflection times of the first and second trace data, respectively, and
   utilizing the offset seismic trace data to produce parameter signals which define a third plane under said intermediate earth position which best fits the reflection times of the offset trace data,
   said first, second and third planes thereby representing the configuration of said selected stratum underlying said three earth positions, from which strike and dip of said selected stratum may be derived together with velocity of seismic energy between the earth's surface at said positions and the selected stratum.

2. A method as set forth in claim 1 which is further characterized in that:
   said local seismic trace data as obtained from each of said first and second source-receiver cross patterns is compiled from received energy from successive seismic energy sources positioned on the same side of the respective receiver lines, as reflected from reflection points at said stratum for detection at each receiver at the same end of the respective receiver lines, thereby to derive quadrantal related seismic trace data for the respective first and second positions.

3. A method as set forth in claim 2 which is further characterized in that:
   said offset seismic trace data is compiled from energy from successive seismic energy sources positioned at one of said source-receiver cross patterns, as reflected from reflection points at said stratum intermediate said first and second earth positions for detection at each receiver at said other source-receiver cross pattern, thereby to define reflection points disposed in quadrantal relationship and having a reflection point pattern generally similar to said reflection points at said local source-receiver cross patterns.

4. A method as set forth in claim 1 which is further characterized in that:
   said first and second source-receiver cross patterns include source lines and receiver lines which include plural, equi-spaced sources and receivers, respectively, as disposed along the line extremities.

5. A method as set forth in claim 1 which is further characterized by:
   utilizing a portion of said local trace data and a portion of said offset trace data which in combination relates to a group of reflection points at a portion of said particular stratum to produce parameter signals which define a fourth plane which best fits the reflection times of said combined data, from which strike and dip of said portion of said particular stratum may be derived.

6. A method as set forth in claim 1 which is further characterized to inclue the step of:

disposing additional source-receiver cross patterns at other spaced positions on said earth surface to derive additional local trace data for the portions of a particular stratum underlying said positions and additional offset trace data for additional intermediate portions of said particular stratum;

utilizing the additional local seismic trace data from said additional source-receiver cross patterns to produce parameter signals which define additional local planes underlying each of said other positions which best fits the reflection times established by said additional local trace data for said particular portions of a stratum, respectively; and utilizing the additional offset trace data to produce parameter signals which define additional offset planes which best fit the reflection times established by said additional offset trace data, said additional local and offset best fit planes representing the configuration of said portions of said particular stratum.

7. A method as set forth in claim 6 which is further characterized to include the steps of:

utilizing said local and offset seismic trace data from each of said first, second and additional source-receiver cross patterns to determine the best fit planes over the entie length of said selected stratum beteen said first and other positions of the earth area.

8. A method as set forth in claim 7 wherein each of said first, second and additional earth positions are in line along a predesignated survey line on said earth area.

9. A method as set forth in claim 8 wherein each of said first, second and additional source-receiver cross patterns is similarly aligned with source lines and receiver lines extending in the same direction.

10. A method as set forth in claim 6 wherein each of said first, second and additional earth positions are predesignated such that the local seismic trace data reflected from the selected stratum beneath each of said first, second and additional positions are approximately adjacent and in alignment along a selected survey line.

11. A method as set forth in claim 10 which is further characterized to include the steps of:

selecting from said local and offset seismic trace data from said first, second and additional source-receiver cross patterns common depth point data along selected reflecting lines parallel to said line of survey.

12. A method as set forth in claim 1 wherein said step of obtaining offset seismic trace data includes obtaining seismic trace data refracted at an intermediate offset position of said selected stratum.

13. A method as set forth in claim 6 wherein said steps of utilizing the local and offset related seismic trace data to produce parameter signals defining planes which best fit the reflection times established by said trace data includes fitting estimated planes by the method of least squares.

14. A method of geophysical prospecting to derive strike, dip, velocity and related data for a selected stratum underlying an earth area comprising the steps of:

disposing first and second source-receiver cross patterns at first and second spaced positions of said earth area, said cross patterns each including a plurality of aligned seismic energy sources with a plurality of seismic energy receivers positioned transversely thereto;

obtaining first and second local seismic trace data for events reflected from said selected stratum underlying said first and second spaced positions;

obtaining offset seismic trace data for events traveling from said selected stratum underlying said earth area at a position intermediate to said first and second spaced positions, said offset seismic trace data resulting from seismic energy emanating from one source-receiver cross pattern and detected at the other source-receiver cross pattern;

utilizing the first and second local trace data to produce parameter signals which define velocity of seismic energy and first and second planes under said first and second earth positions which best fit the reflection times of the first and second trace data, respectively, and utilizing the offset seismic trace data to produce parameter signals which define velocity and a third plane under said intermediate earth position which best fits the reflection times of the offset trace data, said first, second and third planes thereby representing the configuration of said selected stratum at portions respectively underlying said three earth positions and the velocity used in the best fit determinations providing the actual velocity of seismic energy at each of said three earth positions.

15. A method as set forth in claim 14 which is further characterized by:

said offset seismic data including events refracted from the intermediate position of said selected earth area.

16. A method as set forth in claim 15 which is further characterized to include the steps of:

disposing additional source-receiver cross patterns at additional spaced positions on said earth surface and obtaining additional local trace data for said selected stratum underlying said additional positions;

utilizing said additional local seismic trace data from said additional source-receiver cross patterns to produce parameter signals which define seismic energy velocity and additional planes under said additional earth positions which best fit the reflection times established by said additional local trace data, said additional planes representing the configuration of said selected stratum underlying said additional spaced positions.

17. A method as set forth in claim 16 which is further characterized to include the steps of:

obtaining offset seismic trace data by recording seismic energy traveling between said first, second and additional source-receiver cross patterns from stratum portions underlying intermediate positions, and utilizing selected combinations of local and offset trace data to produce parameter signals which define best fit planes at each of local and intermediate portions of the selected stratum, said best fit planes thereby representing the configuration over the entire length of said selected stratum between said first and additional positions of the earth area.

18. A method as set forth in claim 17 which is further characterized to include the steps of:

selecting from the local and offset trace data a group of reflection point quadrant patterns establishing reflection times for a set of source-receiver pairs; and utilizing the trace data obtained by said set of source-receiver pairs to produce said parameter signals.

19. A method of geophysical prospecting to derive the configuration of substrata underlying the earth's surface, comprising steps of:

positioning a first line of seismic energy receivers in generally perpendicular intersection with a first line of sources and forming a first array at a first location on the earth's surface;

positioning a second line of seismic energy receivers in generally perpendicular intersection with a second line of sources and forming a second array at a second location on the earth's surface spaced from said first location, energizing said sources sequentially and recording in the form of trace data seismic energy reflected from reflection points at substrate received by all said receivers upon each source energization to provide local trace data from said first and second arrays and offset trace data from seismic energy emanating from sources at one of said arrays and received by receivers at the other of said arrays; and selecting portions of said offset trace data and said local trace data relating to a defined region of said substrata to provide a combination of both local and offset trace data for deriving the configuration of said region of said substrata by analysis of said combination of trace data.

20. A method as set forth in claim 19 wherein said selected portions of offset and local data includes redundant trace data as to sub groups of said reflection points within said region to enhance the reliability of such analysis.

21. A method as set forth in claim 19 which includes the further step of:

utilizing said combination of offset trace data and local trace data to produce parameter signals which define a plane best fitting the reflection times established by said combination of trace data for a group of reflection points at a stratum within said region, said plane thereby representing the configuration of said stratum from which strike and dip of said stratum may be derived, together with velocity of seismic energy between the earth's surface and said stratum.

22. A method as set forth in claim 21 in which said first and second arrays are positioned at spaced locations along a line of survey.

23. A method as set forth in claim 20 in which said lines of sources in said first array and said lines of sources in said second array are aligned along a common line of survey and said first and second arrays are positioned at spaced locations along said line of survey.

24. A method as set forth in claim 23 which further comprises:

positioning additional lines of sources along said line of survey and additional spaced lines of receivers in generally perpendicular intersection with said additional lines of sources, energizing said sources of said additional lines of sources sequentially and recording in the form of trace data, seismic energy received by receivers of said first and second arrays and of said additional lines of receivers, to provide additional local and offset trace data for a swath along said line of survey, and said selected portions of local and offset data include portions of said additional trace data.

25. A method of geophysical prospecting to derive the configuration of substrata underlying the earth's surface, comprising steps of:

positioning a first line of seismic energy receivers in generally perpendicular intersection with a first line of sources and forming a first array at a first location on the earth's surface;

positioning a second line of seismic energy receivers in generally perpendicular intersection with a second line of sources and forming a second array at a second location on the earth's surface spaced from said first location, energizing said sources sequentially and recording in the form of trace data seismic energy reflected from reflection points at substrata received by all said receivers upon each source energization to provide local trace data from said first and second arrays and offset trace data from seismic energy emanating from sources at one of said arrays and received by receivers at the other of said arrays; and utilizing portions of said offset trace data and said local trace data relating to a defined region of said substrate for deriving the configuration of said region of said substrata by analysis of said portions of trace data in combination.

26. A method of geophysical prospecting to derive the configuration of substrata underlying the earth's surface, comprising steps of:

positioning a first array of seismic energy receivers and sources at a first location on the earth'surface;

positioning a second array of seismic energy receivers and sources at a second location on the earth'surface spaced from said first location, energizing said souces sequentially and recording in the form of trace data seismic energy reflected from reflection points at substrata received by all said receivers upon each source energization to provide local trace data from said first and second arrays and offset trace data from seismic energy emanating from sources at one of said arrays and received by receivers at the other of said arrays; and utilizing portions of said offset trace data and said local trace data relating to a defined region of said substrate for deriving the configuration of said region of said substrata by analysis of said portions of trace data in combination.

27. A method as set forth in claim 26 wherein said arrays comprise sources and receivers positioned along intersecting lines.

28. A method as set forth in claim 27 wherein said intersecting lines are generally perpendicular to each other.

* * * * *

UNITED STATES PATENT OFFICE
CERTIFICATE OF CORRECTION

Patent No. 4,065,749       Dated December 27, 1977

Inventor(s) Kenneth H. Waters; George W. Rice

It is certified that error appears in the above-identified patent and that said Letters Patent are hereby corrected as shown below:

In The Specification

Column 2, line 7, after "cross" change "pattern" to -- patterns --.

Column 3, line 2, after "data" delete "deplecting" and insert -- depicting linear --.

Column 3, line 8, after "three" delete "distinctly" and insert -- distantly --.

Column 5, line 41, after "surface" delete "of" and insert -- and --.

Column 6, line 13, after "determined" delete "travl" and insert -- travel --.

Column 6, line 20, delete "last" and insert -- at --.

Column 6, line 20, delete "andutilized" and insert -- and utilized --.

Column 7, line 9, delete "Runnine" and insert -- Running --.

Column 7, line 29, delete "$p_3$ +" and insert -- $p_3$ +e --.

Column 7, line 31, delete "$(P_2)$" and insert -- $(p_2 x_2)$ --.

Column 7, line 31, delete "$d_3=1$" and insert -- $d_2 = p_1 x_2 \cos(p_2 x_2)$   $d_3 = 1$ --.

UNITED STATES PATENT OFFICE
CERTIFICATE OF CORRECTION

Patent No. 4,065,749      Dated December 27, 1977

Inventor(s) Kenneth H. Waters; George W. Rice

It is certified that error appears in the above-identified patent and that said Letters Patent are hereby corrected as shown below:

Column 10, line 27, after "over the" delete "extend" and insert -- extent --.

Column 10, line 35, delete "derivatives" and insert -- derivations --.

Column 10, line 43, delete "($c_1$, $C_2$, $C_3$, $c_4$) and insert -- ($c_1, c_2, c_3, c_4$) --.

Column 10, line 46, insert --Thus, -- at end of line.

Column 10, line 64, delete "gk" and insert -- qk --.

Column 17, line 4, delete "separated" and insert -- repeated --.

Column 20, line 63, delete "or" and insert -- of --.

Column 21, line 6, delete "$x_1$" and insert -- $x_i$ --.

Column 28, line 23, delete "16b" and insert -- 15b --.

Column 28, line 32, delete "(5)" and insert -- (6) --.

Column 28, line 43, delete "line" and insert -- time --.

Column 28, line 52, delete "thereof," and insert -- hereof, --.

Column 28, line 56, delete "thereof." and insert -- hereof. --.

UNITED STATES PATENT OFFICE
CERTIFICATE OF CORRECTION

Page 3 of 4

Patent No. 4,065,749   Dated December 27, 1977

Inventor(s) Kenneth H. Waters; George W. Rice

It is certified that error appears in the above-identified patent and that said Letters Patent are hereby corrected as shown below:

Column 30, line 58, after "terminals" insert -- (8) and (9) respectively after passing through squaring amplifiers --.

Column 30, line 65, delete "$x_j$" and insert -- $x_i$ --.

Column 30, line 27, delete "$x_j$" and insert -- $x_i$ --.

Column 31, line 29, delete "an" and insert -- a --.

Column 33, line 19, delete "havig" and insert -- having --.

Column 33, line 62, delete "m" before ratios.

Column 34, line 16, delete "$8_{ij}$" and insert -- $8T_{ij}$ --.

Column 36, line 39, delete "holes" and insert -- holds --.

Column 36, line 58, delete "where" and insert -- wherewith --.

Column 38, line 46, delete "essential" and insert -- estimated --.

Column 40, line 7, delete "pules" and insert -- pulses --.

Column 41, line 34, delete "of" and insert -- or --.

Column 45, line 64, delete "trail" and insert -- trial --.

Column 46, line 23, delete "sgnals" and insert -- signals --.

Column 47, line 11, delete "greter" and insert -- greater --.

UNITED STATES PATENT OFFICE
CERTIFICATE OF CORRECTION

Patent No. 4,065,749          Dated December 27, 1977

Inventor(s) Kenneth H. Waters; George W. Rice

It is certified that error appears in the above-identified patent and that said Letters Patent are hereby corrected as shown below:

Column 47, line 16, delete "opertion" and insert -- operation --.

Column 49, line 2, delete "inclue" and insert -- include --.

Column 49, line 28, delete "entie" and insert -- entire --.

Column 52, line 44, delete "souces" and insert -- sources --.

*Signed and Sealed this*

*Twenty-seventh* Day of *March 1979*

[SEAL]

Attest:

RUTH C. MASON
*Attesting Officer*

DONALD W. BANNER
*Commissioner of Patents and Trademarks*